United States Patent [19]

Miyaguchi

[11] Patent Number: 4,514,592
[45] Date of Patent: Apr. 30, 1985

[54] CRYPTOSYSTEM

[75] Inventor: Shoji Miyaguchi, Yokohama, Japan

[73] Assignee: Nippon Telegraph & Telephone Public Corporation, Tokyo, Japan

[21] Appl. No.: 398,016

[22] Filed: Jul. 14, 1982

[30] Foreign Application Priority Data

Jul. 27, 1981 [JP] Japan .................. 56-117499
Oct. 19, 1981 [JP] Japan .................. 56-166777
Jun. 21, 1982 [JP] Japan .................. 57-106567

[51] Int. Cl.$^3$ ............................. H04L 9/04
[52] U.S. Cl. .................. 178/22.11; 178/22.14
[58] Field of Search .............. 178/22.11, 22.14

[56] References Cited

U.S. PATENT DOCUMENTS 4,200,770 4/1980 Hellman et al. ............. 178/22.11
4,351,982 9/1982 Miller et al. ................ 178/22.11
4,405,829 9/1983 Rivest et al. ................ 178/22.11

Primary Examiner—Sal Cangialosi
Attorney, Agent, or Firm—Pollock, Vande Sande and Priddy

[57] ABSTRACT

A cryptosystem for the RSA cryptography which calculates $C \equiv M^e \mod n$ and, for this calculation, performs an operation $C = M_1 \times M_2 \mod n$. An operation $$R_j = M_1 \times M'_{2,j} + 2^\lambda R_{j+1} - \left[ \frac{M_1 \times M'_{2,j} + 2^\lambda R_{j+1}}{n} \right] \times n,$$

where $M'_{2,j} = M_{2,j} - \omega \delta_{j\lambda} \cdot 2^\lambda + \omega \delta_{(j-1)\lambda}$, $M_{2,j} = \sum_{i=0}^{\lambda-1} \delta_{(j-1)\lambda+1} \cdot 2^i$, $M_2 = \sum_{i=0}^{l\lambda-1} \delta_i \cdot 2^i$, $\delta_i = 0$ or 1, $R_{l+1} = 0$, and $\omega = 0$ or 1, is performed in the order $j = l, l-1, \ldots 1$ to obtain last $R_1$ as the result of the calculation $M_1 \times M_2 \mod n$. The calculation $$\left[ \frac{M_1 \times M'_{2,j} + 2^\lambda R_{j+1}}{n} \right] = Q_j$$

is performed in a quotient calculating unit, and the calculation $M_1 \times M_{2,j}' + 2^\lambda R_{j+1} - Q_j \cdot n$ is performed in a main adding unit. Where, variable $R_j$ may be divided into two parts $R_{j,0}$ and $R_{j,1}$. In this way, the multiplication and the division are simultaneously conducted, thereby to raise the calculation speed.

22 Claims, 186 Drawing Figures

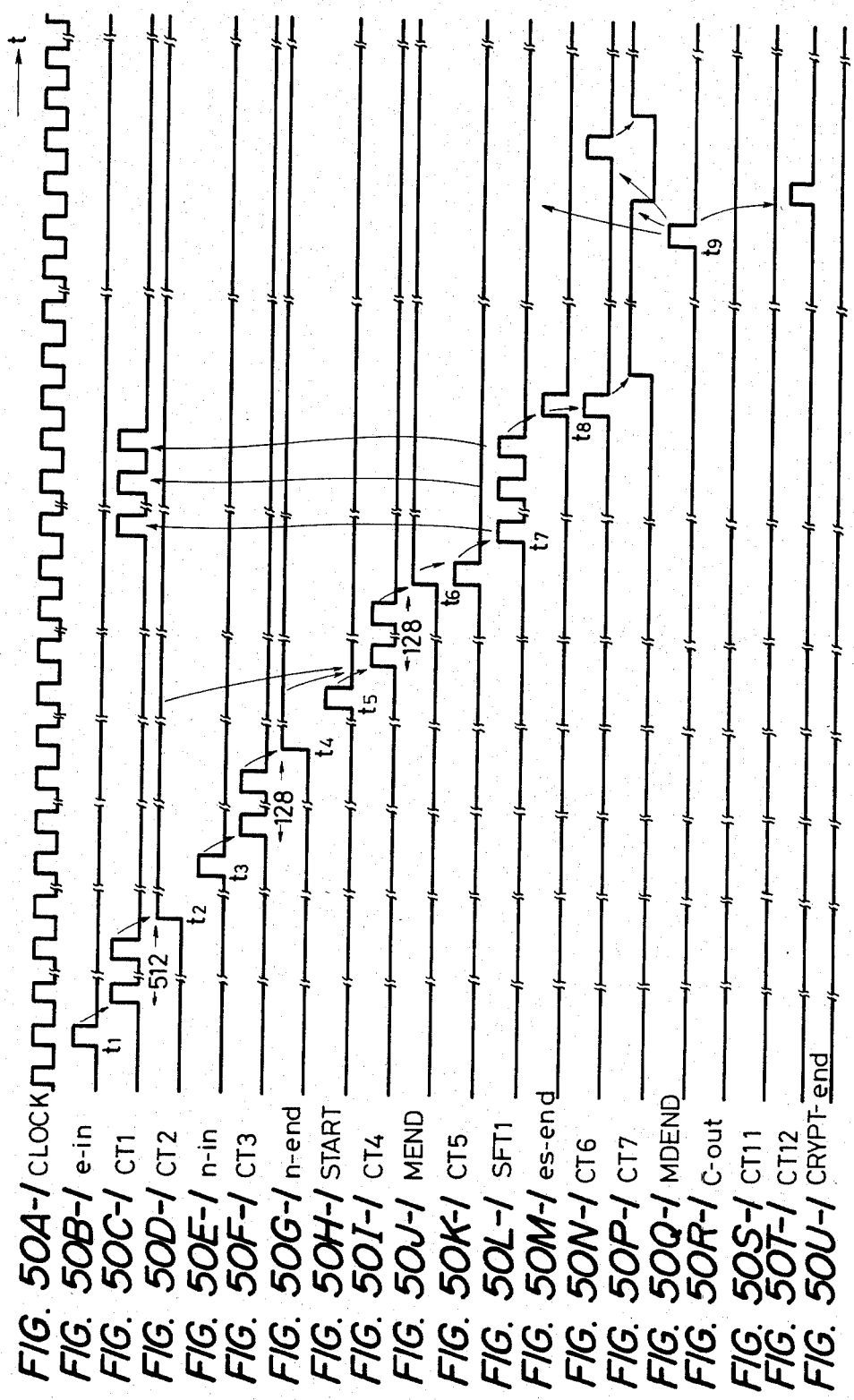

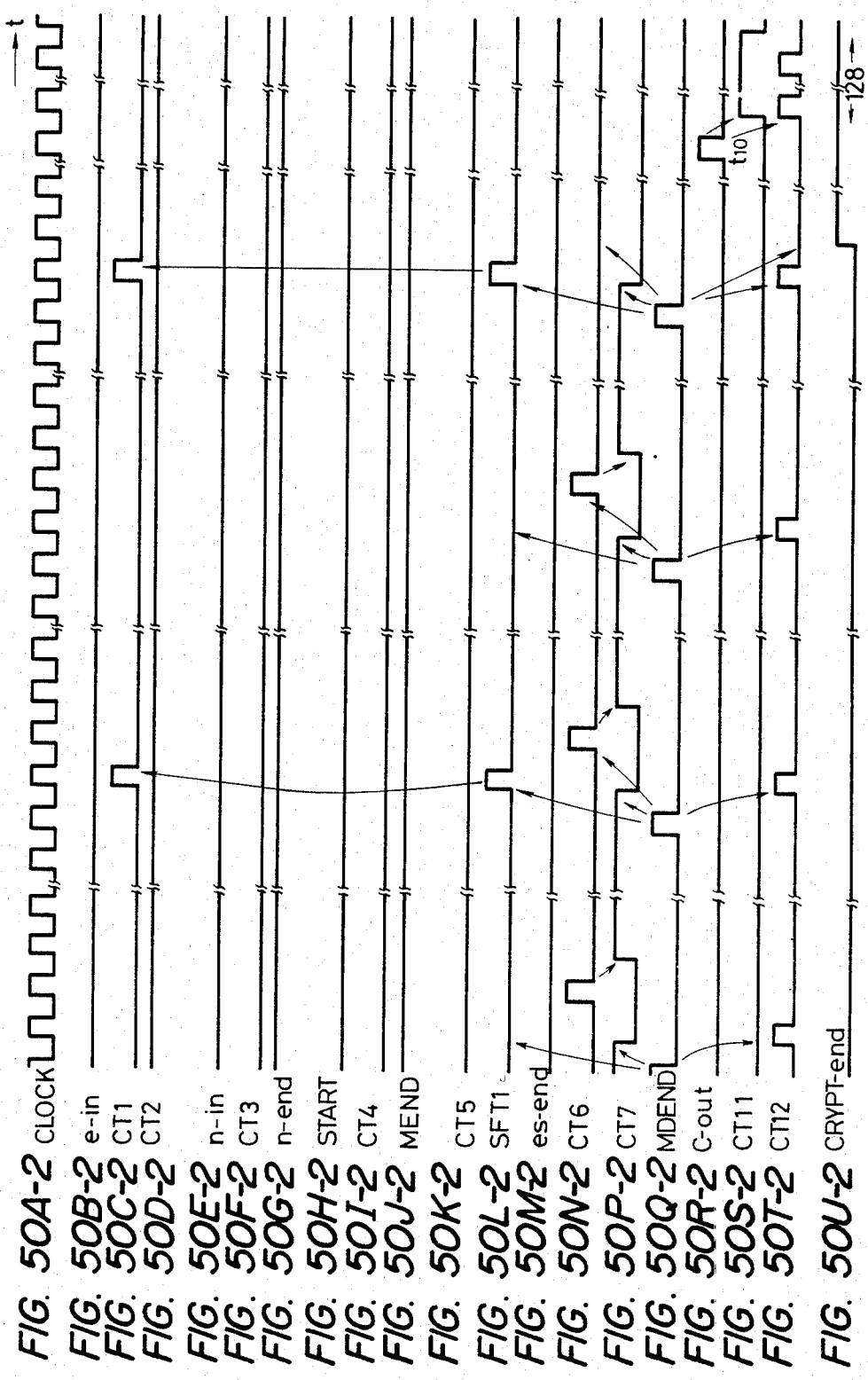

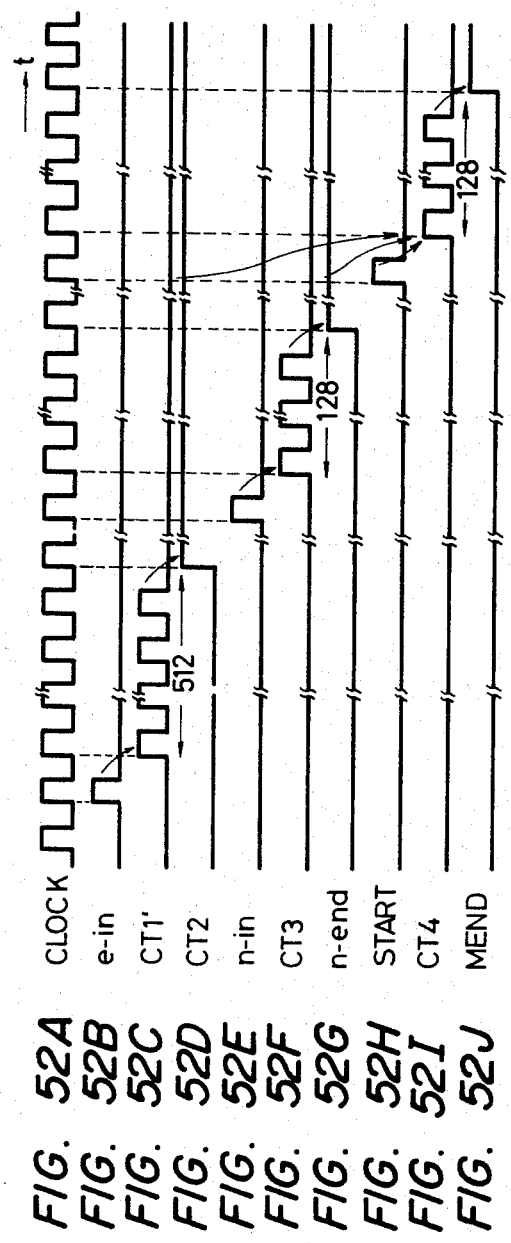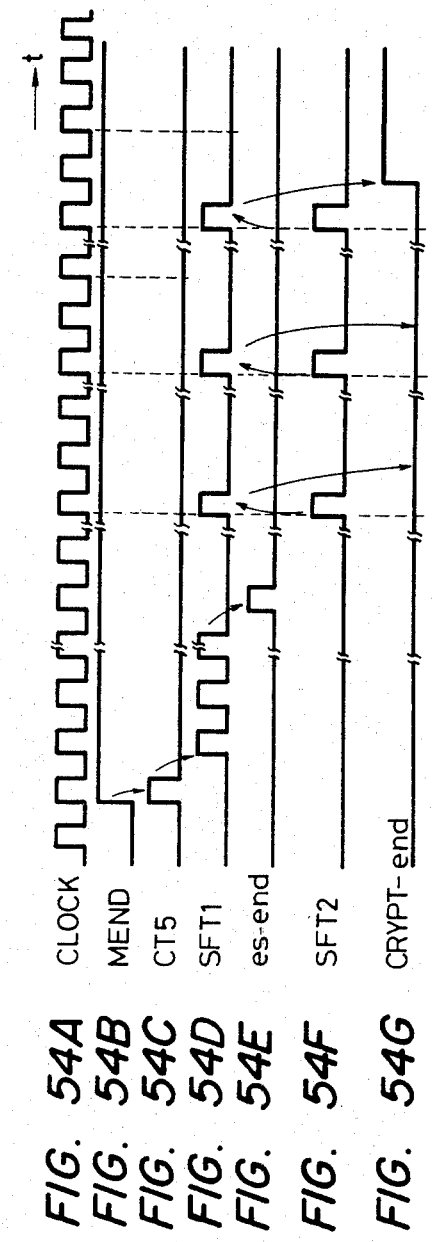

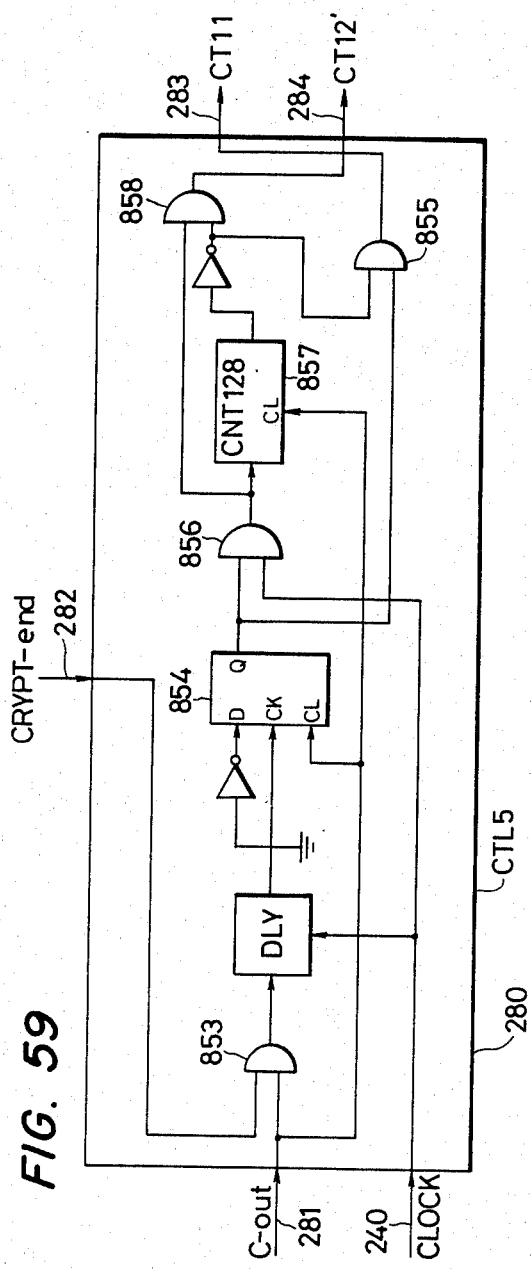
FIG. 59
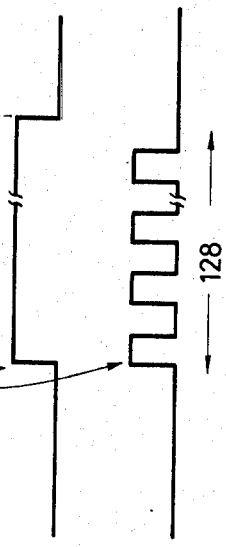
FIG. 60A CLOCK
FIG. 60B C-out
FIG. 60C CT11
FIG. 60D CT12'

FIG. 63

| D-SIG INPUT | | | OUTPUT |
|---|---|---|---|
| qs | $2^4$ | $2^3$ | |
| 0 | 0 | 0 | 0 |
| 0 | 0 | 1 | $2^4$ |
| 0 | 1 | 0 | $2^4$ |
| 0 | 1 | 1 | $2^5$ |
| 1 | 0 | 0 | 0 |
| 1 | 0 | 1 | $-2^4$ |
| 1 | 1 | 0 | $-2^4$ |
| 1 | 1 | 1 | $-2^5$ |

FIG. 64

| D-SIG INPUT | | | | OUTPUT |
|---|---|---|---|---|
| qs | $2^3$ | $2^2$ | $2^1$ | |
| 0 | 0 | 0 | 0 | 0 |
| 0 | 0 | 0 | 1 | $2^2$ |
| 0 | 0 | 1 | 0 | $2^2$ |
| 0 | 0 | 1 | 1 | $2^3$ |
| 0 | 1 | 0 | 0 | $-2^3$ |
| 0 | 1 | 0 | 1 | $-2^2$ |
| 0 | 1 | 1 | 0 | $-2^2$ |
| 0 | 1 | 1 | 1 | 0 |
| 1 | 0 | 0 | 0 | 0 |
| 1 | 0 | 0 | 1 | $-2^2$ |
| 1 | 0 | 1 | 0 | $-2^2$ |
| 1 | 0 | 1 | 1 | $-2^3$ |
| 1 | 1 | 0 | 0 | $2^3$ |
| 1 | 1 | 0 | 1 | $2^2$ |
| 1 | 1 | 1 | 0 | $2^2$ |
| 1 | 1 | 1 | 1 | 0 |

FIG. 65

| D-SIG INPUT | | | OUTPUT |
|---|---|---|---|
| qs | $2^1$ | $2^0$ | |
| 0 | 0 | 0 | 0 |
| 0 | 0 | 1 | $2^0$ |
| 0 | 1 | 0 | $-2^1$ |
| 0 | 1 | 1 | $-2^0$ |
| 1 | 0 | 0 | 0 |
| 1 | 0 | 1 | $-2^0$ |
| 1 | 1 | 0 | $2^1$ |
| 1 | 1 | 1 | $2^0$ |

| QA1 | 0 | 0 | 0 | 0 |
|---|---|---|---|---|
| QA2 | 1 | 0 | 0 | 0 |
| QA3 | 1 | 1 | 0 | 0 |
| QA4 | 1 | 1 | 1 | 0 |
| QB | 00 | 01 | 10 | 11 |

CRYPTOSYSTEM

BACKGROUND OF THE INVENTION

The present invention relates to a cryptosystem for enciphering message or information used in ordinary communications and in electronic computers and deciphering the cryptogram and, more particularly, to a cryptosystem for encryption and/or decryption in a public-key cryptosystem in which an encryption key may be publicly revealed.

In the public-key cryptosystem, different keys are employed for encryption and decryption and anyone can encipher a message using a publicly revealed encryption key but only the receiver can decipher an enciphered message using a privately held decryption key, whereby to ensure privacy communications. Known as such a public-key cryptosystem is the RAS cryptosystem proposed in R. L. Rivest et al. "A Method for obtaining Digital Signatures and Public-Key Cryptosystems", Communications of the ACM, February 1978, Vol. 21, No. 2, pp 120-126.

An encryption and a decryption procedures are represented by the following congruence expressions:

Encryption: $C \equiv M^e \mod n$ \hfill (1)

Decryption: $M \equiv C^d \mod n$ \hfill (2)

where C, M, e, d and n are all integers, C a representation of a cryptogram as an integer, M a representation of a plain text as an integer, e and n an encryption key, d and n a decryption key and $e \neq d$. In the present invention all the variables except control signals are integers and are represented by 2's complement. The values of n, e and d are chosen, for enhancement of security protection capabilities, as follows: $n = 10^{100}$ to $10^{200}$, $e = 10^{50}$ to $10^{100}$ and $d = 10^{50}$ to $10^{100}$. The encryption procedure, i.e. a calculation of the remainder C when $M^e$ is divided by n, is carried out in the manner described below. Here, $M_1$, $M_2$, R and C are variables. Preparation: Let e be represented by $$e = \sum_{i=0}^{k} e_i \cdot 2^i$$

where $e_i = 0$ or 1.

Step 1: Set the variable C to 1.
Step 2: Execute steps 2a and 2b for $i = k, k-1, \ldots, 1, 0$.
Step 2a:
 $M_1 = C$, $M_2 = C$
 $R \equiv M_1 \times M_2 \mod n$
 $C = R$
Step 2b:
 When $e_i = 1$
 $M_1 = C$, $M_2 = M$
 $R \equiv M_1 \times M_2 \mod n$
 $C = R$
Step 3: Halt.

In the above steps the equation symbol "=" means to set the value of the right side to the variable of the left side.

Thus the encryption procedure of the RAS cipher, that is, computation of $C \equiv M^e \mod n$, is completed. This calculating procedure will hereinafter be called an "exponentiation procedure".

As will be seen from comparison of Eqs. (1) and (2), the decryption procedure is similarly performed using d instead of e. In the case where the RAS cryptosystem which performs such encryption and decryption as described above should be implemented through utilization of the LSI technology as of CMOS, nMOS and so forth, the circuit scale of the cryptosystem would be on the order of 100 to 200 K gates. Since the integration density of prior art LSIs is in the range of 10 to 30 K gates per chip, implementation of such cryptosystem is difficult.

To avoid such difficulty, a crypto-LSI of a microprogram control system, having a circuit scale of about 20K gates, has been proposed in R. L. Rivest "A Description of a Single-Chip Implementation of the RSA Public-Key Cryptosystem", National Telecommunication Conference, 1980, Conference Record Vol. 3 of 4, pp 49.2.1–49.2.4. This crypto-LSI is impractical since its computing speed for cryptography is as low as 1.2K bits/s. Furthermore, since the encryption key of the RSA cryptosystem has a fixed length of 512 bits in this crypto-LSI, no procedure for cryptography can be carried out in the case where the length of the encryption key is, for example, 256- or 1024-bit.

As described above, in this cryptosystem, the calculation of $R \equiv M_1 \times M_2 \mod n$ is conducted a number of times. In the past, this calculation has been performed in the same manner as ordinary multiplication and division; namely, $M_1 \times M_2$ is obtained by sequential multiplications in an ascending order starting with a least significant digit at first and then the multiplication result is divided by n sequentially in a descending order starting with a most significant digit. Therefore, this cryptosystem has the defect that the computing time is markedly long due to such sequential multiplication and division.

SUMMARY OF THE INVENTION

It is therefore an object of the present invention to provide a cryptosystem which can easily be fabricated as an LSI.

Another object of the present invention is to provide a cryptosystem which permits high-speed encryption and decryption.

Yet another object of the present invention is to provide a cryptosystem at low cost in which the length of an encryption and/or decryption key can be selected over a wide range, such as l bits (l being a constant), 2·l bits and a·l bits (a being an integer).

Since the encryption and the decryption are identical in procedure with each other as described previously, the following description will be given of the encryption procedure alone.

According to the present invention, the calculation in the aforementioned step $$R \equiv M_1 \times M_2 \mod n \quad (3)$$

is performed in the manner described below. The variables e, n, M, C, $M_1$ and $M_2$ are non-negative integers, and, in the following description, these characters are also used to represent signals respectively corresponding to the variables. For instance, the variable $M_2$ is a signal $M_2$, too, and a variable $\delta_{4(j-1)+i}$ (i=0, 1, 2, 3) is a signal $\delta_{4(j-1)+i}$ (i=0, 1, 2, 3), too. The variable $M_2$ is divided into l groups by steps of λ bits as follows:

$$M_2 = \sum_{j=1}^{l} M_{2,j} \cdot 2^{(j-1)\lambda} \quad (4)$$

where j, $R_j$ and $Q_j$ are variables.

Step ① $R_{l+1}=0$
Step ② Set $j=l, l-1, \ldots 1$ and perform the following operations:

$$Q_j = [(2^\lambda \cdot R_{j+1} + M_1 \cdot M_{2,j}) \div n] \quad (5)$$

$$R_j = (2^\lambda \cdot R_{j+1} + M_1 \cdot M_{2,j}) - Q_j \cdot n \quad (6)$$

Step 3 Halt. ($R_1 \equiv M_1 \times M_2 \mod n$)
Here, [x] represents the largest possible integer equal to or smaller than x. For instance, $[1.0]=1$, $[1.5]=1$, $[-1.5]=-2$ and so forth. By multiplying the both sides of Eq. (6) by $2^{(j-1)\lambda}$ and obtaining, for each side, the sum of the results of the multiplications for all $j=1$ to $j=l$ as shown by the following equation, it is proved that this calculation method is correct.

$$\sum_{j=1}^{l} R_j \cdot 2^{(j-1)\lambda} = \sum_{j=1}^{l} 2^{(j-1)\lambda} \{2^\lambda \cdot R_{j+1} + M_1 \cdot M_{2,j} - Q_j \cdot n\}$$

The addition and the subtraction in Eq. (6) can be performed at high speed using a carry save adder (CSA). Since the variables $R_{j+1}$, $M_1$ and n are extremely large, however, the calculation of Eq. (5) is liable to take too much time; therefore, it is preferred that the calculation of these equations be performed by using various approximations described hereinafter. Here, since the carry save adder has two outputs, $R_j$ is divided into two as follows:

$$R_j = \sum_{i=0}^{1} R_{j,i} \quad (7)$$

For high-speed calculation of $Q_j$, a constant of m bits is omitted from the low-order sides of all the variables in Eq. (5), and all the variables have been represented by a 2's complement as mentioned before. $Q_j$ is approximated to $Q_j'$ by the omission.

$$Q_j' = \left[ \left( \sum_{i=0}^{1} [(2^\lambda \cdot R_{j+1,i}) \cdot 2^{-m}] + \sum_{i=0}^{\lambda-1} [(M_1 \cdot \delta_{(j-1)\lambda+i} \cdot 2^i) \cdot 2^{-m}] + S \right) \div [n \cdot 2^{-m}] \right] \quad (8)$$

where $$M_2 = \sum_{i=0}^{l\lambda-1} \delta_i \cdot 2^i, \quad M_{2,j} = \sum_{i=0}^{\lambda-1} \delta_{(j-1)\lambda+i} \cdot 2^i \quad (9)$$

Here, the constant S is introduced for suppressing any error resulting from the approximation.

Eq. (8) is a division, which takes much time. For speeding up the computation, a variable v for a reciprocal of the divisor $[n \cdot 2^{-m}]$ and a constant u are introduced, thereby to change Eq. (8) into a form of multiplication. By this procedure, $Q_j'$ is approximated to $Q_j''$.

$$Q_j'' = [X_j'' \times v \times 2^{-u}] + t \quad (10)$$

where $$\left. \begin{array}{l} X_j'' = \sum_{i=0}^{1} [(2^\lambda \cdot R_{j+1,i}) \cdot 2^{-m}] + \\ \quad \sum_{i=0}^{\lambda-1} [(M_1 \cdot \delta_{(j-1)\lambda+i} \cdot 2^i) \cdot 2^{-m}] + S \\ v = [2^u \div [n \cdot 2^{-m}]] \\ t = \begin{cases} 1 \text{ for } X_j'' \geq 0 \\ 0 \text{ for } X_j'' < 0 \end{cases} \end{array} \right\} \quad (11)$$

An error resulting from this close approximation cannot be made zero but can be reduced. By optimal selections of the constants m, S and u, errors $\gamma_{1j}$ and $\gamma_{2j}$ can be reduced as follows: The reason will be described later.

$$Q_j' = Q_j + \gamma_{1j}, \quad \gamma_{1j} = 0 \text{ or } 1 \quad (12)$$

$$Q_j'' = Q_j' + \gamma_{2j}, \quad \gamma_{2j} = 0 \text{ or } 1 \quad (13)$$

A concrete description will be given of the case of performing the operation $R \equiv M_1 \times M_2 \mod n$ by the abovesaid close approximation. Since M and n are, for example, about $10^{200}$ which is roughly equal to $2^{500}$ as referred to previously, each variable is represented by a binary number of 512-bit length.

The following conditions are set, by way of example:

$$\left. \begin{array}{l} 2^{511} < n < 2^{512} \\ 0 \leq M_1 < n \\ 0 \leq M_2 < n \\ M_2 = \sum_{i=0}^{511} \delta_i \cdot 2^i, \delta_i = 0 \text{ or } 1 \\ M_{2,j} = \sum_{i=0}^{3} \delta_{4(j-1)+i} \cdot 2^i \ j = 128 \text{ to } 1 \\ M_2 = \sum_{j=1}^{128} M_{2,j} \cdot 2^{(j-1)\lambda} \\ u = 13, m = 504, S = 38, \lambda = 4 \end{array} \right\} \quad (14)$$

(i) n is inputted and v is obtained from Eq. (11).

$$v \leftarrow [2^{13} \div [n \cdot 2^{-504}]] \quad (15)$$

where $2^5 < v < 2^6$.

(ii)

$M_1$ and $M_2$ are inputted. $\quad (16)$

Repeated Calculation.
The calculation method will be shown below in the form of a program flowchart.
Step 0:

$$j \leftarrow 128, R_{129,1} \leftarrow 0, R_{129,0} \leftarrow 0 \quad (17)$$

Step 1: From Eq. (11)

$$X_j'' \leftarrow \sum_{i=0}^{1} [(R_{j+1,i}) \cdot 2^{-500}] + \quad (18)$$

-continued $$\sum_{i=0}^{3} [(M_1 \cdot \delta_{4(j-1)+i}) \cdot 2^i \cdot 2^{-504}] + 38$$

where $-2^{13} < X_j'' < 2^{13}$

Step 2:

$$\left. \begin{array}{l} Q_j'' \leftarrow [X_j'' \times v \times 2^{-13}] + 1 \text{ for } X_j'' \geq 0 \\ Q_j'' \leftarrow [X_j'' \times v \times 2^{-13}] \quad \text{ for } X_j'' < 0 \end{array} \right\} \quad (19)$$

When $Q_j'' = 32$, set $Q_j'' = 31$ and when $Q_j'' = -32$, set $Q_j'' = -31$.

Step 3: From Eq. (6)

$$\sum_{i=0}^{1} R_{j,i} \leftarrow \sum_{i=0}^{1} 2^4 \cdot R_{j+1,i} + M_1 \cdot M_{2,j} - Q_j'' \cdot n \quad (20)$$

Step 4:

$$\left. \begin{array}{l} \text{If } j = 1, \text{ then go to Step 5,} \\ \text{if } j \neq 1, \text{ then } j \leftarrow j - 1, \text{ and go back to Step 1.} \end{array} \right\} \quad (21)$$

Step 5: The repeated calculation ends.

CALCULATION FOR COMPENSATION $$\left. \begin{array}{l} \text{Step 6: } R_1 \leftarrow \sum_{i=0}^{1} R_{1,i} \\ \text{If } R_1 \geq 0, \text{ then go to Step 8} \end{array} \right\} \quad (22)$$

$$\left. \begin{array}{l} \text{Step 7: } \sum_{i=0}^{1} R_{1,i} \leftarrow \sum_{i=0}^{1} R_{1,i} + n \\ \text{Go back to Step 6} \end{array} \right\} \quad (23)$$

Step 8: $R \leftarrow R_1$, end. (24)

In the case where the variable e is represented by 512 bits, 0 goes in succession on its high-order bit side. This arises from the aforesaid conditions $n = 10^{100}$ to $10^{200}$, $e = 10^{50}$ to $10^{100}$. Since $j = 128$ to $1$, it is seen that the repeated calculation is conducted 128 times. The range of $Q_j''$ obtained from the equation (19) is given by $-31 \leq Q_j'' \leq 31$. The calculation method mentioned above will be proved to be appropriate, later.

In the compensating calculation, the number of executions of Step 7 may be zero, one or two. The reason for this will be described later. At the time when Step 6 is executed for the first time, the following condition holds:

$$-2n \leq \sum_{i=0}^{1} R_{1,i} < n$$

So, a register of 514-bit length, including sign bit, is employed for storing $R_{1,i}$. Accordingly, an adder of a 514 bit width is used for performing the operation of Eq. (20). In the operation of Eq. (18), 500 bits are discarded for $R_{j+1,i}$ and 504 bits, 503 bits, 502 bits and 501 bits are discarded for $M_i$ in accordance with the values $i = 0, 1, 2, 3$, respectively. An adder for obtaining $X_j''$ may be an adder of 14-bit width, including sign bit, because of the condition $2^{-13} < X_j'' < 2^{13}$.

As described previously, the operation $C \equiv M_1 \times M_2$ mod n necessary for the calculation for cryptography can be performed by eight steps ① to ⑧. Embodiments of the present invention, described later, execute such a computation. That is, a quotient calculating unit, a main adding unit and a controller are provided. To the quotient calculating unit are applied $M_1$, $M_{2,j}$, n and $R_{j+1}$ to perform an operation $Q_j = [(M_1 \times M_{2,j} + 2^\lambda \cdot R_{j+1}) \div n]$. To the main adding unit are provided $M_1$, $M_{2,j}$, $Q_j$, $R_{j+1}$ and n to conduct an operation $M_1 \times M_{2,j} + 2^\lambda R_{j+1} - Q_j \cdot n$. The controller controls the quotient calculating unit and the main adding unit so that these operations are performed in the order $j = 1, 1-1, \ldots 1$. That is, as indicated by the order $j = 1, 1-1, \ldots 1$, the operation $M_1 \times M_2$ mod n is performed by simultaneously carrying out multiplication and division in a descending order, so that the calculation is conducted at high speed. Furthermore, the calculation in the quotient calculating unit can be further speeded up by discarding and multiplication based on Eq. (10). By using the carry save adder, the addition and subtraction in the main adding unit can be speeded up by the time necessary for carry propagation. This is very significant because the numbers of digits of M and n are very large and because the number of calculations is large.

In the present invention, the main adding unit is divided into a plurality of slice sections of the same function. To the slice sections are sequentially applied $M_1$ and n while being divided for each constant width of their binary integers, and $M_{2,j}$ and $Q_j$ are provided to the slice sections in common to them. For each set of $M_1$, n, $Q_j$, $M_{2,j}$ and $R_{j+1}$, an operation $R_j = M_1 \times M_{2,j} + 2^\lambda \cdot R_{j+1} - Q_j \cdot n$ is performed. The slice sections are connected in cascade via signal lines so that a part of each calculation result may be provided to a higher order slice section. In each slice section, one or more registers for storing divided portions of M, n, e, $R_j$ and C are provided as required. By such division of the main adding unit into slice sections, each slice section can easily be fabricated as an LSI even by the present LSI technology, so that the cryptosystem can be produced at low cost. Moreover, by increasing or decreasing the number of slice sections, the lengths of the encryption and decryption keys e and d can be varied with ease.

By applying such division of the main adding unit into slice sections to the case where $M_1 \cdot M_2$ mod n is calculated by performing the multiplication $M_1 \cdot M_2$ prior to the division by n, the cryptosystem can be fabricated at low cost.

Figure 6:
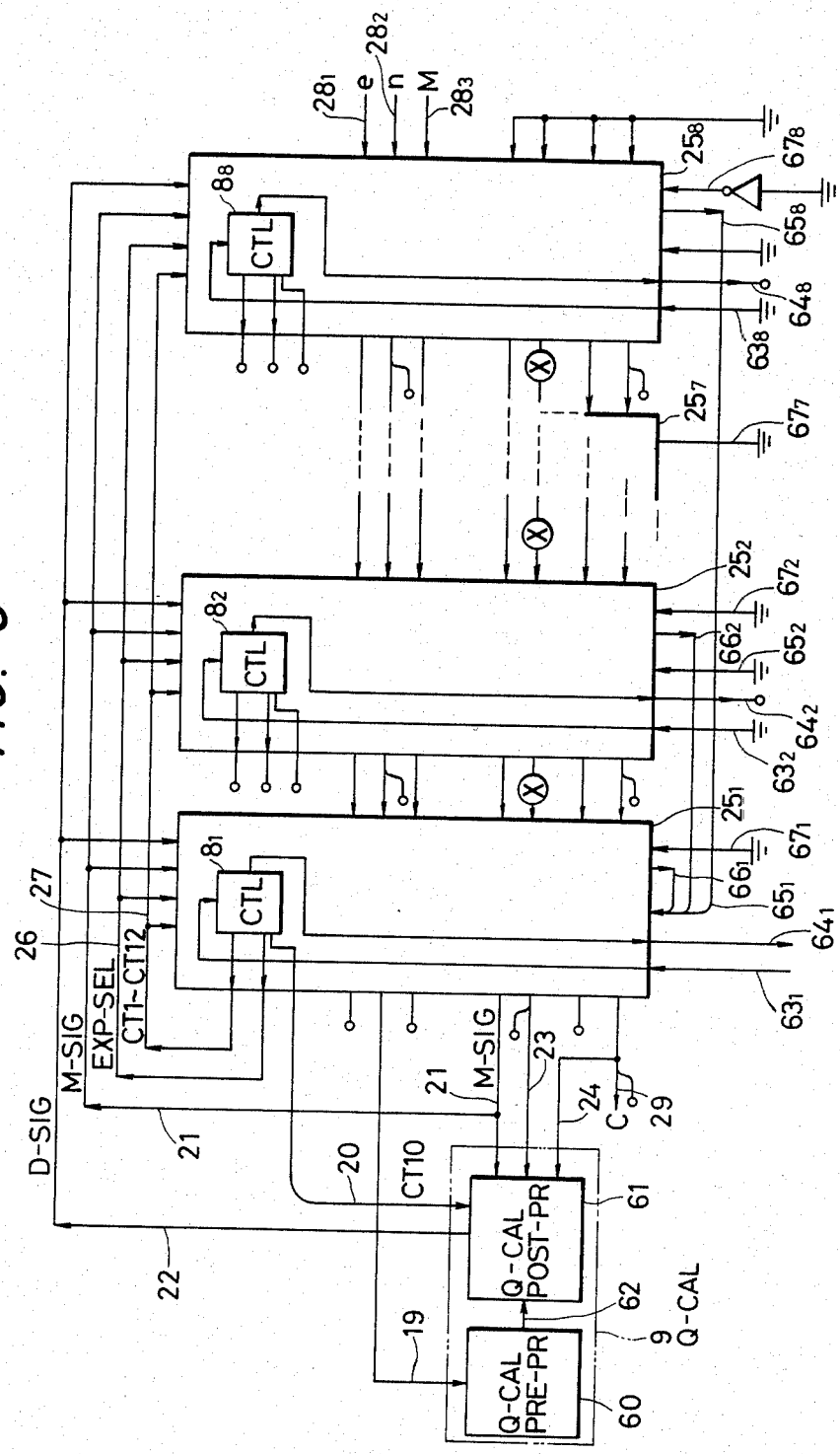
FIG. 6 is a block diagram illustrating the whole arrangement of an embodiment of the present invention.
Figure 22:
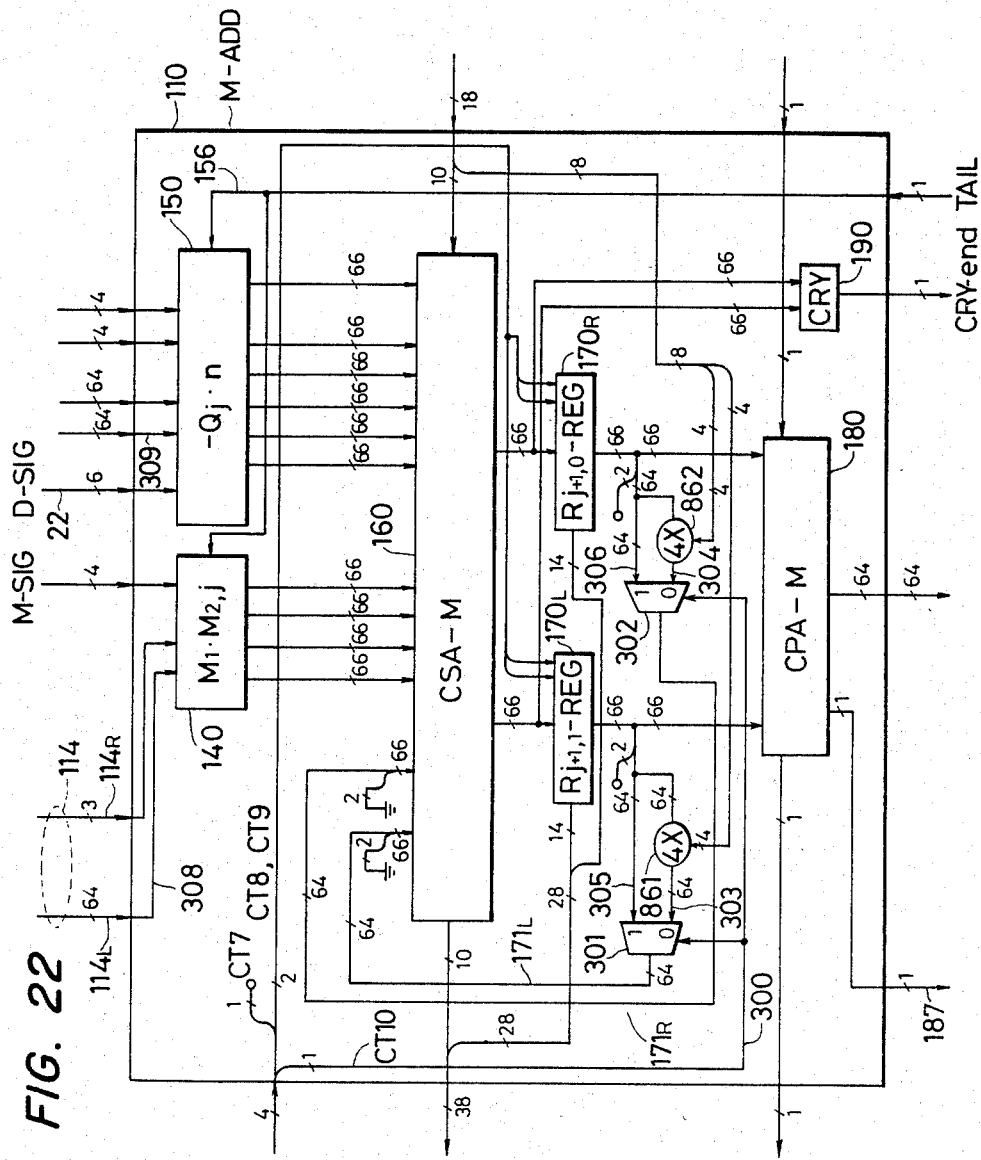
FIG. 22 is a diagram showing an example of a main adding unit 110 employed in FIG. 15.
Figure 51:
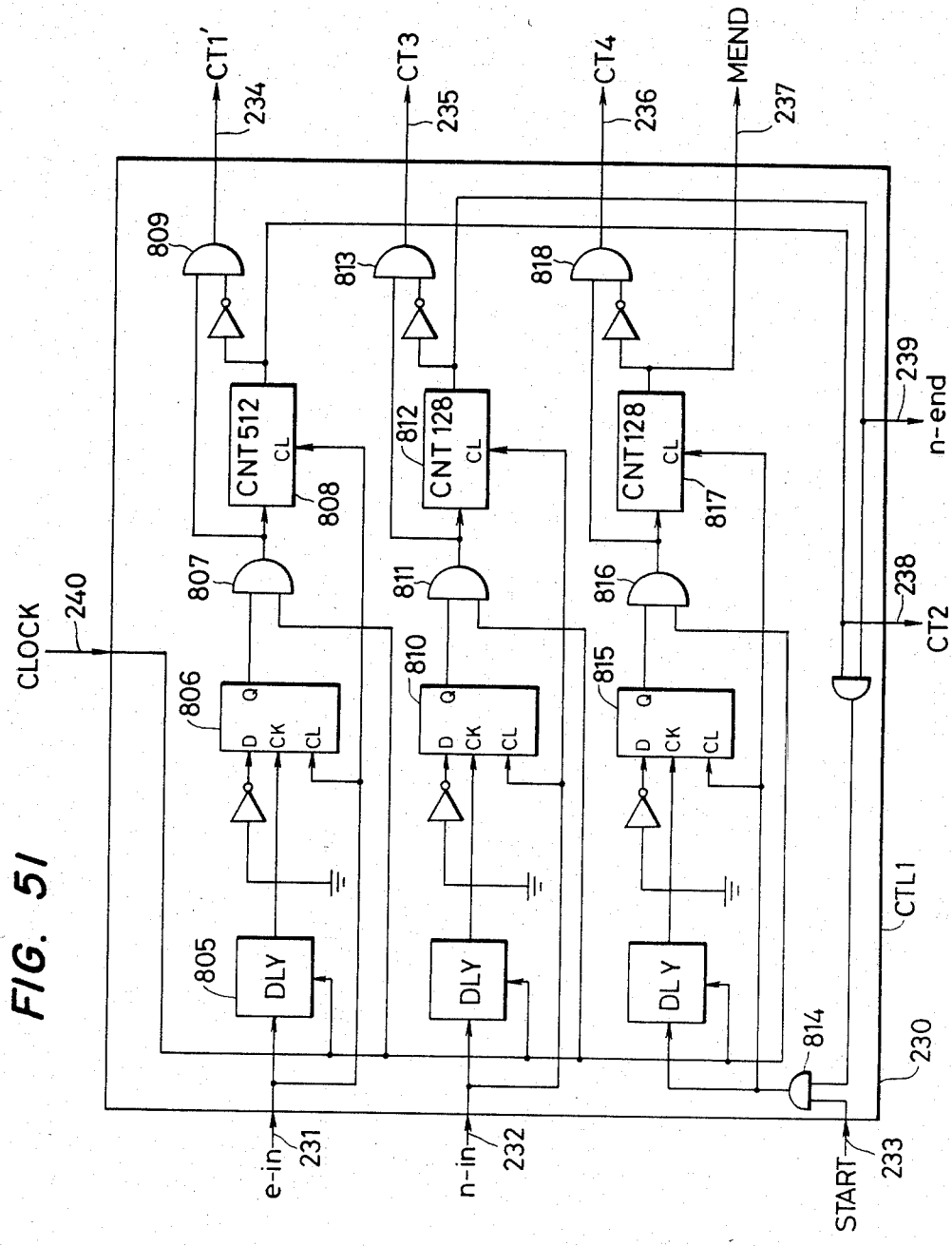
Figure 53:
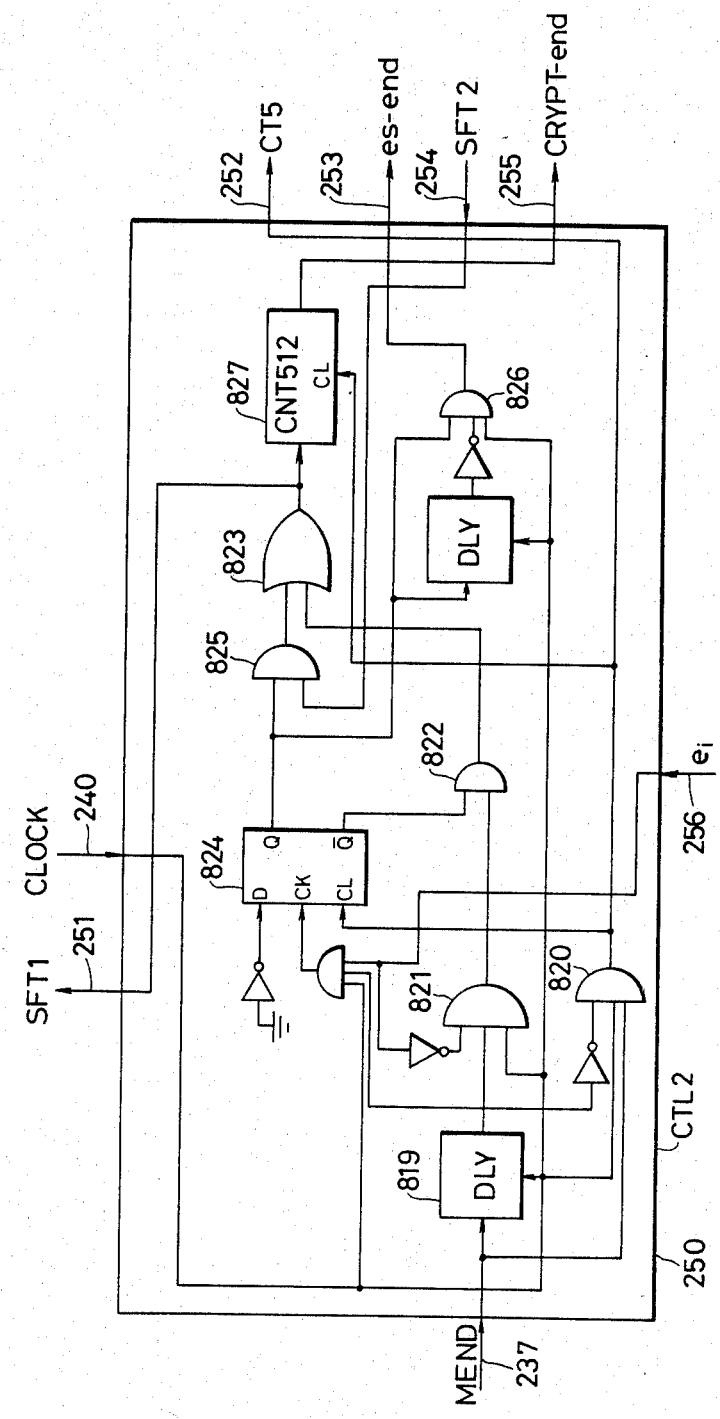
Figure 55:
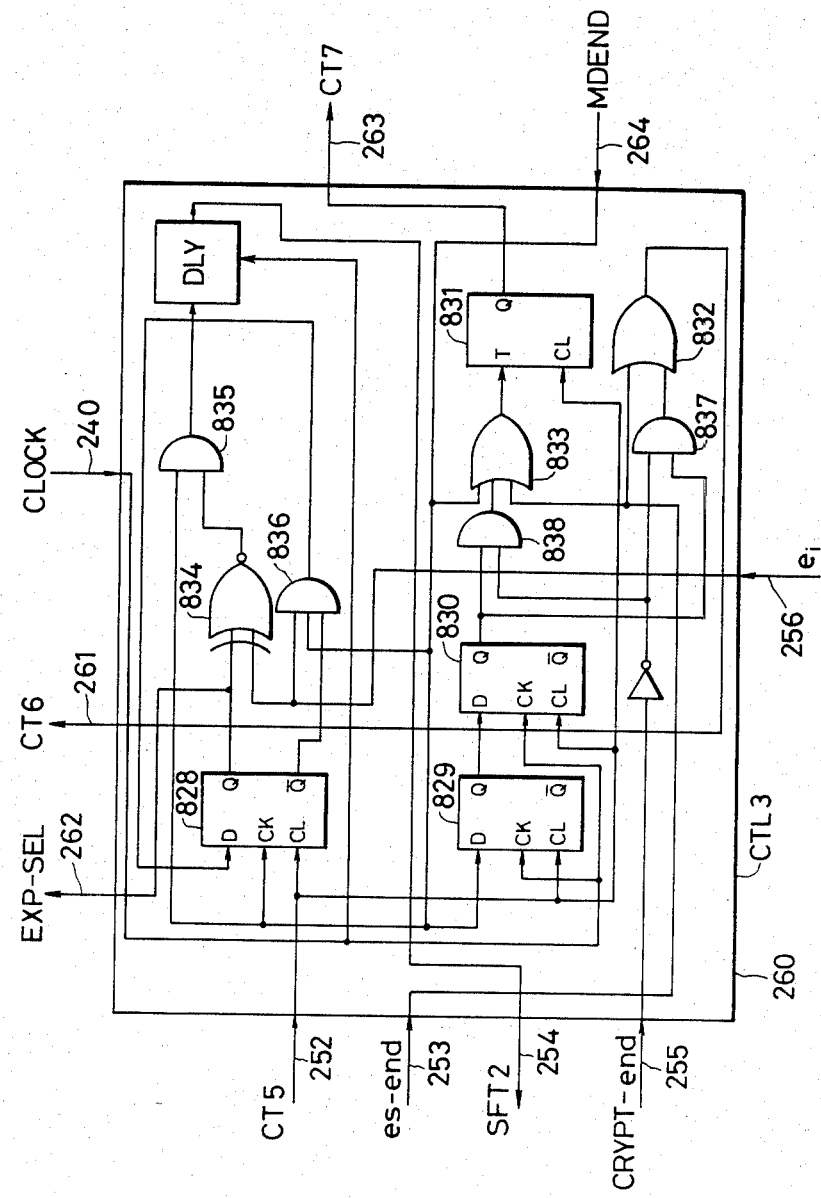
Figure 56:
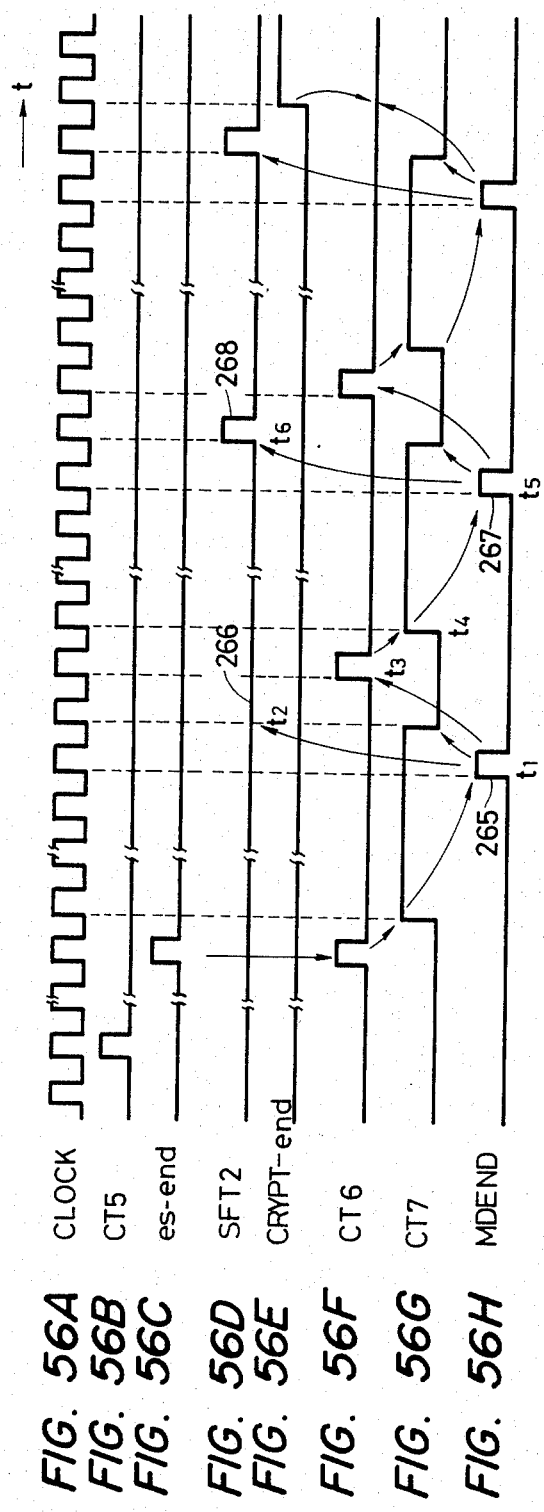
Figure 57:
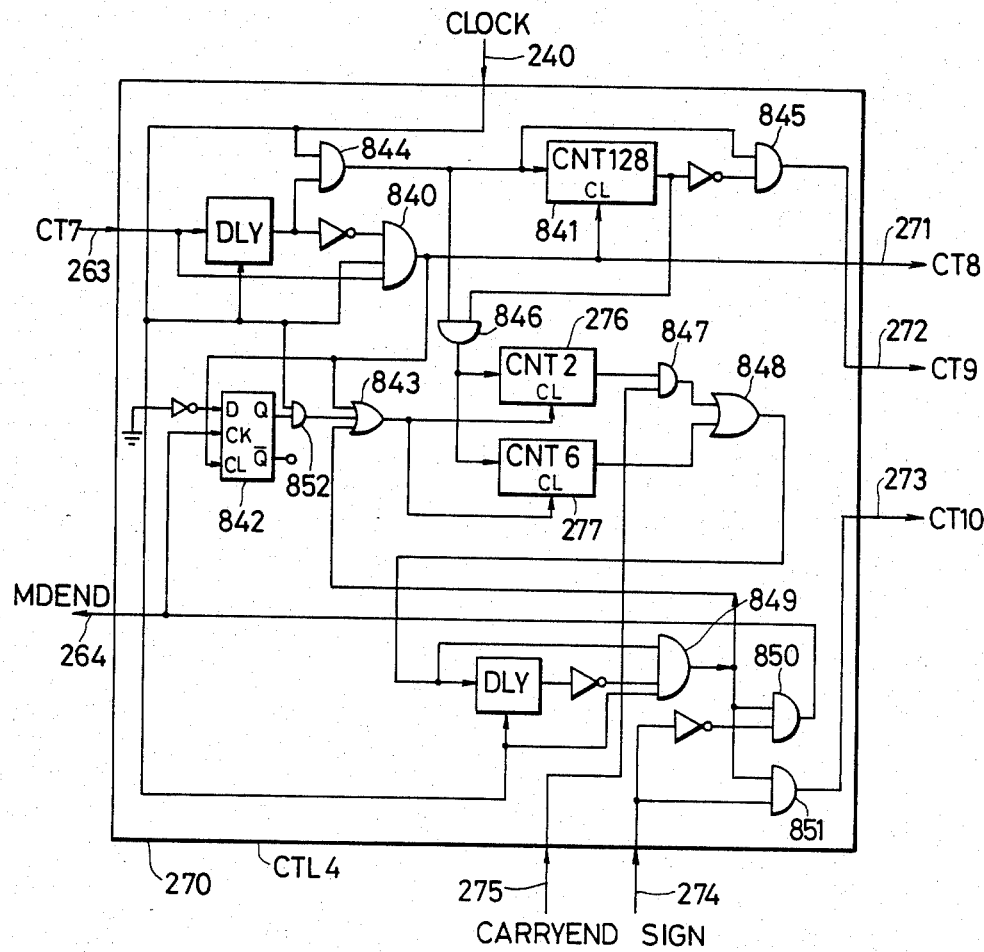
Figure 58:
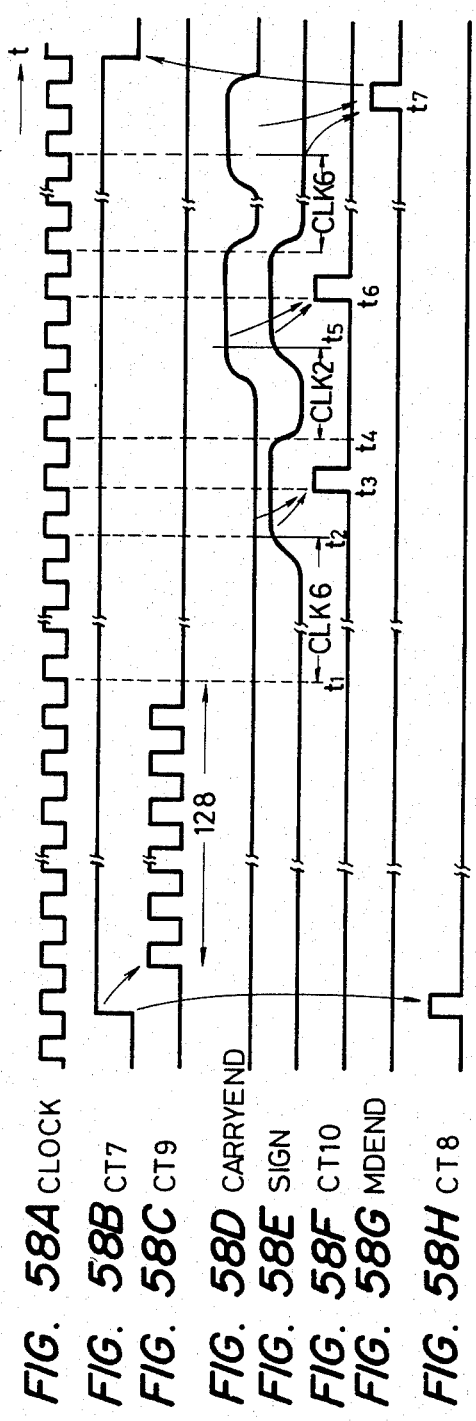
Figure 61:
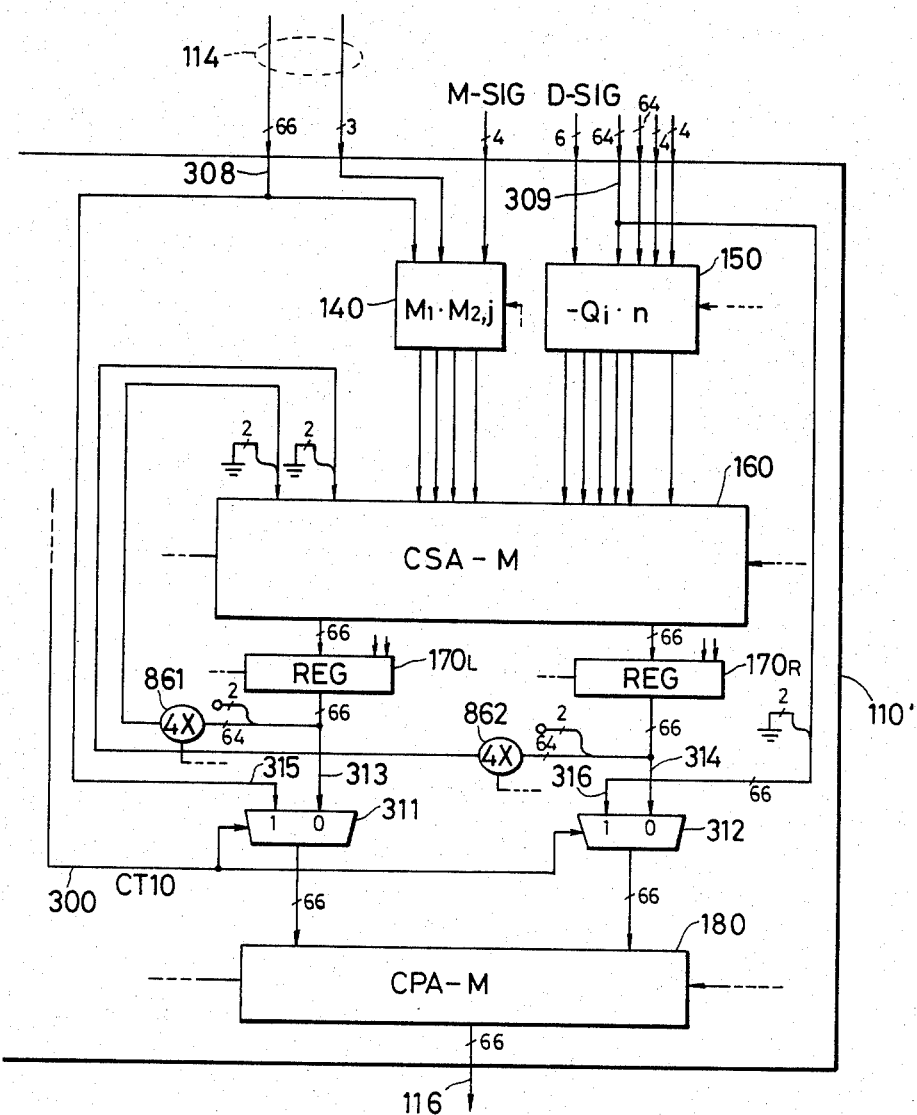
Figure 62:
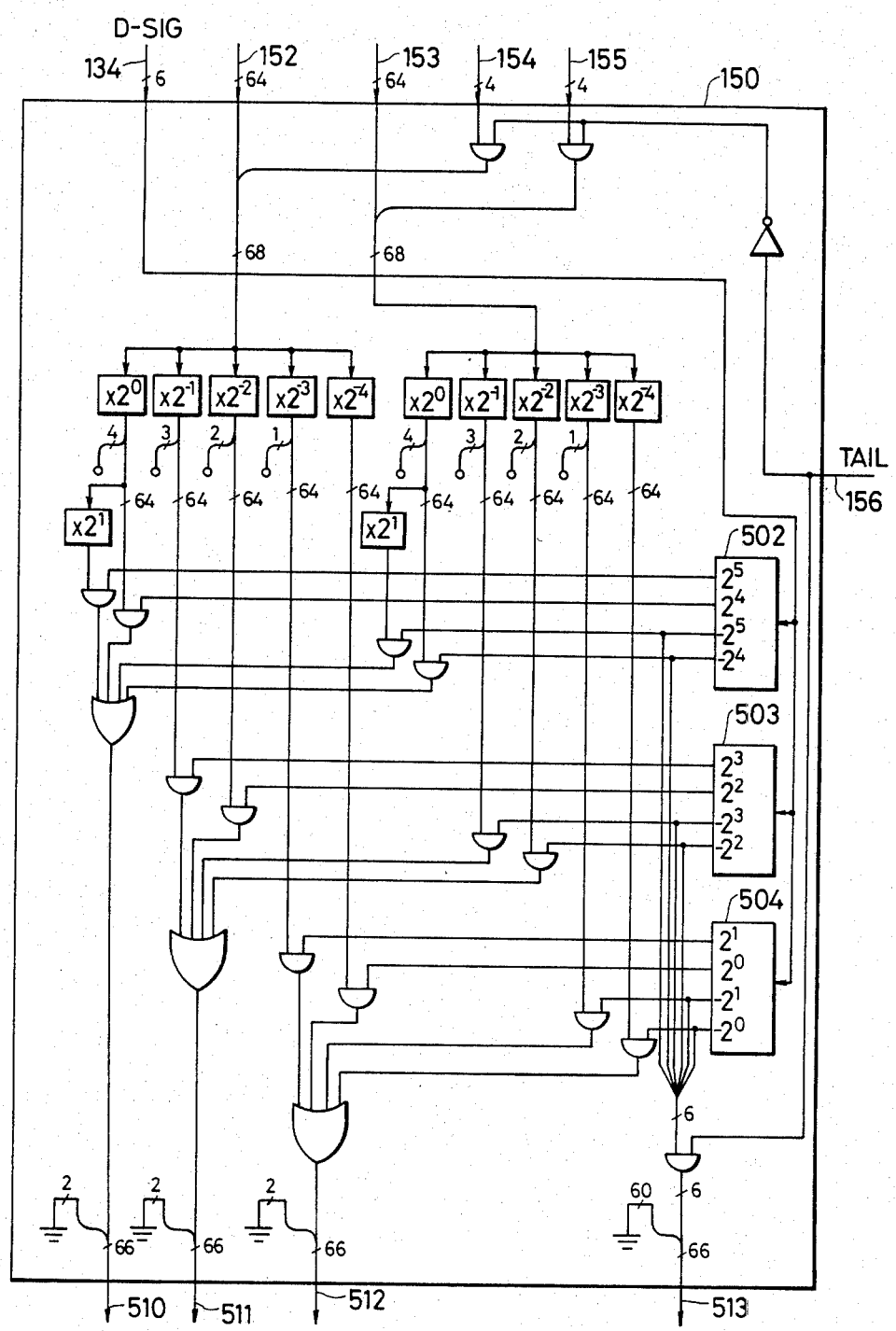
Figures 66, 67:
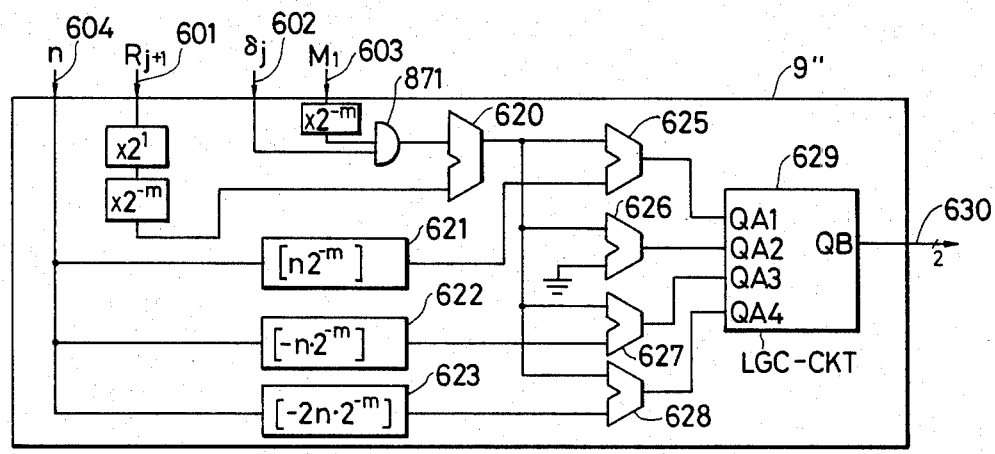
Figure 68:
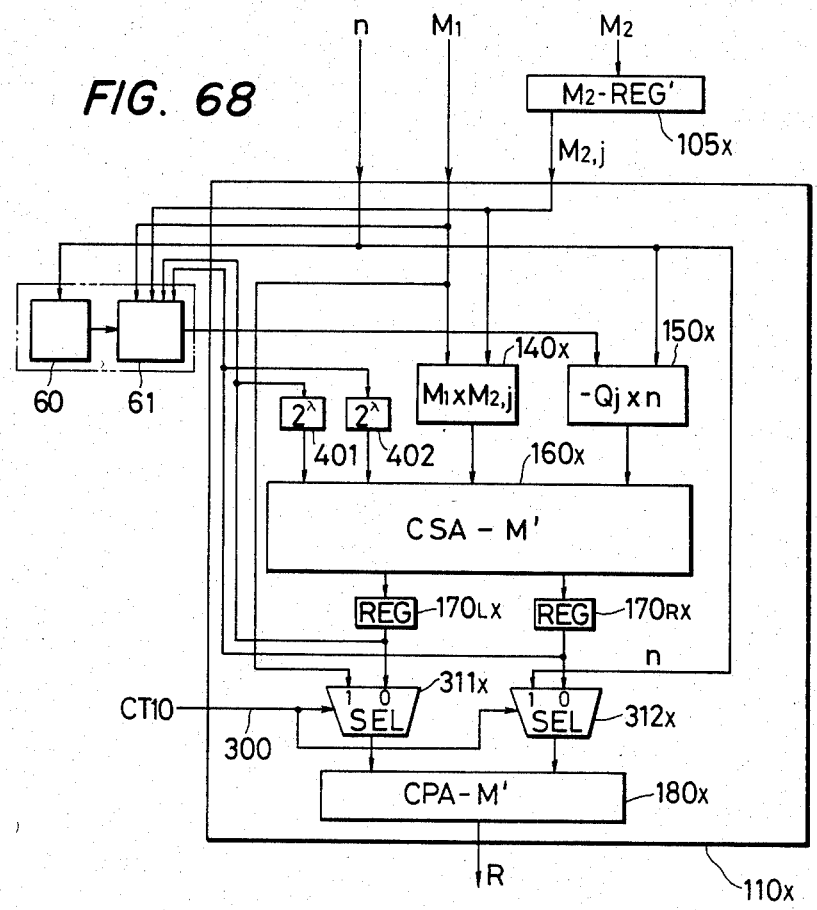
Figure 73:
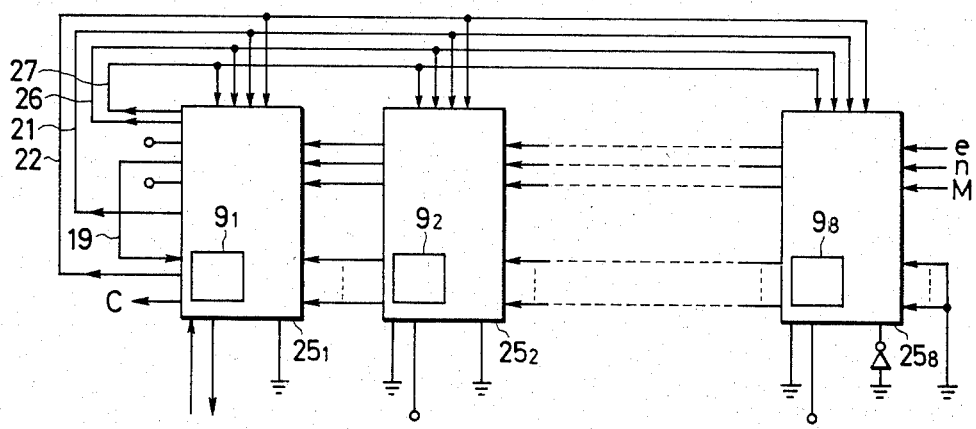
Figure 69:
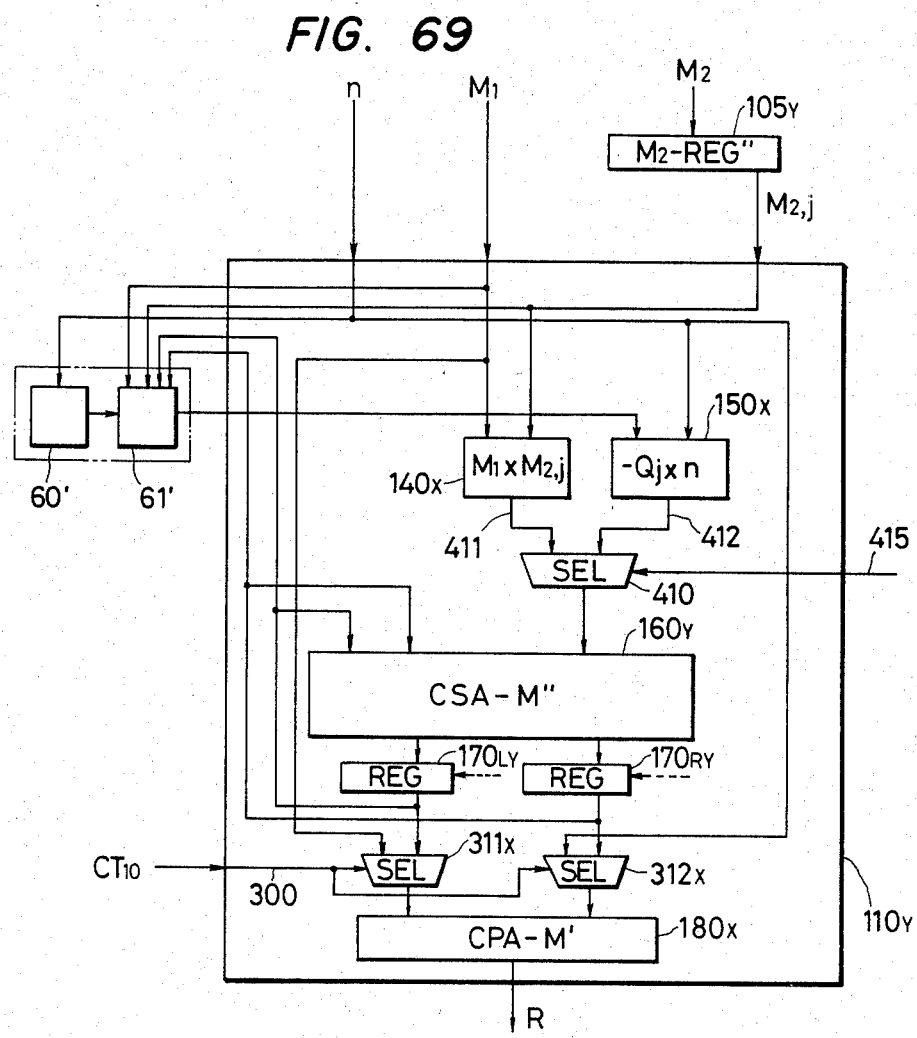
Figure 70:
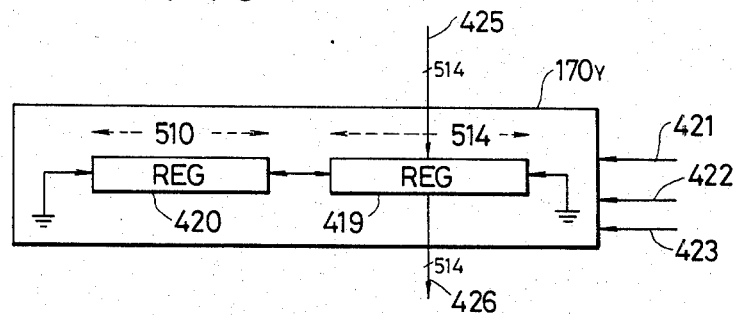
Figure 71:
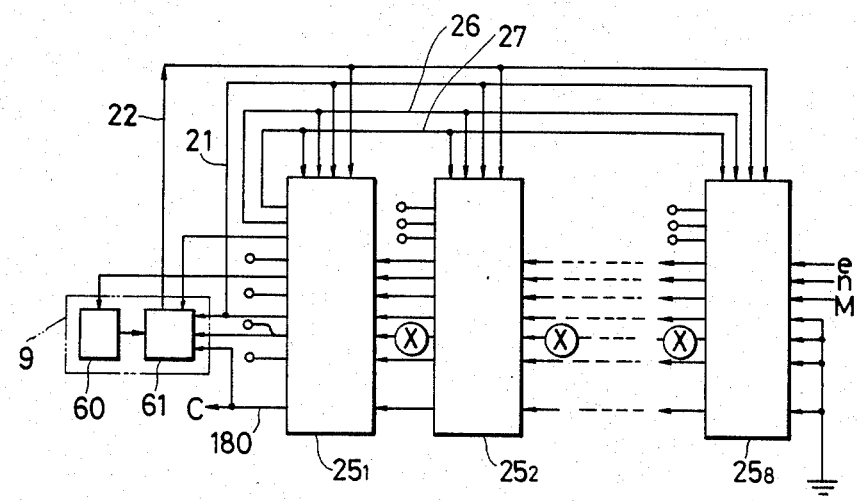
Figure 72:
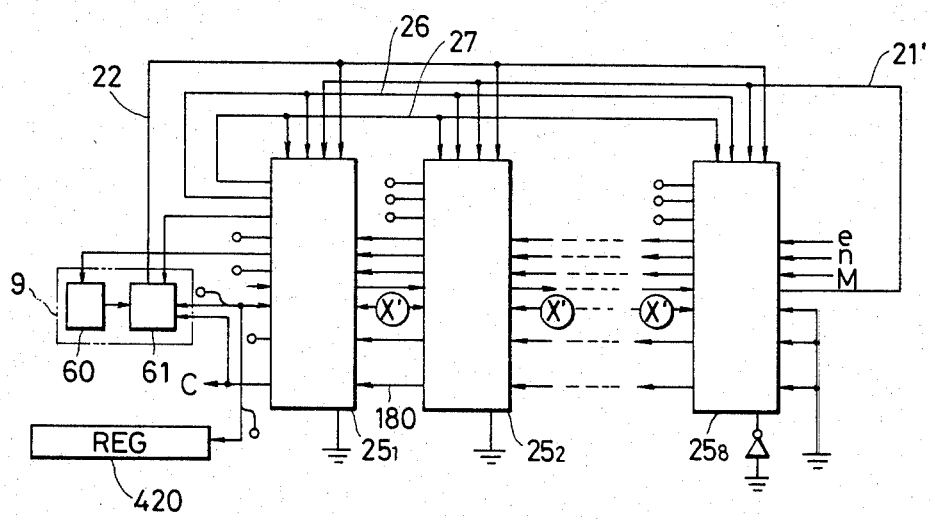

FIGS. $50A_1$ to $50U_1$ and FIGS. $50A_2$ to $50U_2$ are, as a whole, a timing chart illustrating the outline of the operation of the controller 8 used in FIG. 6;

FIG. 51 is a diagram illustrating a specific example of a first control section 230 in the controller 8;

FIGS. 52A to 52J are, as a whole, a timing chart showing the operation of the first control section 230;

FIG. 53 is a diagram illustrating a specific example of a second control section 250 in the controller 8;

FIGS. 54A to 54G are, as a whole, a timing chart showing the operation of the second control section 250;

FIG. 55 is a diagram illustrating a specific example of a third control section 260 in the controller 8;

FIGS. 56A to 56H are, as a whole, a timing chart showing the operation of the third control section 260;

FIG. 57 is a diagram illustrating a specific example of a fourth control section 270 in the controller 8;

FIGS. 58A to 58H are, as a whole, a timing chart showing the operation of the fourth control section 270;

FIG. 59 is a diagram illustrating a specific example of a fifth control section 280 in the controller 8;

FIGS. 60A to 60D are, as a whole, a timing chart showing the operation of the fifth control section 280;

FIG. 61 is a diagram illustrating a modified form of the embodiment of FIG. 6 in which the main adding unit 110 is coupled and used as another means for compensating calculation;

FIG. 62 is a diagram illustrating another example of the $-Q_j \cdot n$ calculating section in FIG. 22;

FIGS. 63 to 65 are diagrams respectively showing the logic of circuits 502 to 504 in FIG. 62;

FIG. 66 is a diagram illustrating another example of a quotient calculating unit 9;

FIG. 67 is a diagram showing the logic of a circuit 629 in FIG. 66;

FIG. 68 is a block diagram illustrating the main adding unit in the cryptosystem in the case where the multiplication and division are performed at the same time;

FIG. 69 is a block diagram illustrating the main adding unit in the cryptosystem in the case where the multiplication and division are performed one after the other;

FIG. 70 is a diagram illustrating a specific example of a register section $170_Y$ in FIG. 69;

FIG. 71 is a diagram illustrating an example of the main adding unit shown in FIG. 68 being divided;

FIG. 72 is a diagram illustrating an example of the main adding unit shown in FIG. 69 being divided; and FIG. 73 is a diagram illustrating another embodiment of the present invention where the quotient calculator 9 is provided in each of the slice sections.

DESCRIPTION OF THE PREFERRED EMBODIMENTS

Figure 1:
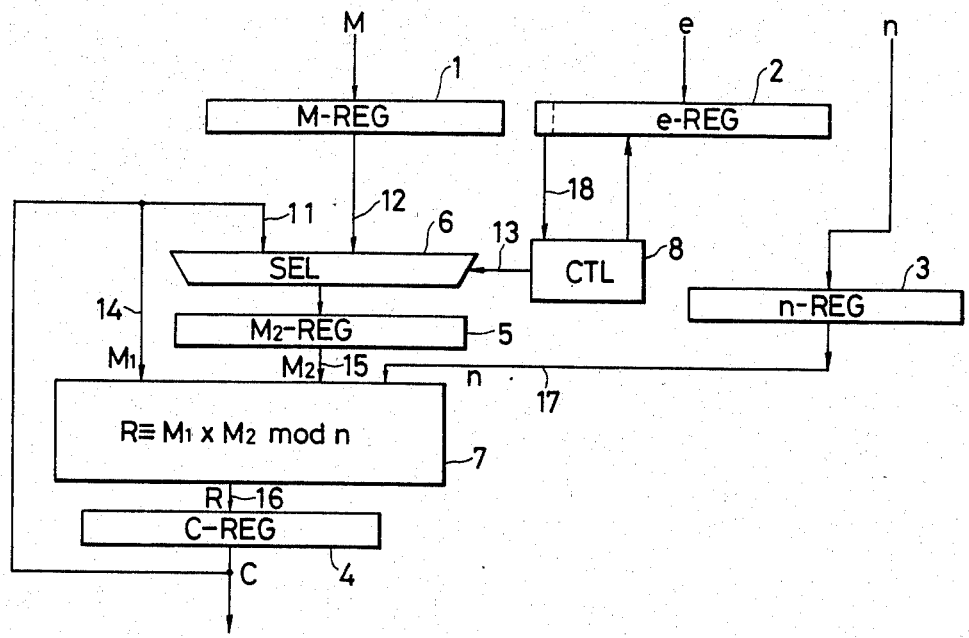
FIG. 1 is a block diagram showing the principle of a conventional technology for the RSA cryptosystem.

To facilitate a better understanding of the present invention, a description will be given first of a conventional technology for the RSA cryptography. FIG. 1 shows the principle of a conventional technology which performs calculations for the RSA cryptography. An M-register 1, an e-register 2, an n-register 3 and a C-register 4 are provided for storing variables M, e, n and C, respectively. The contents of the M-register 1 and the C-register 4 are supplied to a selector 6 via signal lines 12 and 11, respectively. The selector 6 selects one of the signals from the signal lines 11 and 12 in accordance with a switching signal from a switching signal line 13 and provides the selected signal to an $M_2$-register 5. A multiplier-divider 7 is supplied with a signal $M_1$ on a signal line 14, a signal $M_2$ on a signal line 15 from the $M_2$-register 5 and a signal n on a signal line 17 from the n-register 3. The most significant bit (MSB) of the e-register 2 is provided via a signal line 18 to a controller 8, which, in turn, controls the selector 6 in accordance with the content of the signal e applied. The signal lines are each composed of a plurality of signal conductor lines.

At first, the variables M, e and n are stored in the registers 1, 2 and 3, respectively. The e-register 2 is such one that has a left circular shift function. Prior to the exponentiation procedure, the content of the e-register 2 is shifted to left until the left-most bit of the e-register becomes "1". The reason is that the number of calculations in steps 2a and 2b of the exponentiation procedure can be reduced by starting the calculation with a condition $e_i=1$.

Then the controller 8 stores +1 into the C-register 4. Represented by C, the content of the C-register 4 is C=1. The above is the operation of step 1 of the exponentiation procedure.

Next, the controller 8 executes steps 2a and 2b of the exponentiation procedure in the following manner:

On the input signal line 17 of the multiplier-divider is always provided the variable n. Let the signals on the input signal lines 14 and 15 of the multiplier-divider 7 be represented by $M_1$ and $M_2$, respectively, and a signal on an output signal line 16 of the multiplier-divider 7 be represented by R. Since the C-register 4 is connected to the signal line 14, $M_1 \leftarrow C$ is executed. The selector 6 selects the input signal line 11 in accordance with the signal on the signal line 13 from the control unit 8, and the content C of the C-register 4 is latched in the $M_2$-register 5. Accordingly, the signal $M_2$ on the signal line 15 becomes $M_2 \leftarrow C$. Then, the multiplier-divider 7 performs the operation $R \equiv M_1 \times M_2$ mod n and provides the signal R on the output signal line 16, so that the content of the C-register 4 becomes R, thus executing $C \leftarrow R$. The above is the operation of step 2a of the exponentiation procedure.

The operation of step 2b of the exponentiation procedure differs from the operation of step 2a only in the operation of the selector 6. That is, the input signal line 12 of the selector 6 is selected and the content of the M register 1 is latched in the $M_2$-register 5, resulting in $M_2 \leftarrow M$.

The controller 8 executes the operations of steps 2a and 2b while shifting the content of the register 2 to left bit by bit for each $e_i$ of the variable $$e = \sum_{i=0}^{k} e_i \cdot 2^i.$$

By such operation, the content C of the C-register 4 finally becomes $C \equiv M^e$ mod n based on the exponentiation procedure. By the way, the principle of the calculation order of the RSA cryptosystem shown in FIG. 1 is known, but the construction of the multiplier-divider used therein has not been disclosed and the cryptosystem has not been put to practical products.

Figure 2:
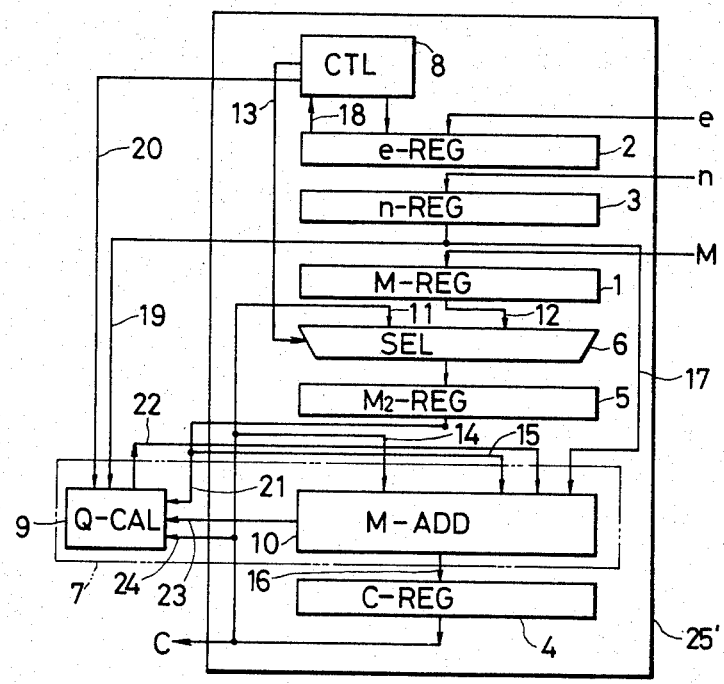
FIG. 2 is a block diagram showing the principle of the cryptosystem of the present invention.

FIG. 2 is explanatory of the principle of the cryptosystem of the present invention, the parts corresponding to those in FIG. 1 being identified by the same reference numerals. In FIG. 2, the multiplier-divider used in FIG. 1 is divided into a quotient calculator 9 and a main adder 10. The quotient calculator 9 performs the operation of Eq. (5), i.e. the division for obtaining the quotient, using Eqs. (18) and (19). The main adder 10 is formed of the remaining portion of the multiplier-divider 7 from which is separated the quotient calculator 9, and it mainly performs the additions in Eqs. (20) and (23). That is, in the main adder 10, for example, as shown in Eq. (20), the multiplication and division are simultaneously performed in a descending order starting with the most significant digit, permitting high-speed computation. In the present invention, the quotient calculator 9 is separated from the multiplier-divider 7; this is one of features of the present invention which distinguishes it over the prior art. Since the quotient calculator 9 is separated, signal lines 19 to 24 for connecting the quotient calculator 9 to other parts are added. The part except for the quotient calculator 9 in FIG. 2, that is, the part identified by 25' will hereinafter be called a "sliceable section". It will be evident that, with such an arrangement as shown in FIG. 2, the calculation for cryptography can be conducted by the exponentiation procedure as is the case with the prior art example of FIG. 1. In this case, since Eqs. (5) and (6) are used, the signal $M_2$ becomes a signal $M_{2,j}$.

Figure 3:
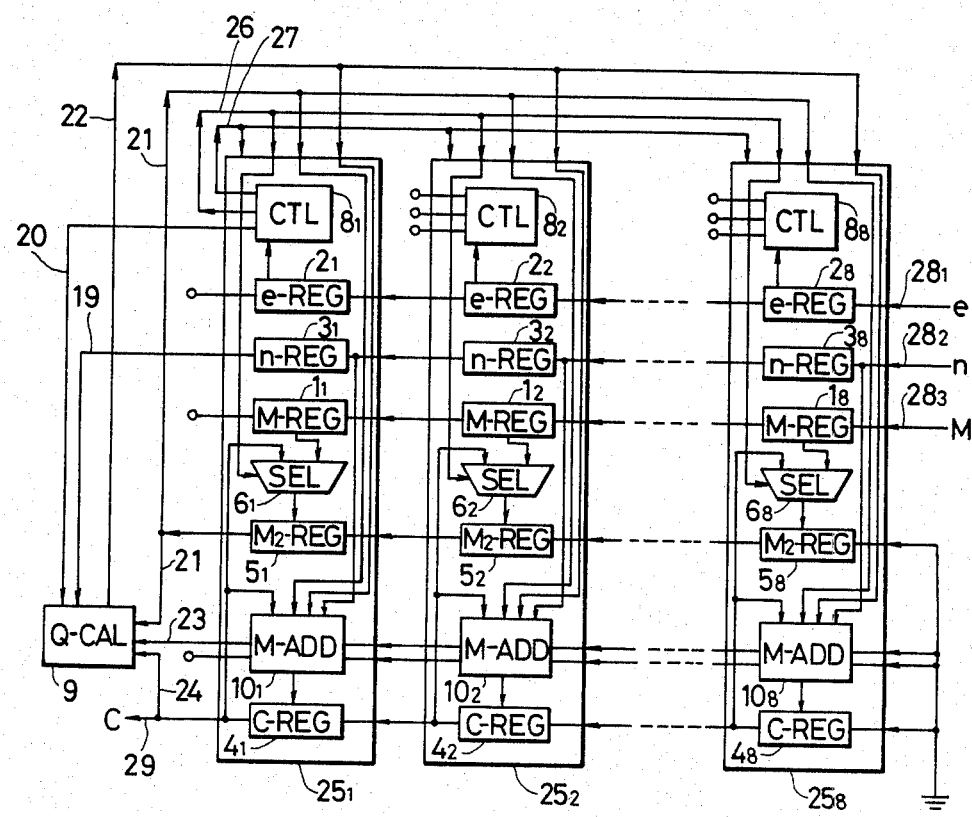
FIG. 3 is a block diagram showing the principle of dividing a main adding unit.

FIG. 3 shows the principle of divisional arrangement of the cryptosystem of the present invention. In the sliceable section 25' in FIG. 2, the parts except for the controller 8 are each divided into, for example, eight and the eight groups are each provided with one controller 8 to constitute eight sliced sections $25_1$ to $25_8$. Here, the division into eight is to divide, for example, the M-register 1 of 512-bit length by 64 bits to form eight 64-bit registers $1_1$ to $1_8$, by which 512-bit information is represented. The registers 2, 3, 4 and 5 are respectively divided into registers $2_1$ to $2_8$, $3_1$ to $3_8$, $4_1$ to $4_8$ and $5_1$ to $5_8$. The selector 6 is similarly divided into eight. Also the main adder 10 in FIG. 2 is divided into eight and each processes 64-bit information divided from 512-bit information. Signal lines 26 and 27 are necessitated as a result of the division of the sliceable section 25'. Signal lines $28_1$, $28_2$ and $28_3$ are input signal lines for the variables e, n and M, and a signal line 29 is an output signal line for the variable C. In this way, the sliceable section can easily be divided because the quotient calculator 9 is not included therein. The cryptosystem of an embodiment of the present invention based on the principle shown in FIG. 3, comprises a plurality of sliced sections obtained by equally dividing the sliceable section 25' of the cryptosystem of FIG. 2 and combining each sliced section with the controller 8, and one quotient calculator. This arrangement has the following features.

The sliceable section 25' in FIG. 2 is difficult to fabricate as one chip through using the present LSI technology because it requires 100 to 200K gates when materialized as a hardware. According to this embodiment, however, the sliced sections $25_1$ to $25_8$ are each on the order of 15 to 30K gates, and hence can be implemented by the existing LSI technology. At the same time, since these sliced sections may be formed by the same type of chips, the number of processes involved in the design of the cryptosystem is small, reducing the manufacturing costs.

Furthermore, by increasing or decreasing the number of sliced sections, it is possible to implement cryptosystems at low cost which have various lengths of the encryption and/or decryption keys n and e. A description will be given later in this connection.

In the foregoing, the sliced sections $25_1$ to $25_8$ are each described as to handle 64-bit information but, strictly speaking, the main adder handles 66 bits and 64 bits of them are used for the purpose described previously. This will be described later. The quotient calculator 9 can be divided into a quotient pre-processing section and a quotient post-processing section in accordance with the nature of its processing. The signal lines 26, 21 and 22 will hereinafter be referred to as the exponentiation control signal line, the multiplication control signal line and the division control signal line, respectively.

SYMBOLIZATION CONVENTIONS

Prior to a detailed description of the invention, a description will be given of symbols used for showing various functions in the drawings.

Figure 4A:
FIGS. 4A to 4Z and 5A to 5Q illustrate symbols of various functions used in the drawings.
Figure 4B:
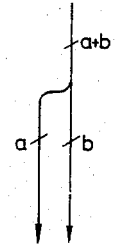
Figure 4C:
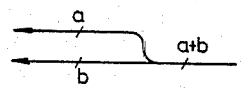
Figure 4D:
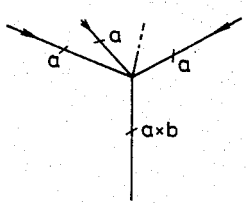

FIG. 4A shows that a terminal 30 of a signal line is not connected to any parts, that is, an open terminal. Incidentally, the signal line is usually composed of more than one signal lines and, in this case, the open terminal represents plural open terminals. FIG. 4B shows that a+b signal lines (a=1, 2, . . . and b=1, 2, . . . ) are branched into a and b signal lines. In this case, the left-hand a signal lines transmit an a-digit signal from the most significant digit side of the a+b signal lines, represented as a binary number, whereas the right-hand b signal lines similarly transmit a b-digit signal from the least significant side. The arrows of the signal lines indicate the direction of signal transmission. This is common to all the accompanying drawings. When the branching is indicated by lateral lines as seen in FIG. 4C, the upper side indicates the higher-order digit. That is, in the case of a signal represented as a binary number, the signal line on the right-hand side in the direction of the signal transmission indicates the most significant digit and the signal line on the left side the least significant digit. FIG. 4D shows that b groups of signal lines, each including a lines, are described en bloc.

Figure 4E:
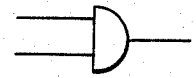

FIG. 4E shows an AND logic of two inputs. This also applies to an AND logic of three or more inputs.

Figure 4F:
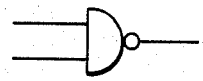
Figure 4G:
Figure 4H:
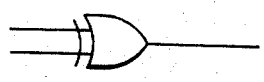
Figure 4I:
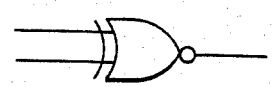
Figure 4J:
Figure 4K:
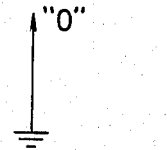
Figure 4L:
Figure 4M:
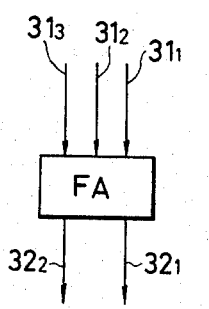

FIG. 4F shows a NAND logic of two inputs. This also applies to a NAND logic of three or more inputs. FIG. 4H shows an exclusive OR and FIG. 4I NOT of the exclusive OR. FIG. 4J shows NOT logic. FIG. 4K shows that a signal value "0" is provided. FIG. 4L shows that a signal value "1" is provided. FIG. 4M shows a one-bit full adder. Letting signals on signal lines $31_1$, $31_2$ and $31_3$ be represented by A, B and C (A=0,1, B=0,1, C=0,1), respectively, data on the signal lines $32_1$ is indicated by A⊕B⊕C (where ⊕ is exclusive OR) and data on the signal line $32_2$ is A·B+B·C+C·A (where · is AND and + is OR).

Figure 4N:
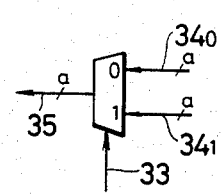
Figure 4P:
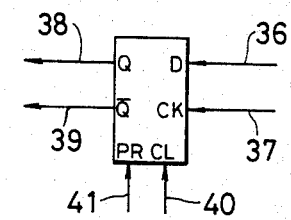
Figure 4Q:
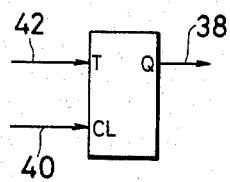
Figure 4R:
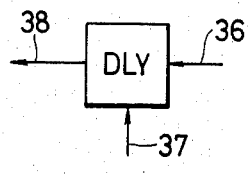
Figure 4S:
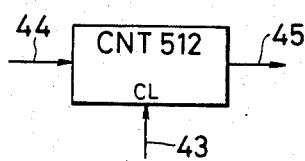
Figure 4T:
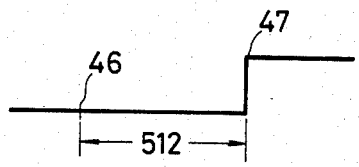

FIG. 4N shows a two-input selector. Two input signal lines $34_0$ and $34_1$ and an output signal line 35 are all composed of a (a=1, 2, . . . ) signal lines. When a selector input switching signal on a selector input signal switching signal line 33 is 1, the signal $34_1$ is selected and when the signal on the signal line 33 is 0, the signal line $34_0$ is selected. FIG. 4P shows a master-slave D flip-flop, which has at least an input signal line 36 connected to its data terminal D, an input signal line 37 connected to its clock terminal and an output signal line 38 connected to its Q terminal. In some cases, the flip-flop is further provided with an output signal line 39 connected to its $\overline{Q}$ terminal, a clear signal line 40 and a preset signal line 41. Upon application of a signal "1" from the clear signal line 40, an output signal on the output signal line 38 becomes "0", and when a signal "1" is applied from the preset signal line 41, the output signal on the output signal line 38 becomes "1". This flip-flop reads therein data on the line 36 upon rising of a clock signal on the line 37. FIG. 4Q shows a trigger flip-flop, which has a trigger input signal line 42, a clear signal input signal line 40 and an output signal line 38 connected to its Q terminal, and the sign of the output Q is inverted upon rising of the trigger input to the flip-flop. FIG. 4R shows another symbol of the master-slave D flip-flop of FIG. 4P. This is used when the flip-flop is employed as a one-clock delay circuit. FIG. 4S shows a counter, which has a clear signal line 43, an input signal line 44 for pulses to be counted and an output signal line 45 on which a signal "1" is retained after counting a 513th input pulse. The numeral "512" of CNT512 means that this counter counts pulses 512 times and the 513th pulse causes to output "1". FIG. 4T is explanatory of the operation of the counter shown in FIG. 4S. After supplied with a clear signal at a moment 46, the counter CNT512 counts pulses 512 times and, upon detection of the 513th pulse, its output signal becomes "1" at that moment 47. As the counter, there are those which count pulses 128 times, six times and twice, respectively. These counters are indicated by CNT128, CNT6 and CNT2 in the same manner as in the case of FIG. 4S.

Figure 4U:
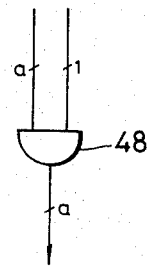
Figure 4V:
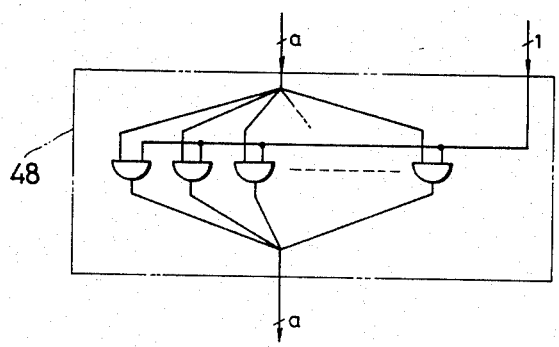
Figure 4W:
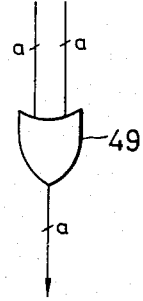
Figure 4X:
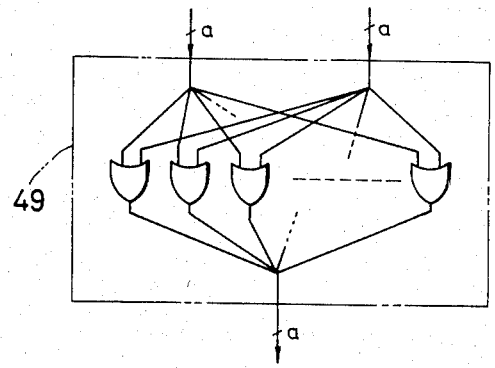
Figure 4Y:
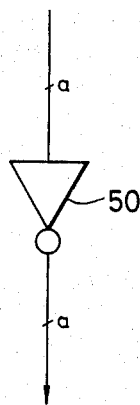
Figure 4Z:
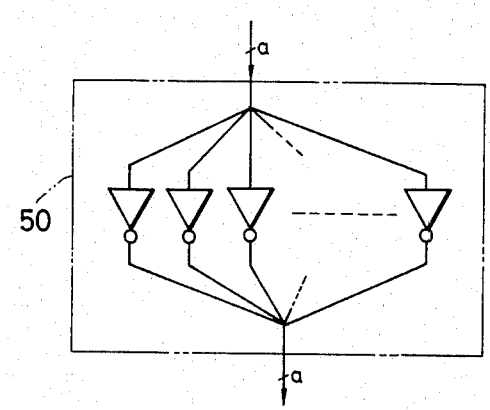
Figure 5A:
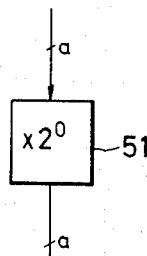
Figure 5B:
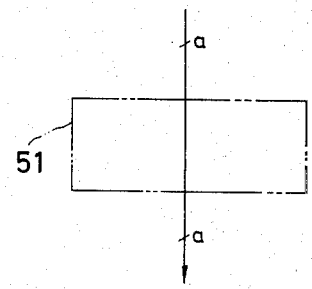
Figure 5C:
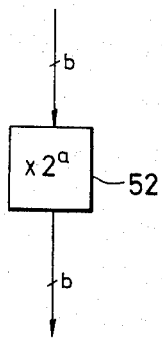
Figure 5D:
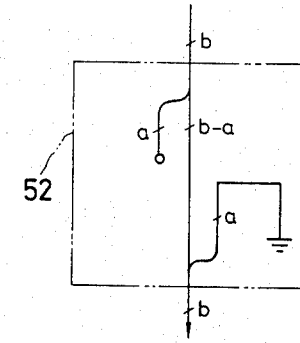
Figure 5E:
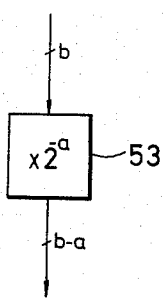
Figure 5F:
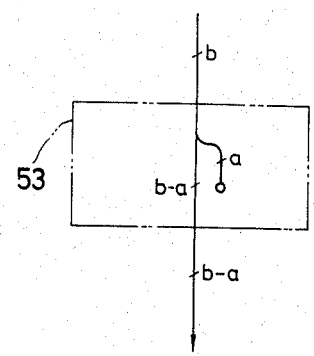
Figure 5G:
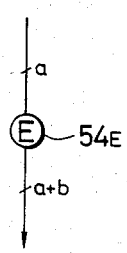
Figure 5H:
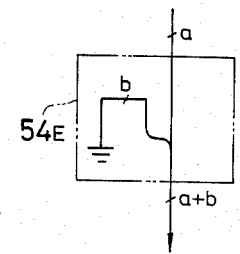
Figure 5I:
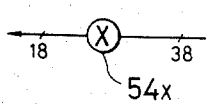
Figure 5J:
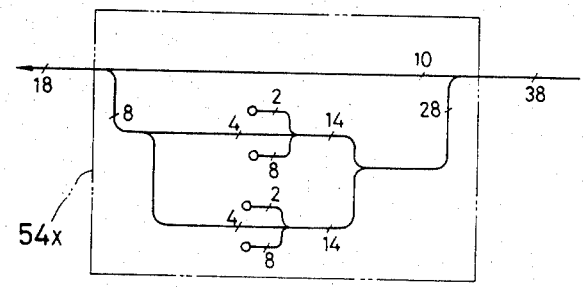
Figure 5K:
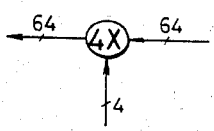
Figure 5L:
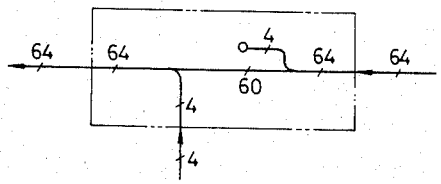

FIG. 4U shows en bloc a (a=1, 2, . . . ) ANDs as illustrated in FIG. 4V. FIG. 4W shows en bloc a (a=1, 2, . . . ) ORs as depicted in FIG. 4X. FIG. 4Y shows en bloc a (a=1, 2, . . . ) NOTs as depicted in FIG. 4Z. FIG. 5A is identical with FIG. 5B, in which input and output lines are directly connected. FIG. 5L shows that a b-bit input is shifted up by a bits (where b>a) as shown in FIG. 5D. FIG. 5E shows that a b-bit input is shifted down by a bits and outputted as (b−a) bits (where b>a) as depicted in FIG. 5F. FIG. 5G shows that an a-bit input is outputted with a zero added to its high-order side as depicted in FIG. 5H. FIG. 5I shows that high-order 10 bits of a 38-bit input are outputted as they are, and that the low-order 28 bits are divided into two by steps of 14 bits and four bits between high-order two bits and low-order eight bits of each group are outputted together with the abovesaid high-order 10 bits, as illustrated in FIG. 5J. FIG. 5K shows that high-order four-bits of a 64-bit input are removed therefrom and four bits are added to the low-order side thereof to obtain a 64-bit output as illustrated in FIG. 5L.

Figure 5M:
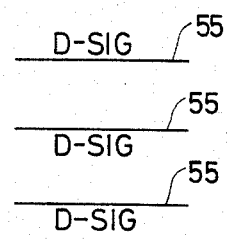
Figure 5N:
Figure 5P:
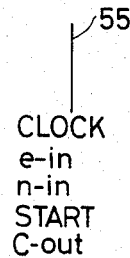
Figure 5Q:
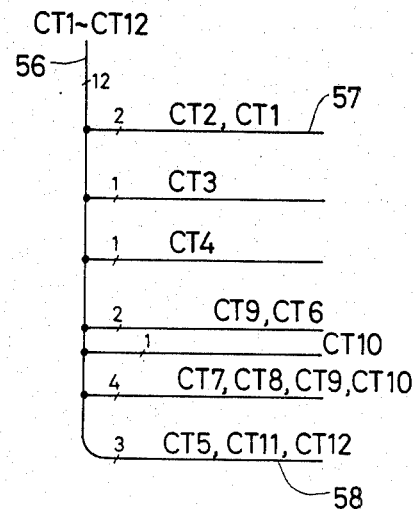

FIG. 5M shows that the name of a signal on a signal line 55 is D-SIG. FIG. 5N shows that 12 kinds of control signals are present on the signal line 55, and their names are CT1 to CT12. FIG. 5P shows that five signals are provided on the signal line 55, and that their names are CLOCK, e-in, n-in, START and C-out, respectively. FIG. 5Q shows that the number of signals on a signal line 56 is 12, that they are named CT1 to CT12, respectively, and that they are branched into two signals CT2 and CT1 on a signal line 57, ... three signals CT5, CT11 and CT12 on a signal line 58, and so forth.

The signal value on the signal line is indicated by binary logic "0" or "1", or a binary integer represented as a 2's complement.

GENERAL ARRANGEMENT OF EMBODIMENT

FIG. 6 illustrates the general arrangement of an embodiment of the present invention, in which the parts corresponding to those in FIG. 3 are identified by the same reference numerals and characters. The quotient calculating unit 9 is divided into a quotient calculating pre-processing section 60 and a quotient calculating post-processing section 61, and these processing sections 60 and 61 are interconnected via a signal line 62. The sliced sections $25_1$ to $25_8$ are provided with input signal lines $63_1$ to $63_8$, $65_1$ to $65_8$ and $67_1$ to $67_8$ and output signal lines $64_1$ to $64_8$, respectively. The input signal lines $67_1$ to $67_7$ are grounded and input a signal value "0", and the input signal line $67_8$ inputs a signal value "1". The signal value "1" on the signal line $67_8$ means that the sliced section $25_8$ is the remotest from the quotient calculating unit 9 and on the side of the least significant digit among the sliced sections. Supplied with the signal value "1", one part of the sliced section $25_8$ performs a special operation different from operations of the sliced sections $25_1$ to $25_7$. This will be described later. Reference numerals $8_1$ to $8_8$ designate controllers 8 in the individual sliced sections $25_1$ to $25_8$.

Following the principle of the present invention, the cryptosystem of FIG. 6 is supplied with the variables e, n and M from the input signal lines $28_1$, $28_2$ and $28_3$ and performs the operation $C \equiv M^e$ mod n to provide the variable C on the output signal line 29. Similarly the variables d, n and C are applied from the input signal lines $28_1$, $28_2$ and $28_3$ to the cryptosystem when implementing the operation $m \equiv C^d$ mod n, providing the variable M on the output signal line 29.

The cryptosystem receives an operation control signal from the input signal line $63_1$ and the controller $8_1$ generates a control signal for the entire cryptosystem. The controllers $8_2$ to $8_8$ do not operate. In other words, the sliced sections $25_1$ to $25_8$ are made identical in construction and one of the controllers is used. Therefore, instead of providing a controller in each sliced section, a single controller may be separately provided from the sliced sections as is the case of the quotient calculating unit 9.

The operative state of the cryptosystem is reported to the outside via the output signal line $64_1$. Various control signals necessary for calculations for cryptography are produced not only by the controller $8_1$ but also by the quotient calculation post-processing section 61 and other parts in the sliced section $25_1$ than the controller $8_1$. The names of signals on the exponentiation control signal line 26, the multiplication control signal line 21 and the division control signal line 22 are EXP-SEL, M-SIG and D-SIG, respectively. The signal line 27 includes 12 lines and their names are CT1 to CT12, respectively.

QUOTIENT CALCULATION PRE-PROCESSING SECTION

Figure 7:
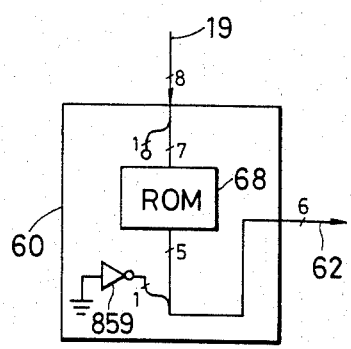
FIG. 7 is a block diagram showing an example of a quotient calculating pre-processing section 60 used in FIG. 6.

FIG. 7 illustrates the quotient calculation pre-processing section, which is formed by a read only memory (ROM) 68. ROM 68 is used instead of the operation of Eq. (15). When a value $[n \cdot 2^{-504}]$ is provided as an address on the signal line 19, ROM 68 provides on the signal line 62 a value $[2^{13} \div [n \cdot 2^{-504}]]$ precalculated and stored therein. With such an arrangement, the value of v calculated by Eq. (15) can be obtained on the signal line 62 by applying high-order bits of the variable n.

QUOTIENT CALCULATION POST-PROCESSING SECTION

Figure 8:
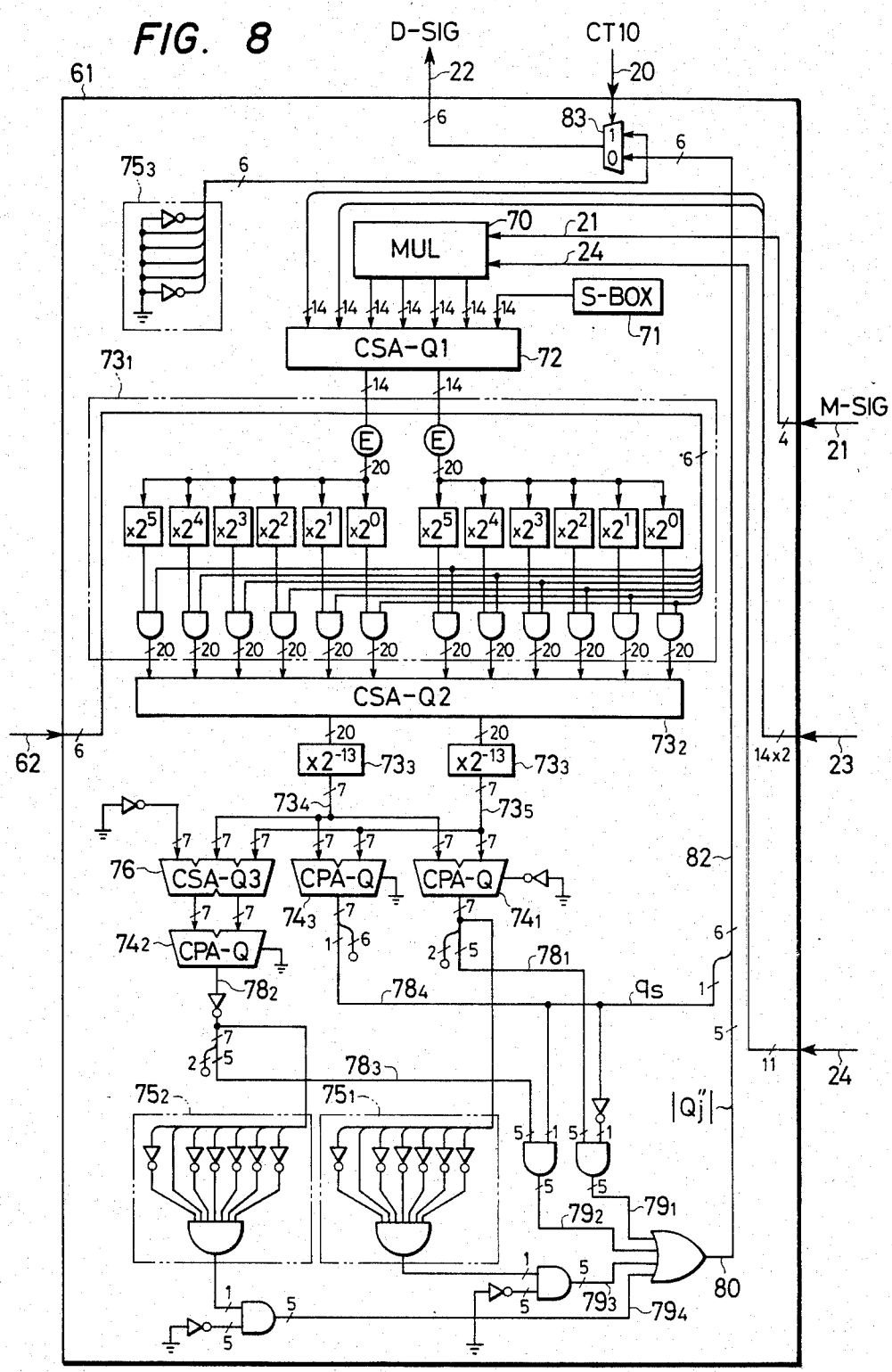
FIG. 8 is a block diagram showing an example of a quotient calculating post-processing section 61 used in FIG. 6.

FIG. 8 illustrates the general arrangement of the quotient calculation post-processing section 61, which performs the operations of Eqs. (18) and (19). The signal M-SIG on the multiplication control signal line 21 is composed of four signals, each having a signal value $\delta_{4(j-1)+i} \cdot 2^i$ (i=0,1,2,3). Incidentally, $$\sum_{i=0}^{3} \delta_{4(j-1)+i} \cdot 2^i = M_{2,j}$$

is apparent from Eq. (14). From the input signal line 24 is applied a value of high-order 11 bits of $M_1$, obtained by discarding low-order 501 bits of $M_1$ represented by 512 bits in Eq. (18); from the input signal line 23 is applied a binary signal value of 14 bits obtained by discarding low-order 500 bits of $R_{j+1,i}$ (i=0,1) represented by 514 bits in Eq. (18). An AND element group 70 performs ANDing of $M_1$ and $\delta_{4(j-1)+i} \cdot 2^i \cdot 2^{-504}$ (i=0,1,2,3,4) in Eq. (18); a logic circuit 71 produces the constant 38 in Eq. (18); and a carry save adder (CSA-Q1) performs the addition in Eq. (18) to calculate the value of $X_j''$. A carry save adder (CSA-Q2) 72 has seven inputs and two outputs, all of which are binary integers of 14-bit width. An AND element group 73, performs the AND-operation necessary for the calculation of $X_j'' \times v$ in Eq. (19). That is, the AND element group $73_1$ is supplied with the value v of six-bit width from the signal line 62 and the value $X_j''$ from an adder 72 and performs ANDing of each digit of v represented as a binary number and each digit of $X_j''$ represented as a binary number.

The results of the ANDing are added by a 12-input, 2-output carry save adder (CSA-Q2) $73_2$ to obtain the value $X_j'' \times v$. Each output from the adder $73_2$ is applied to a circuit $73_3$ in which 13 bits are discarded from it, and a value $[X_j'' \times v \times 2^{13}]$ is obtained as the sum of signals which are provided on signal lines $73_4$ and $73_5$. The signals on the signal lines $73_4$ and $73_5$ are respectively added in one-output carry propagation adders $74_1$ and $74_3$, and the signals on the signal lines $73_4$ and $73_5$ and $-1$ are added together in three-input, two-output carry save adder (CSA-Q3) 76. The addition results are added in the carry propagation adder $74_2$.

On an output signal line $78_1$ of the adder $74_1$ is provided a value $[X_j'' \times v \times 2^{-13}]+1$. While on an output signal line $78_2$ of the adder $74_2$ is provided a value $[X_j'' \times v \times 2^{-13}]-1$. The signal on the signal line $78_2$ is inverted, providing on a signal line $78_3$ the binary value $[X_j'' \times v \times 2^{-13}]-1$ with its respective bits inverted, that is, the absolute value of $[X_j'' \times v \times 2^{-13}]$, i.e.

$|[X_j'' \times v \times 2^{-13}]|$. On a most significant bit output signal line $78_4$ of the adder $74_3$ is obtained a value "0" or "1" depending on whether the sign of $[X_j'' \times v \times 2^{-13}]$, i.e., the sign of $X_j''$ is $X_j'' \geq 0$ or $X_j'' < 0$. The AND of the inverted signal of the signal on the signal line $78_4$ and the signal on the signal line $78_1$ is obtained in the form of $[X_j'' \times v \times 2^{-13}]$ on a signal line $79_1$ when $X_j'' \geq 0$. The AND of the signals on the signal lines $78_4$ and $78_3$ is provided as $|[X_j'' \times v \times 2^{-13}]|$ on a signal line $79_2$ when $X_j'' < 0$. The signal on the signal line $78_1$ is applied to a 32-detector $75_1$, which provides a value $+31$ on a signal line $79_3$ when $X_j'' \geq 0$ and $[X_j'' \times v \times 2^{-13}]+1=32$. The inverted signal on the signal line $78_2$ is supplied to a 32 detector $75_2$ to provide a value $|-31|$ on a signal line $79_4$ when $X_j'' < 0$ and $|[X_j'' \times v \times 2^{-13}]|=32$. Since the range of $Q_j''$ is $-31 \leq Q_j'' \leq 31$, $|Q_j''|$ can be represented by five bits. The OR of the corresponding bits of the 5-bit signals on the signal lines $79_1$ to $79_4$ is provided on a signal line 80. The signal on the signal line 80 is composed of five bits of $|Q_j''|$ of $Q_j''$ defined in Eq. (19). On the signal line $78_4$ is provided a sign $q_s$ of $Q_j''$ which is "0" or "1" depending on whether $X_i'' \geq 0$, i.e. $Q_j'' \geq 0$, or $X_i'' < 0$, i.e. $Q_j'' < 0$. On a signal line 82 which is a combination of the signal lines 80 and $78_4$ there are provided the most significant bit in the form of $q_s$ and the other five bits in the form of $|Q_j''|$.

On the division control signal line 22 there are provided by the operation of as selector 83 the content of the signal line 82 when CT10=0 and "100001", i.e. $-1$, from a circuit $75_3$ when CT10=1.

For performing the operations of Eqs. (18) and (19), the quotient calculation post-processing section 61 is supplied with high-order $14 \times 2$ bits of $R_{j+1,i}$ (i=0,1) from the signal line 23, high-order 11 bits of $M_1$ from the signal line 24 and four bits of $\delta_{4(j+1)+i} \cdot 2^i$ (i=0,1,2,3) from the signal line 21. The quotient calculation post-processing section 61 calculates $X_j''$ in accordance with Eq. (18) and calculates $Q_j''$ by Eq. (19) in accordance with the condition whether the next $X_j'' \geq 0$ or $X_j'' < 0$. When CT10=0, the absolute value $|Q_j''|$ of $Q_j''$ is represented by five bits and the sign of $Q_j''$ is represented by one bit; namely, a total of six bits is provided on the division control signal line 22. In this case, however, the sign $q_s$ of $Q_j''$ is represented by 0 or 1 depending on whether $Q_j'' \geq 0$ or $Q_j'' < 0$. When CT10=1, the absolute value of $Q_j''$ is 1 and the sign $q_s$ of $Q_j''$ is 1.

DETAILS OF QUOTIENT CALCULATION POST-PROCESSING SECTION

Figure 9:
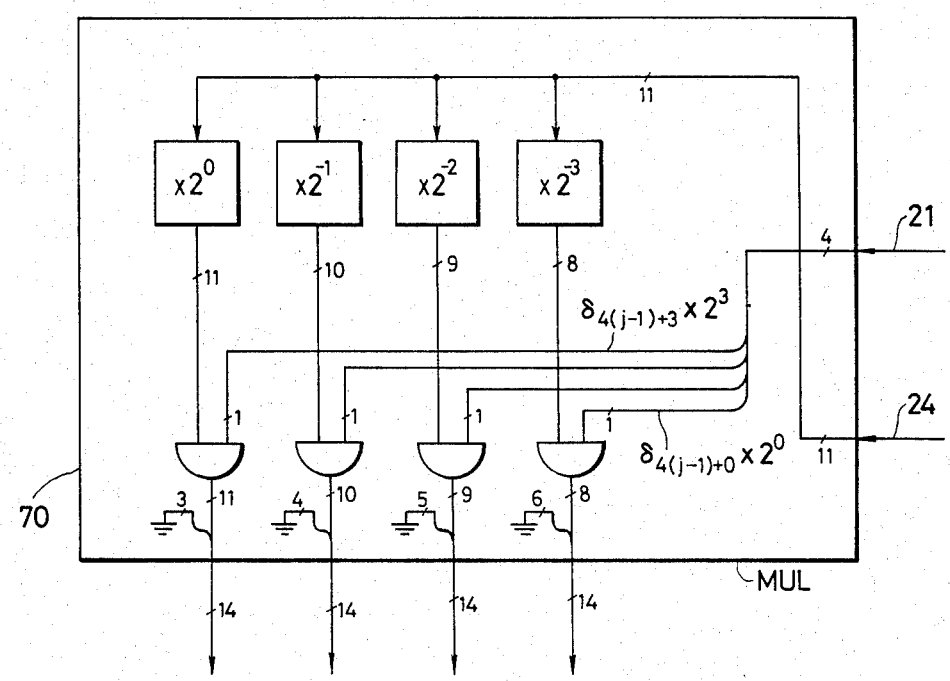
FIG. 9 is a diagram illustrating a specific example of an AND element group 70 used in FIG. 8.

FIG. 9 illustrates a specific example of the AND element group 70, in which $\delta_{4(j-1)+i} \cdot 2^i \cdot 2^{-504}$ (i=0,1,2,3) from the signal line 21 and $M_1$ of eleven bits from the signal line 24 are ANDed with each other, thereby to perform the operation $M_1 \cdot \delta_{4(j-1)+1} \cdot 2^i \cdot 2^{-504}$ in Eq. (18).

Figure 10:
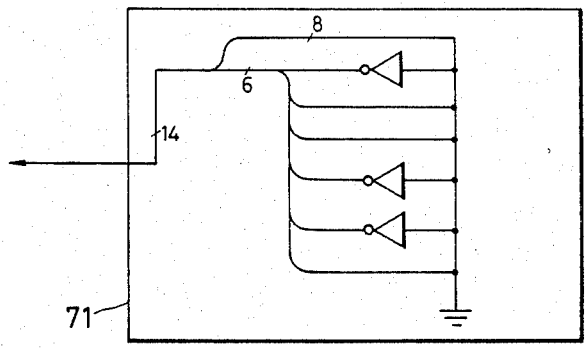
FIG. 10 is a diagram illustrating a specific example of a constant generator 71 utilized in FIG. 8.
Figure 11:
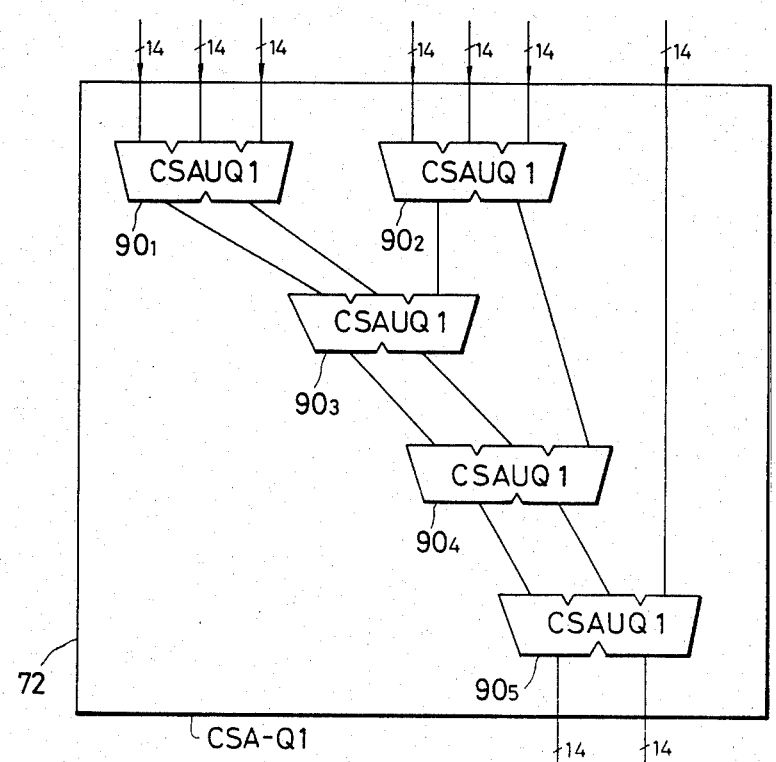
FIG. 11 is a diagram illustrating a specific example of an adder 72 employed in FIG. 8.
Figure 12:
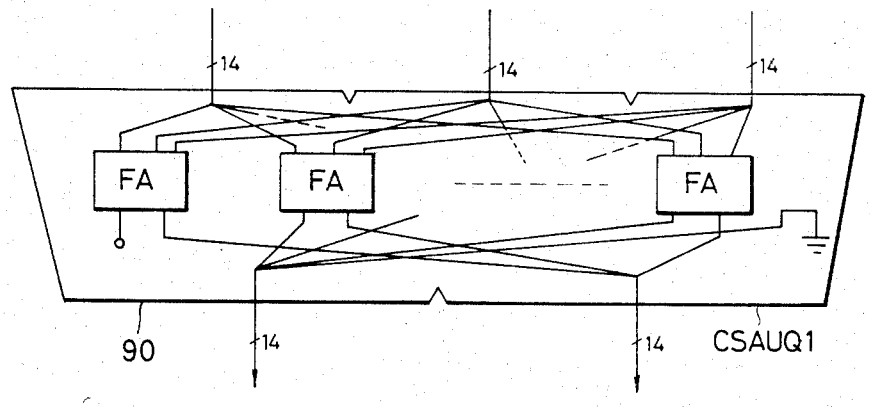
FIG. 12 is a diagram showing a specific example of a carry save adder CSAUQ1 used in FIG. 8.
Figure 13:
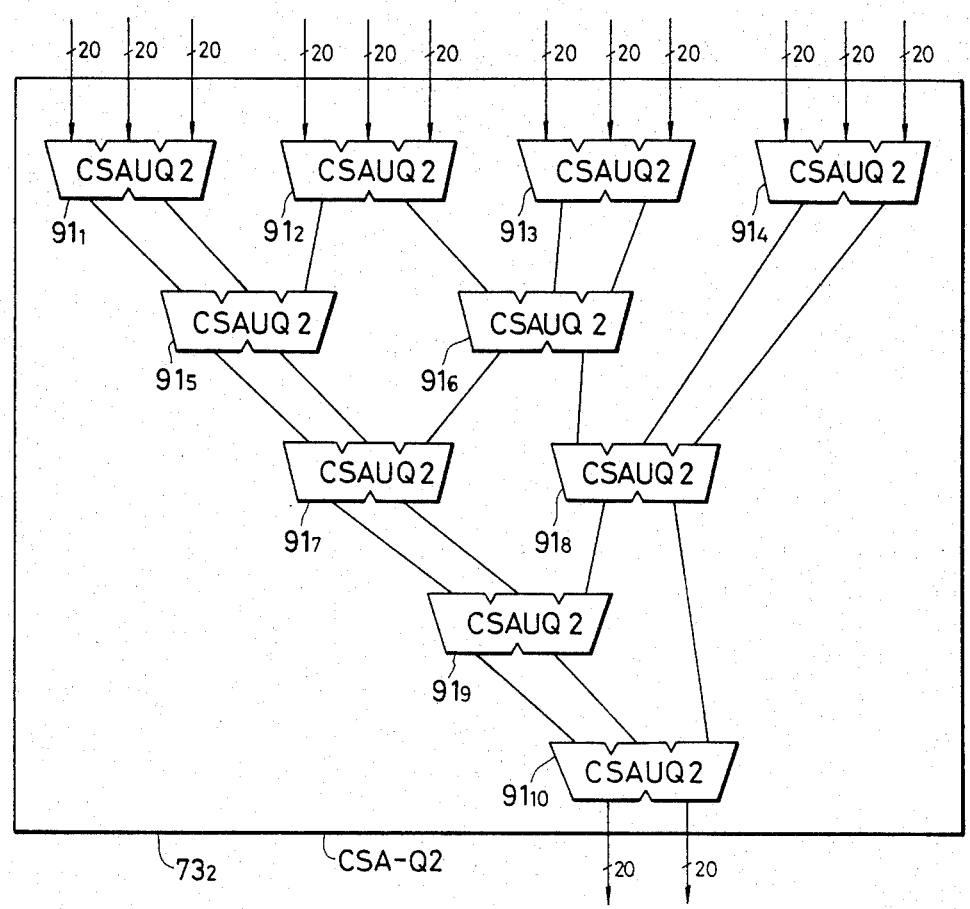
FIG. 13 is a diagram showing an example of an adder $73_2$ used in FIG. 8.

FIG. 10 illustrates a logic circuit 71 for producing the constant S=38 in Eq. (18). FIG. 11 shows a seven-input two-output carry save adder (CSA-Q1) 72, which is constituted by a combination of three-input two-output carry save adders (CSAUQ1) $90_1$ to $90_5$. Each of the three-input two-output carry save adders (CSAUQ1) $90_1$ to $90_5$ is arranged so that corresponding bits of the three inputs are respectively added by full adders of the same number as bits of each input, as shown in FIG. 12. FIG. 13 illustrates a 12-input two-output carry save adder (CSA-Q2) $73_2$, which is made up of three-input two-output carry save adders (CSAUQ2) $91_1$ to $91_{10}$.

Figure 14:
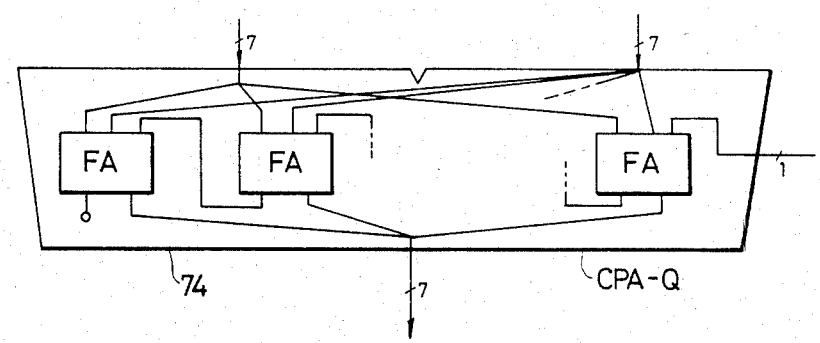
FIG. 14 is a diagram showing an example of an adder $74_1$, used in FIG. 8.

FIG. 14 illustrates, by way of example, one of the two-input one-output carry propagation adders $74_1$ to $74_3$, which is arranged so that corresponding bits of the two inputs are respectively added by full adders of the same number as bits of each input, and carry of each full adder is provided in ascending order.

Sliced Sections

Figure 15:
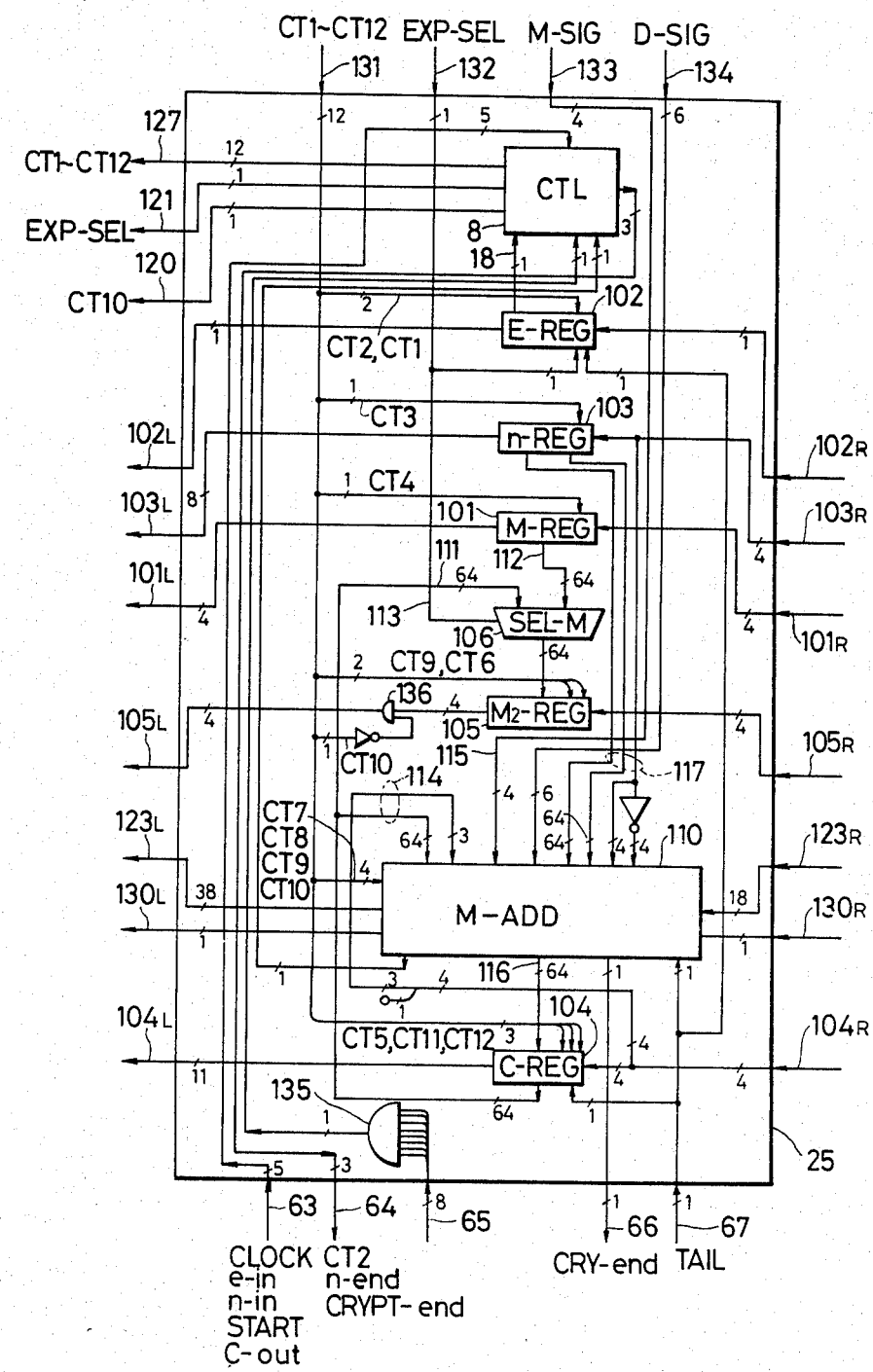
FIG. 15 is a block diagram illustrating a specific example of a slice section employed in FIG. 6.
Figure 16:
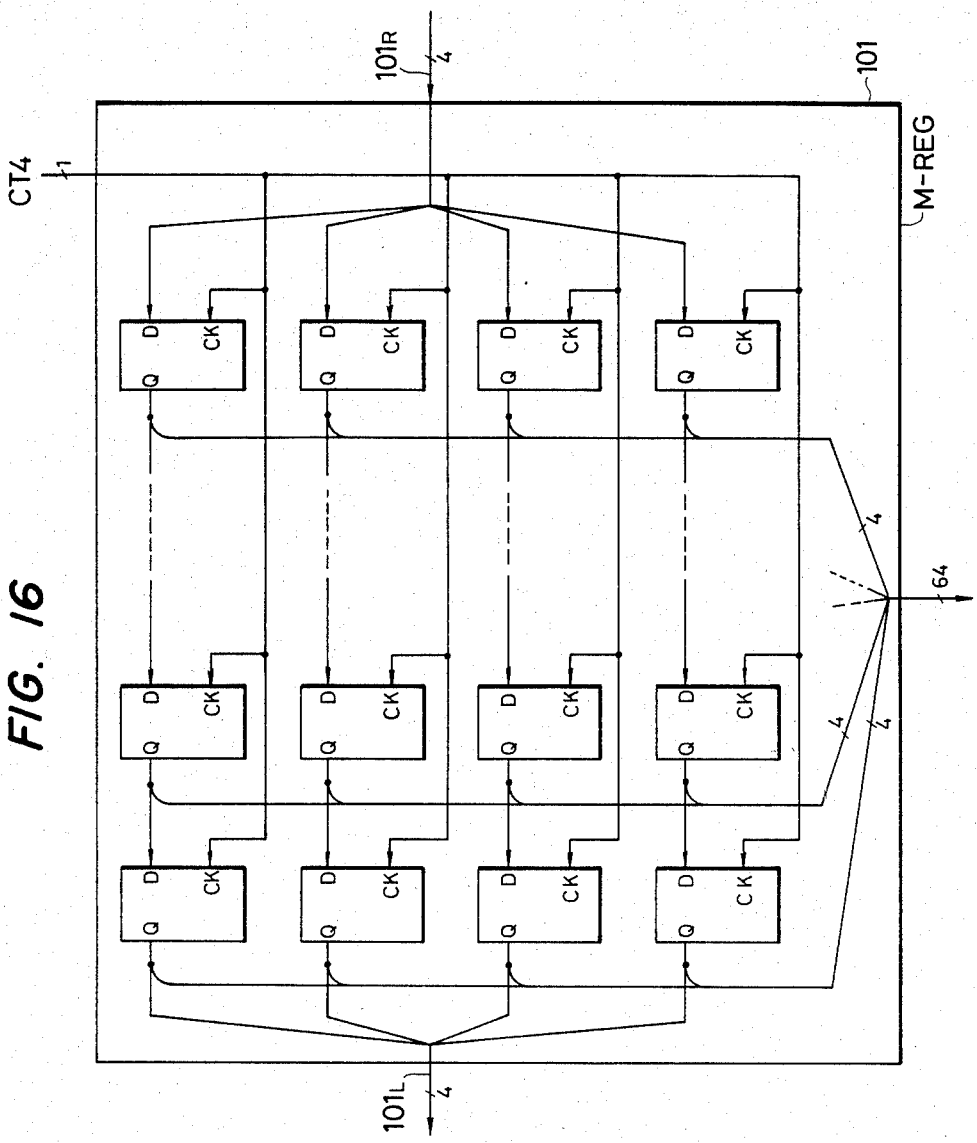
FIG. 16 is a diagram illustrating an example of an M register 101 utilized in FIG. 15.
Figure 17:
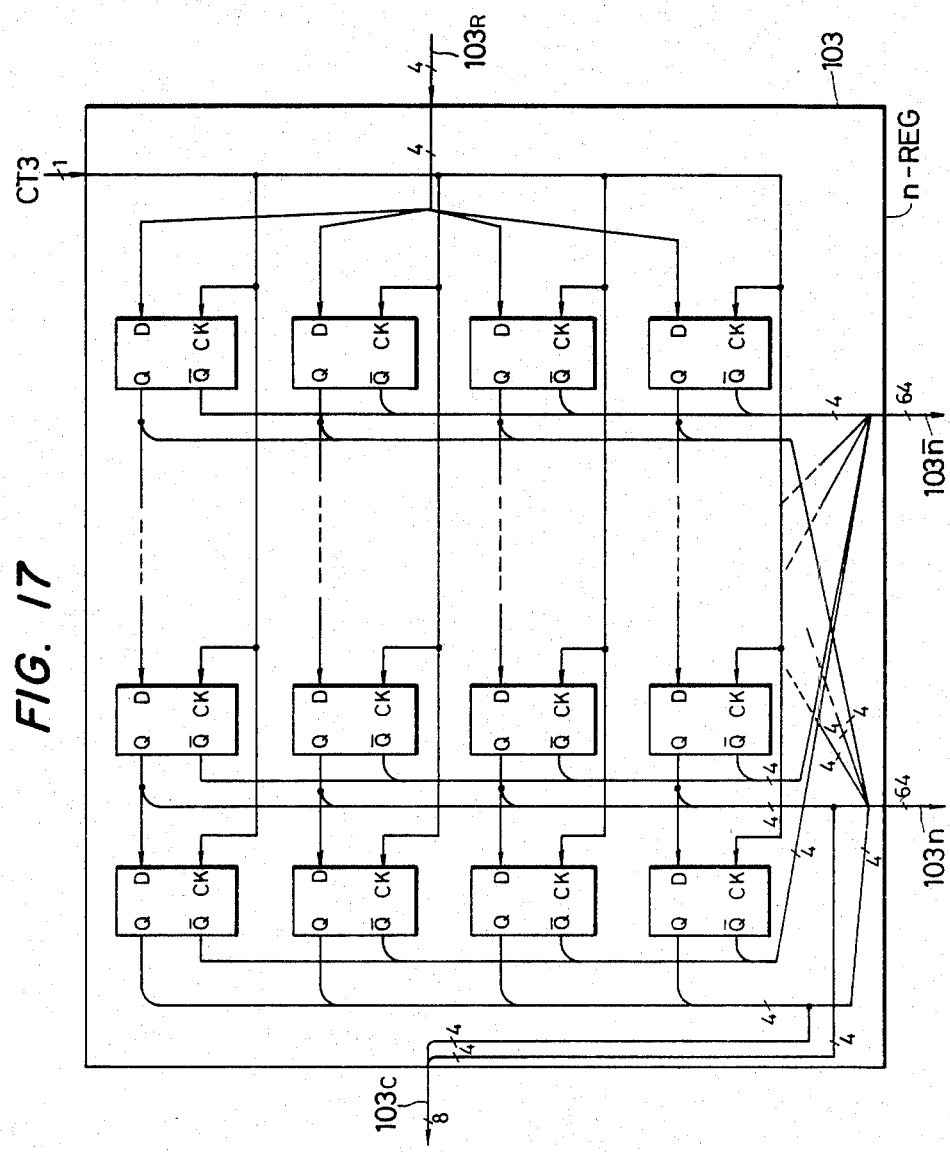
FIG. 17 is a diagram showing an example of an n register 103 employed in FIG. 15.
Figure 18:
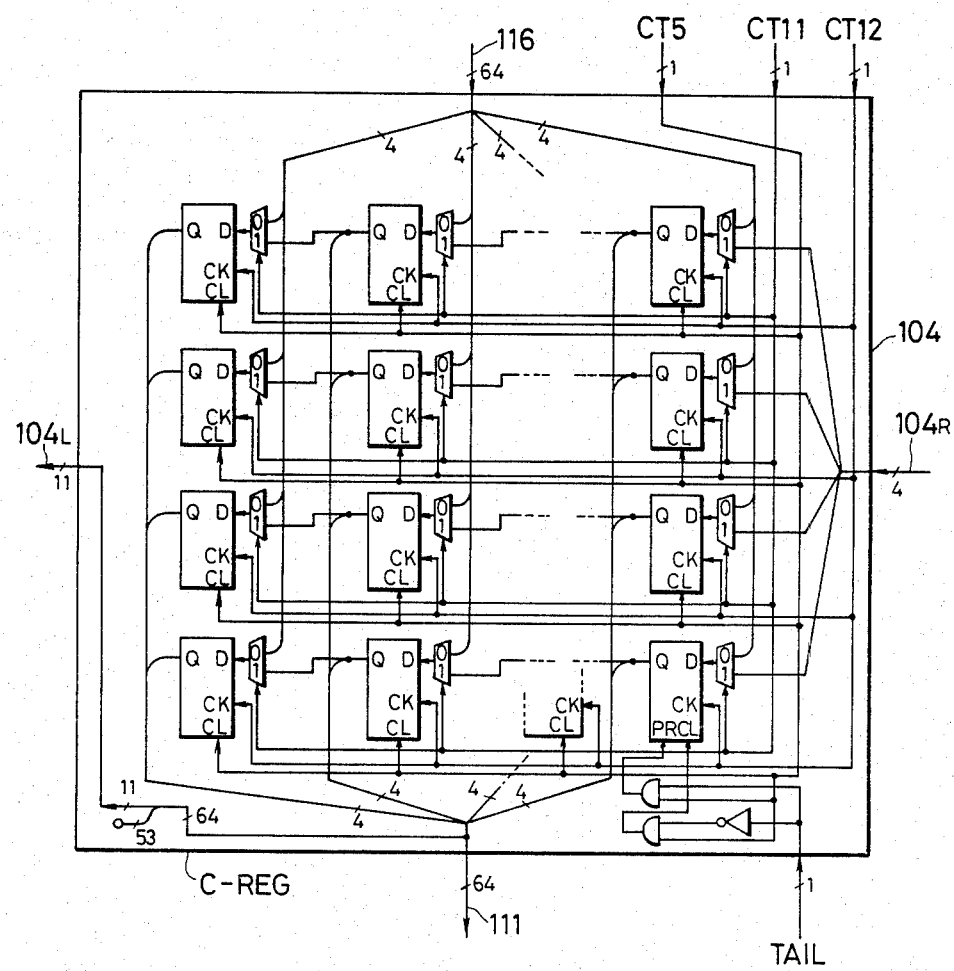
FIG. 18 is a diagram illustrating an example of a C register 104 used in FIG. 15.
Figure 19:
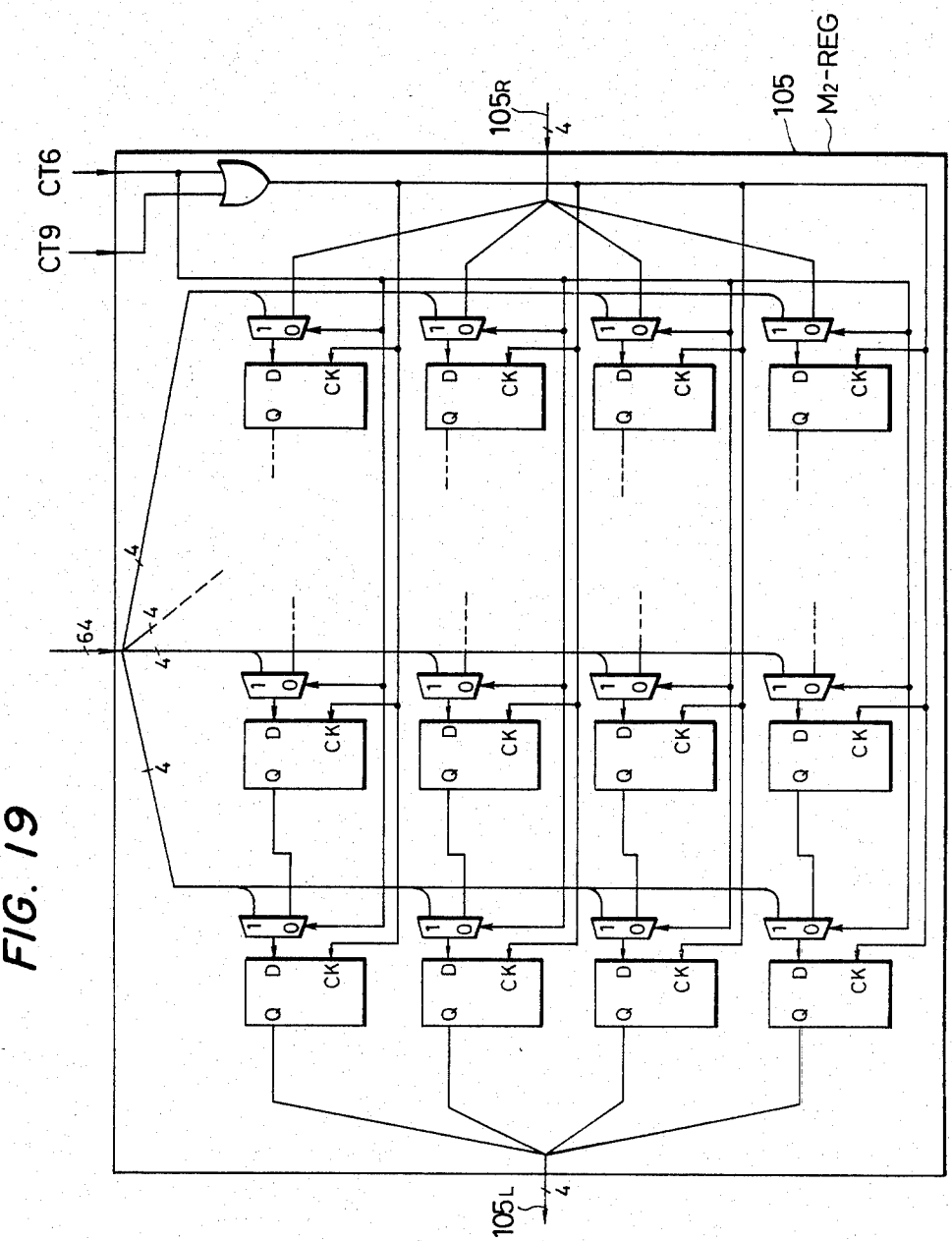
FIG. 19 is a diagram showing an example of an $M_2$ register 105 employed in FIG. 15.

FIG. 15 illustrates, by way of example, the arrangement of one of the sliced sections $25_1$ to $25_8$ in FIG. 6 in which there are provided registers 101, 102, 103, 104 and 105, each corresponding to one of the eight parts into which the M, e, n, C and $M_2$ registers 1, 2, 3, 4 and 5 are each divided. To the least significant ends of the registers 101 to 105 are respectively connected input signal lines $101_R$ to $105_R$ for supplying thereto signals from a lower-order sliced section. To the most significant ends of the registers 101 to 105 are connected output signal lines $101_L$ to $105_L$ for supplying therefrom signals to a higher-order sliced section. A selector 106, one of eight parts into which the selector 6 is divided, is provided, which is controlled by a signal on an input signal line 113. A main adder 110, one of eight parts into which the main adding section 10 for mainly performing the additions in Eqs. (20) and (23) is divided, is provided. Connected to the main adder 110 are input signal lines 114 and 115 and an output signal line 116. The content of the register 103 and a signal on the input signal line $103_R$ are provided via a signal line 117 to the main adder 110. The content of the most significant bit of the register 102 is applied via the signal line 18 to the controller 8.

Signals for controlling the operation of the sliced section are provided via the five input signal lines 63, and their signal names are CLOCK, e-in, n-in, START and C-out. The operative state of the sliced section is reported to the outside thereof via the three signal lines 64, and their signal names are CT2, n-end and CRYPT-end. A signal indicating the state of carry propagation of each of the plurality of sliced sections is applied via the input signal line 65, and a signal indicating the state of carry propagation in the main adder 110 is provided via the output signal line 66 to the outside of the sliced section, this signal name being CRY-end. A signal indicating that the sliced section 25 is the remotest from the quotient calculating unit 9 like the sliced section $25_8$ in FIG. 6, is provided via the signal line 67 and the name of this signal is TAIL. When the signal TAIL is "1", the sliced section 25 is the remotest from the quotient calculating unit 9. Following the exponentiation procedure the sliced section 25 executes Eqs. (16), (17) and (20) to (24) on the premise of Eq. (14). Eq. (15) is executed by the quotient calculation pre-processing section 60 and Eqs. (18) and (19) are executed by the quotient calculation post-processing section 61. In the case where the quotient calculating unit 9 and a plurality of sliced sections are connected as shown in FIG. 6, main signals of each sliced section and the calculation for cryptography bear such relationships as described below. Details of the signals will be described later.

The cryptosystem applies the variable e to the plurality of registers 102 (hereinafter referred to as the e-registers) of the plurality of sliced sections 25 upon application of the signal e-in from the control input signal line 63, applied the variable n to the plurality of registers 103 upon application of the signal n-in, and applies the variable M to the plurality of registers 101 upon application of the signal START. After application of the variable M, the e-registers 102 continue bit-by-bit circular left shifting until the most significant digit (MSD) of each e-register 102 becomes "1".

Next, upon application of the signal CT5, the cryptosystem performs the operation of Step 1 of the exponentiation procedure;

That is, the operation C←1 is executed.

Next, upon application of the signal CT6, the operation $M_2$←C in step 2a or $M_2$←M in step 2b of the exponentiation procedure is executed. (Here, $M_1$←C always holds on account of the arrangement of the cryptosystem.). Next, in the period in which the signal CT7 becomes "1", the multiplication and division $R \equiv M_1 \times M_2$ mod n in step 2a or 2b of the exponentiation procedure are executed and, upon application of a signal MDEND, the multiplication and division are finished. Then, C←R is established owing to the arrangement of the cryptosystem.

The execution of the multiplication and division $R \equiv M_1 \times M_2$ mod n based on the exponentiation procedure is controlled as follows: The value of the signal EXP-SEL is determined by each bit $e_i$ of the variable e. When the signal EXP-SEL is "0", step 2a of the exponentiation procedure is executed, and when the signal EXP-SEL is "1", step 2b of the exponentiation procedure is executed. Upon completion of the operation of Eq. (1), i.e. $C \equiv M^e$ mod n, by the above calculation, the value of the signal CRYPT-end is altered from "0" to "1" and, upon application of the signal C-out, the variable C obtained by the calculation for cryptography is outputted.

With such an arrangement, the calculation for cryptography can be achieved following the principle of the present invention by connecting the quotient calculating unit 9 and the plurality of sliced sections as shown in FIG. 6. The same is true of the case where the quotient calculating unit 9 is divided into the quotient calculation pre-processing section 60 and the quotient calculation post-processing section 61.

Details of Sliced Sections

Figure 20:
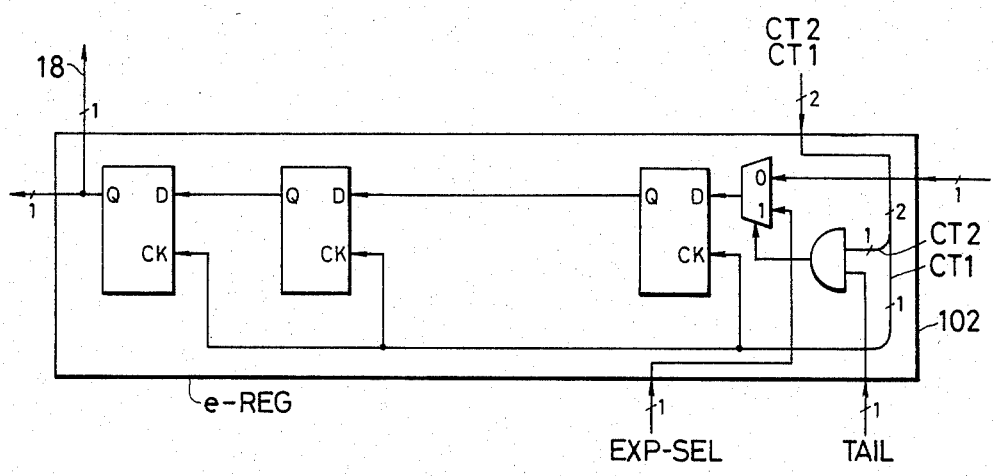
FIG. 20 is a diagram illustrating an example of an e register 102 used in FIG. 15.
Figure 21:
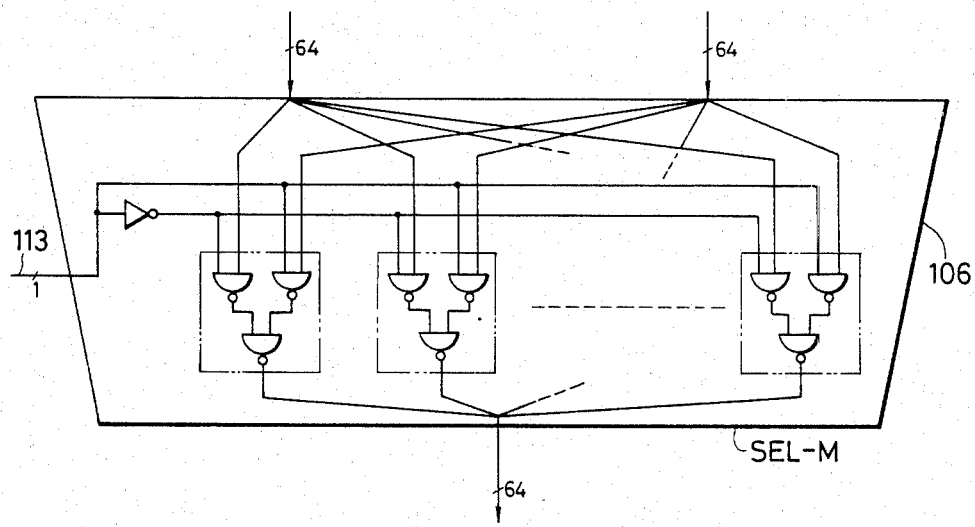
FIG. 21 is a diagram illustrating an example of a selector 106 utilized in FIG. 15.

The registers 101, 103, 104 and 105 are formed as four-bit parallel input-output shift registers, as shown in FIGS. 16, 17, 18 and 19, respectively, and they are shifted by signals CT4, CT3, CT12, and CT6 and CT9, respectively. The register 104 is capable of presetting in parallel a 64-bit signal from a signal line 116 under the control of the signal CT11. In the case where the signal TAIL is "1" when the signal CT5 is provided, "1" is preset only in the least significant bit of the register 104 and other bits are preset to "0", and where the signal TAIL is "0", the register 104 is entirely cleared by the application of CT5. The register 105 is also controlled by the signal CT6 and capable of presetting the 64-bit signal $M_2$ in parallel. The register 102 is constituted as a one-bit shift register as shown in FIG. 20 and it is shifted by the signal CT1. In the sliced section $25_8$, when the signal CT2 becomes "1", the register 102 is put in its circular operation. FIG. 21 illustrates a specific example of the selector 106.

Figure 23:
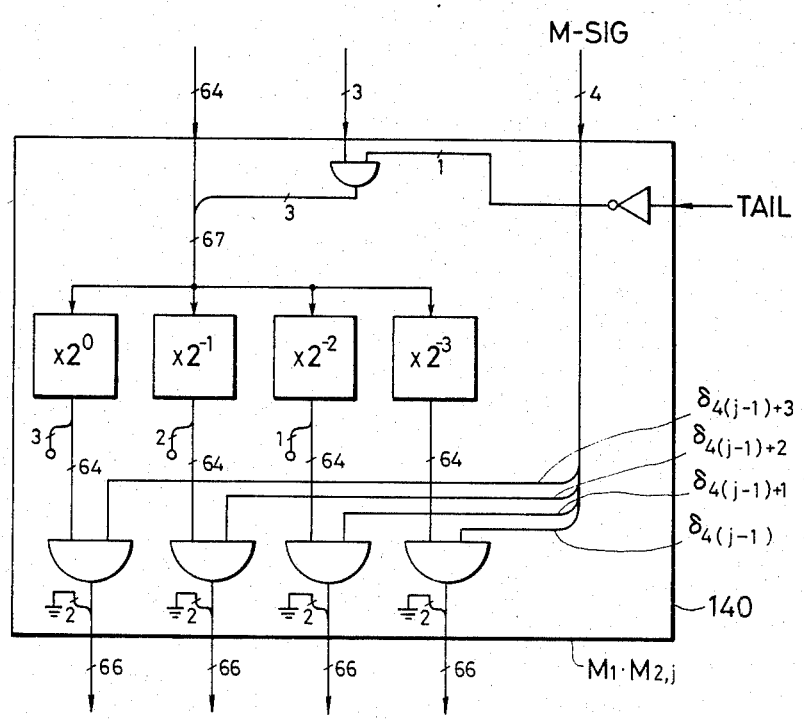
FIG. 23 is a diagram showing a specific example of an $M_1 \cdot M_{2,j}$ calculating section 140 used in FIG. 22.
Figure 24:
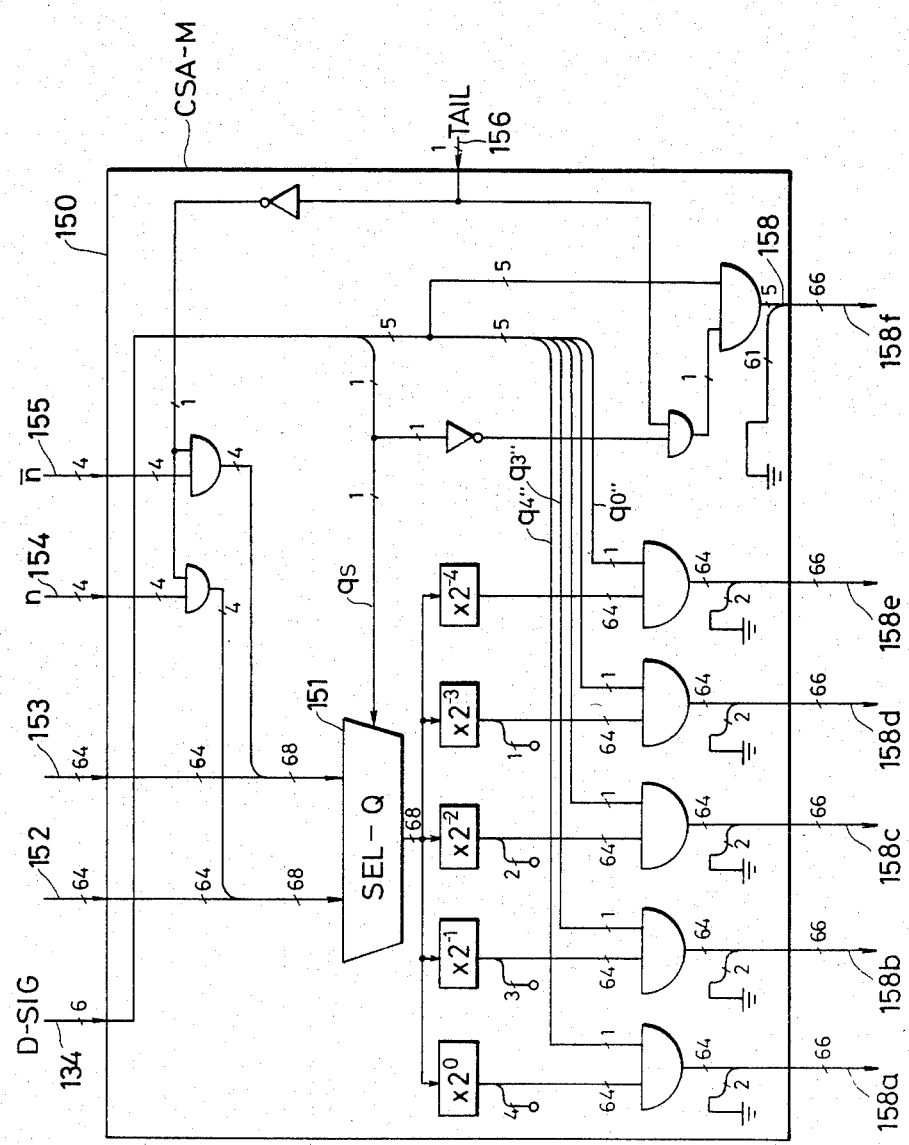
FIG. 24 is a diagram showing a specific example of a $-Q_j \cdot n$ calculating section 150 used in FIG. 22.
Figure 25:
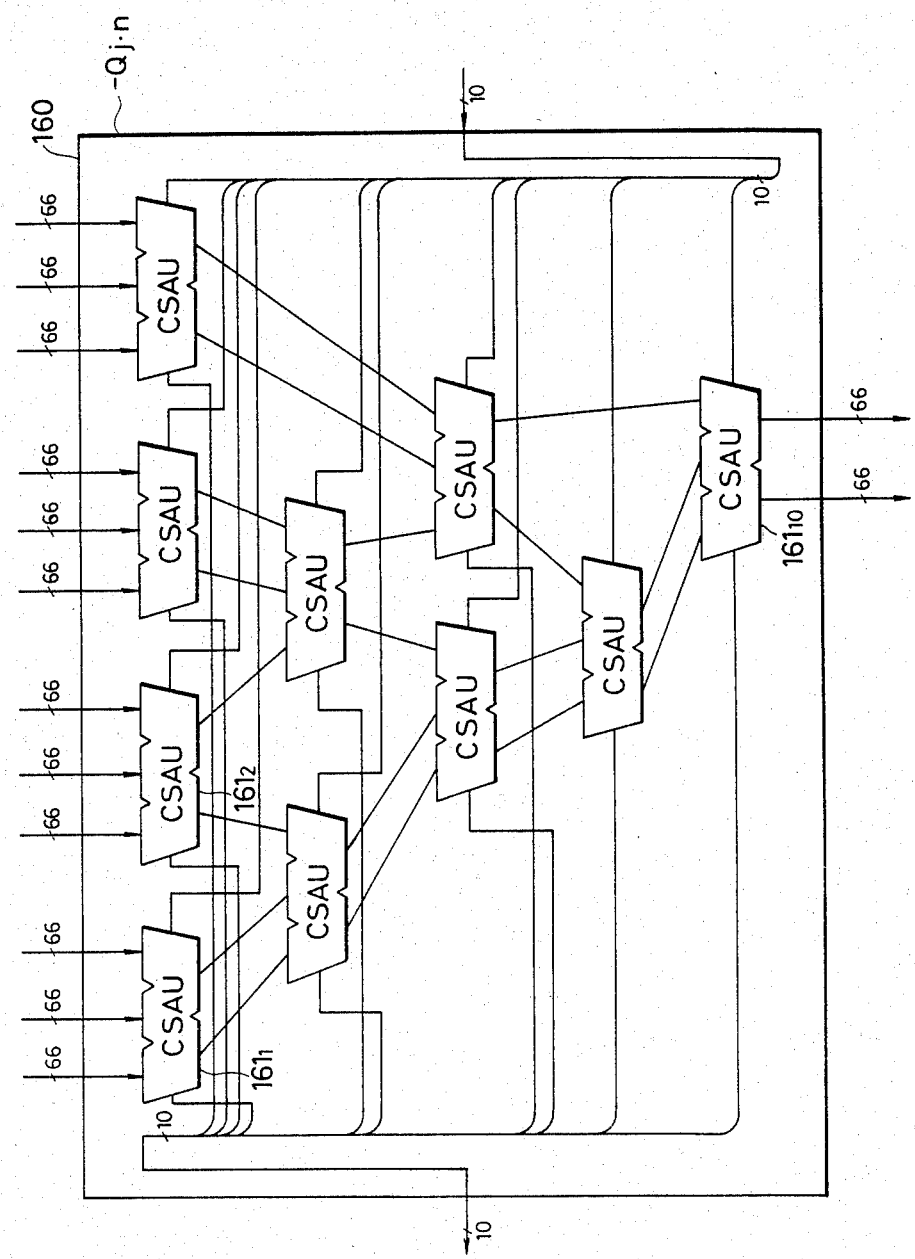
FIG. 25 is a diagram illustrating a specific example of an adding section 160 used in FIG. 22.
Figure 26:
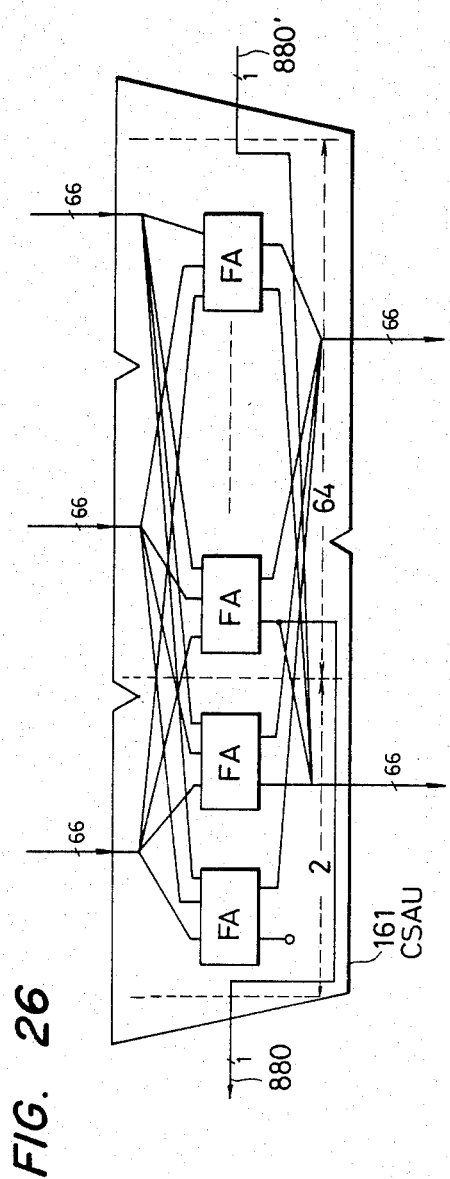
FIG. 26 is a diagram illustrating a specific example of a carry save adder 161 used in FIG. 25.
Figure 28:
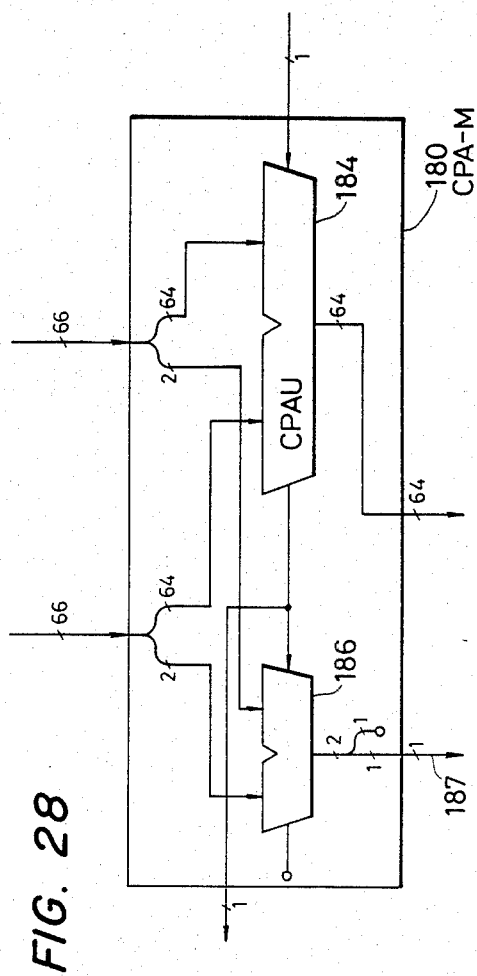
FIG. 28 is a diagram showing an example of an adder 180 employed in FIG. 22.
Figure 27:
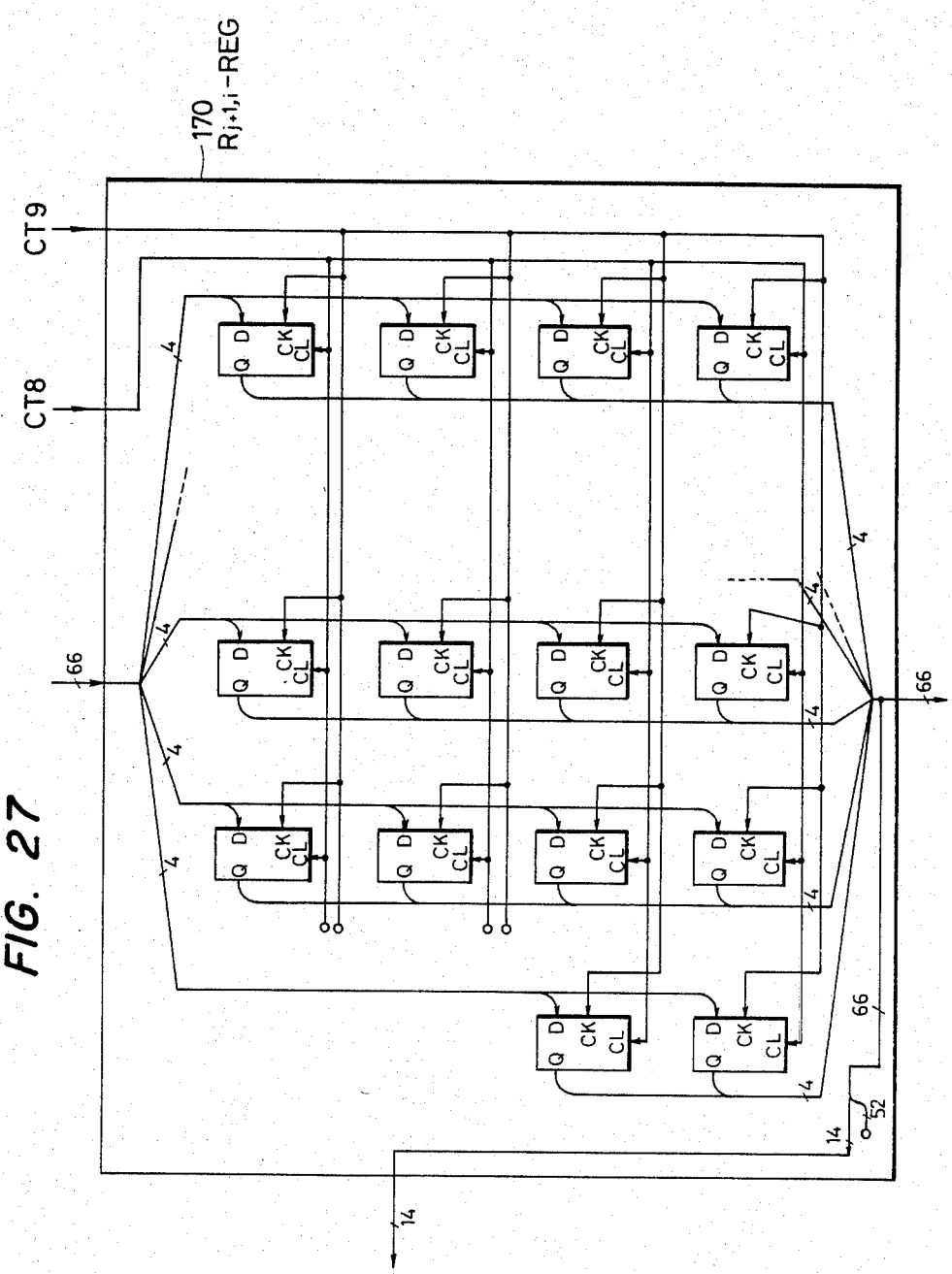
FIG. 27 is a diagram illustrating an example of a register section $170_L$ utilized in FIG. 22.
Figure 29:
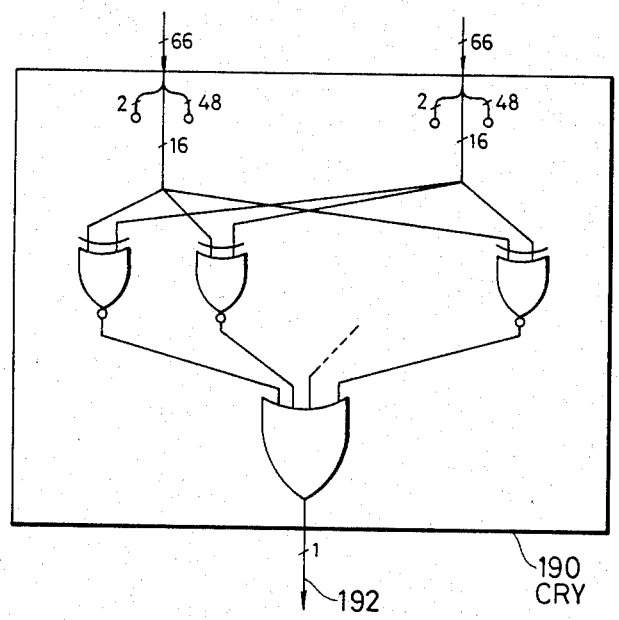
FIG. 29 is a diagram showing an example of a carry detector 190 used in FIG. 22.

FIG. 22 illustrates the general arrangement of an embodiment of the main adder 110. An $M_1 \cdot M_{2j}$ calculator 140 for calculating $M_1 \cdot M_{2j}$ seen in FIG. 22 is arranged as depicted in FIG. 23. A $-Q_j \cdot n$ calculator 150 for operating $-Q_j \cdot n$ is arranged as shown in FIG. 24. By the sign bit of the signal $Q_j$ on a division control signal line 134 is controlled a selector (SEL-Q) 151 to select a signal n on a signal line 152 from the n-register 103 and a signal line 154 from the next lower-order sliced section and a signal $\bar{n}$ on a signal line 153 from the n register 103 and a signal line 155 from the next lower-order sliced section. And the selected signal and the signal $Q_j$ on the signal line 134 are ANDed. An adder 160 seen in FIG. 22 is formed by three-input two-output carry save adders $161_1$ to $161_{10}$ as shown in FIG. 25. As shown in FIG. 26, the three-input two-output carry save adder 161 has 66 bits for each input and output, and the most significant one of 64 bits on the lower-order side in the adder 161 is branched to be applied to the corresponding carry save adder 161 of the next higher-order sliced section as indicated by a signal line 880. A signal applied via a signal line 880' from the corresponding lower-order side is provided to the side of the carry outputs from all the full adders FA. Circuits $170_L$ and $170_R$ in FIG. 22 are 66-bit registers as shown in FIG. 27. A circuit 180 in FIG. 22 adds two outputs from the adder 160 of this sliced section by a carry propagation adder 184 to produce output as shown in FIG. 28. Carries resulting from this addition are applied to the next higher-order sliced section one after another. In the most significant sliced section $25_1$, carry components in the output from the adder 160 are added by an adder 186 and a portion of the addition result is supplied to the controller $8_1$ via a signal line 187. A carry detector 190 in FIG. 22 performs ORing of NOT outputs of the exclusive ORs of corresponding bits of two added outputs from the adder 160 as shown in FIG. 29, and the detector 190 yields an output "0" or "1" depending on whether a carry to be transferred to the higher order is produced from the addition of the 66 bits in the adder 160.

In FIG. 22, selectors 301 and 302 are controlled by the signal CT10 to select a signal obtained by multiplying each calculation result of the corresponding registers $170_L$ and $170_R$ by $2^4$ and a signal corresponding directly to the calculation result. That is, in the case of the compensating calculation, the signal corresponding to the calculation result is selected and, when the signal obtained by the multiplication, high-order four bits from the next lower order sliced section are added to less significant side of the selected signal.

Figure 30:
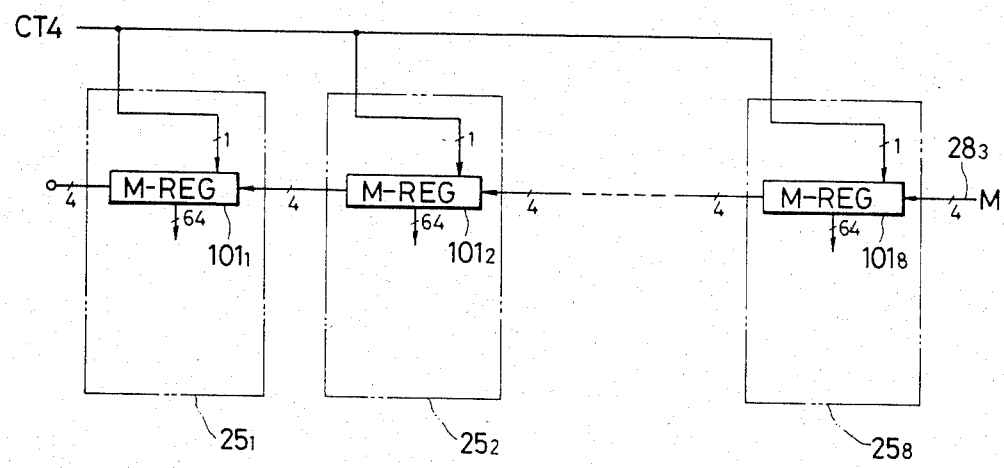
FIG. 30 is a diagram showing the coupling state of the M register 101.
Figure 31:
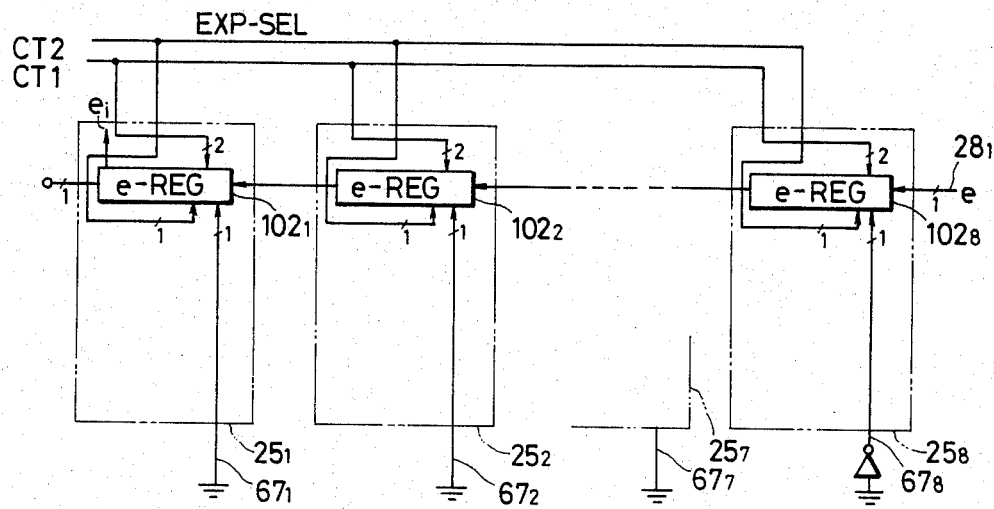
FIG. 31 is a diagram showing the coupling state of the e register 102.
Figure 32:
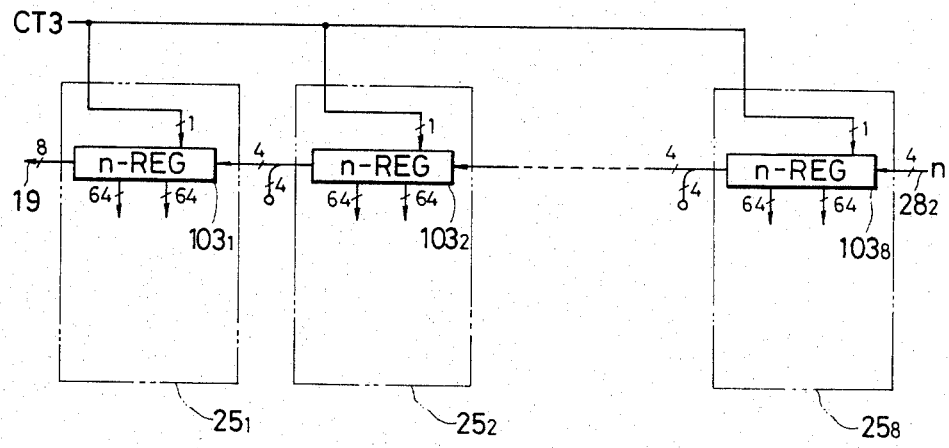
FIG. 32 is a diagram showing the coupling state of the n register 103.
Figure 33:
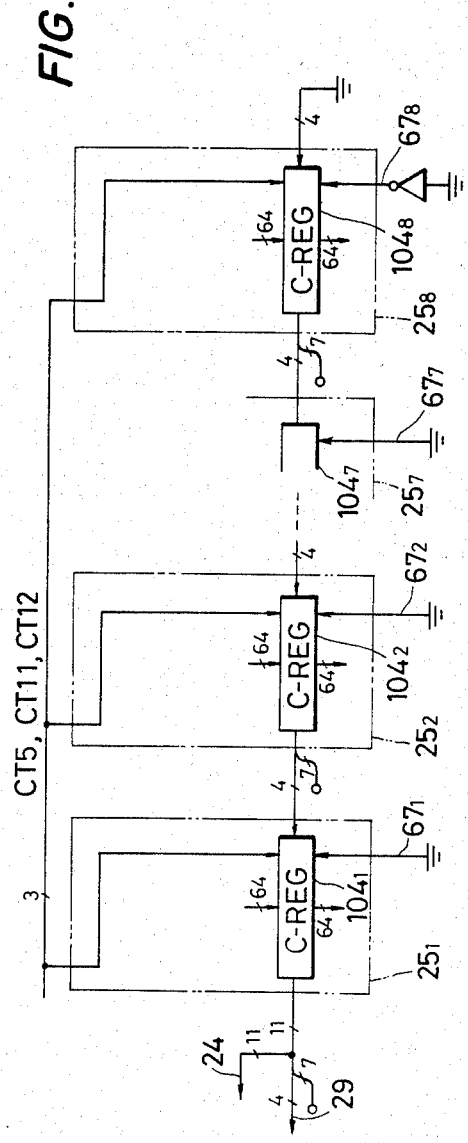
FIG. 33 is a diagram showing the coupling state of the C register 104.
Figure 34:
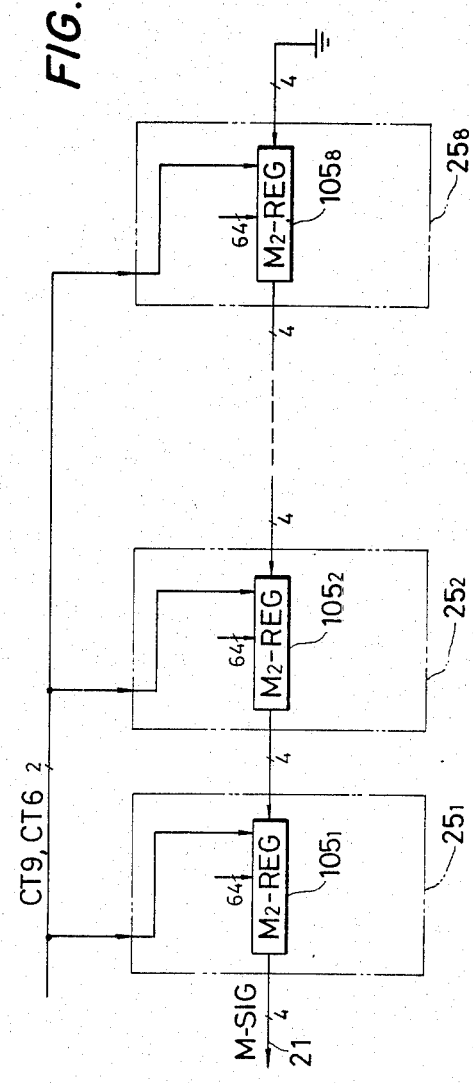
FIG. 34 is a diagram showing the coupling state of the $M_2$ register.
Figure 35:
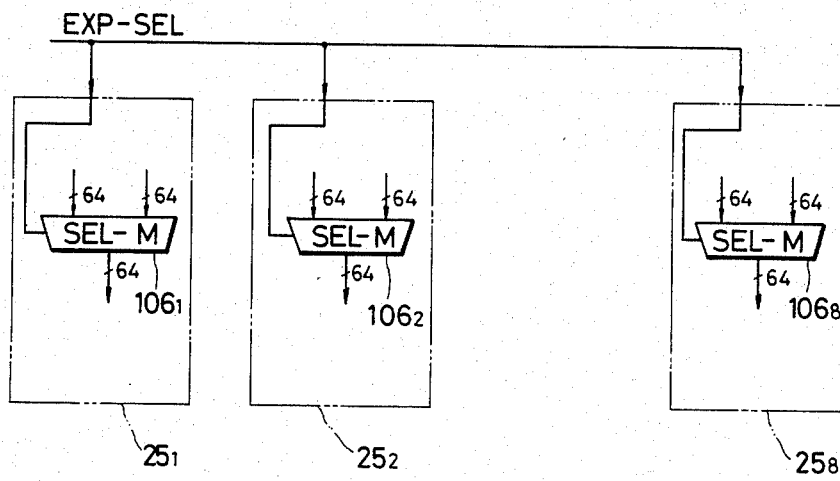
FIG. 35 is a diagram showing the coupling state of the selector 106.

FIG. 30 shows the state in which the registers $101_1$ to $101_8$ of the sliced sections $25_1$ to $25_8$ shown in FIG. 6 are coupled together to form the register 1 of 512-bit length because $64 \times 8 = 512$. The register 1 stores the variable M of 512-bit length. FIG. 31 illustrates the state in which the registers $102_1$ to $102_8$ of the sliced sections $25_1$ to $25_8$ are coupled together to set up the e-register 2 of 512-bit length, which stores the variable e of 512-bit length. The e-register 2 has the function of circularly shifting signals of 512 bits to left bit by bit. FIG. 32 illustrates the state in which the registers $103_1$ to $103_8$ of the sliced sections $25_1$ to $25_8$ are coupled together to constitute the register 3 of 512-bit length, which stores the variable n of 512-bit length. FIG. 33 shows the state in which the registers $104_1$ to $104_8$ of the sliced sections $25_1$ to $25_8$ are coupled together to form the C-register 4 of 512-bit length, which stores the variable R(C) of 512-bit length. FIG. 34 shows the state in which the registers $105_1$ to $105_8$ of the sliced sections $25_1$ to $25_8$ are coupled together to form the $M_2$-register 5 of 512-bit length, which stores the variable $M_2$ of 512-bit length. FIG. 35 shows the state in which the selectors $106_1$ to $106_8$ of the sliced sections $25_1$ to $25_8$ are coupled together to serve as the selector 6 of two inputs and 512-bit width.

Figure 36:
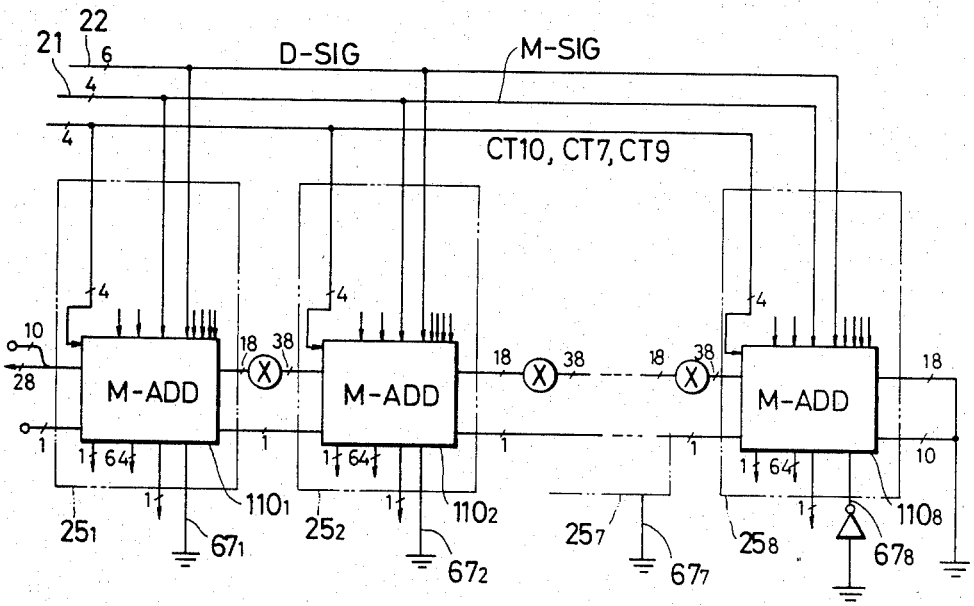
FIG. 36 is a diagram showing the coupling state of the main adding unit 110.
Figure 37:
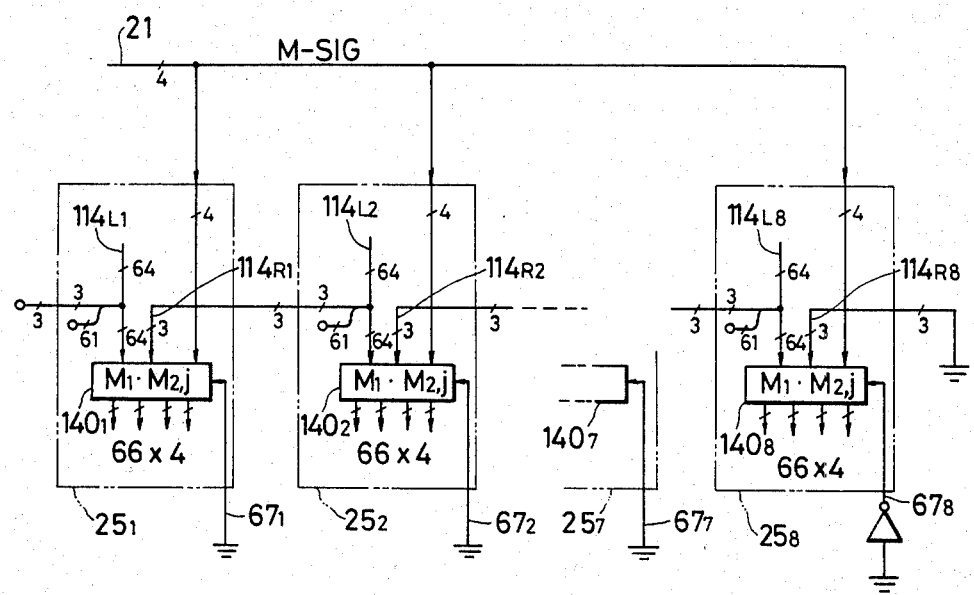
FIG. 37 is a diagram showing the coupling state of the $M_1 \cdot M_2$ calculating section 140.
Figure 38:
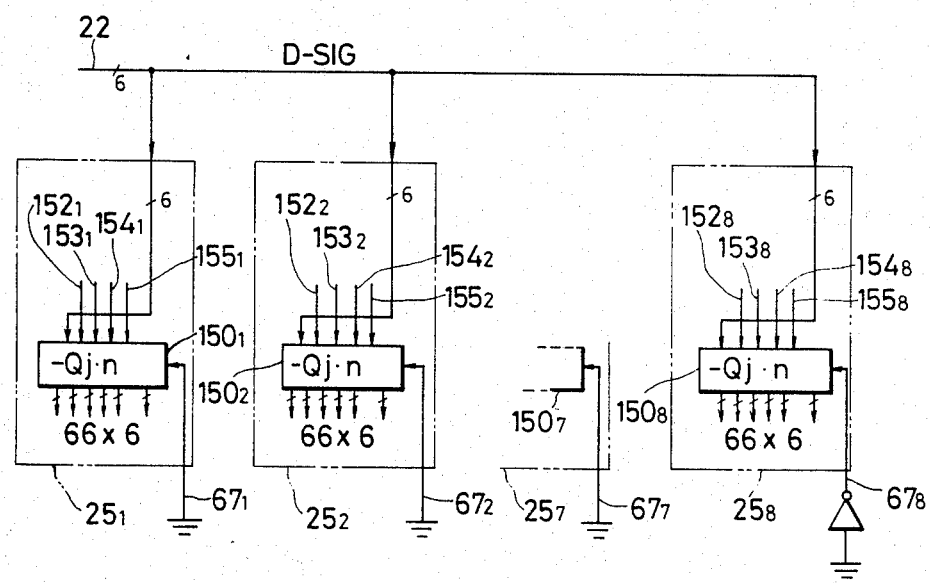
FIG. 38 is a diagram showing the coupling state of the $-Q_j \cdot n$ calculating section.
Figure 39:
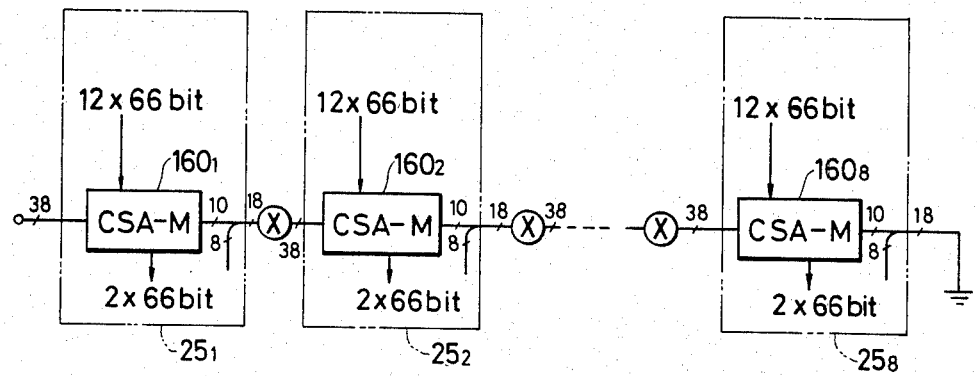
FIG. 39 is a diagram showing the coupling state of the adding section 160.
Figure 40:
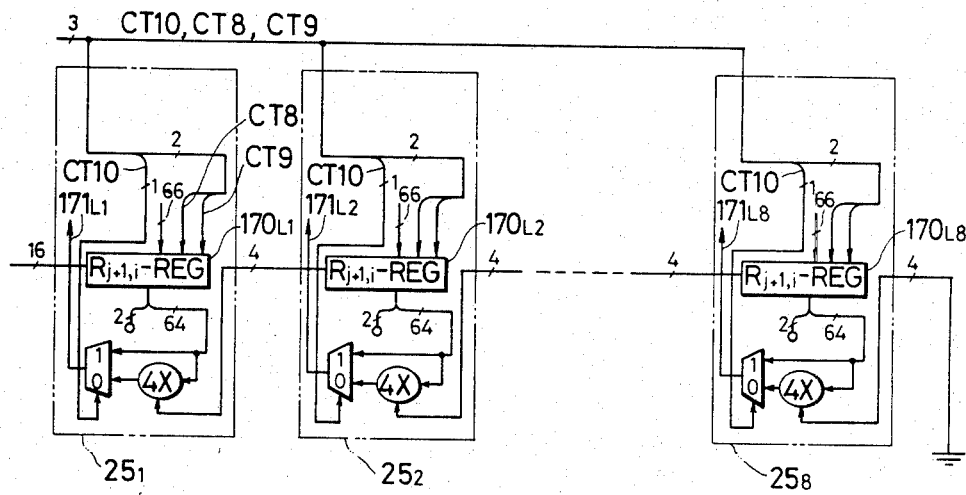
FIG. 40 is a diagram showing the coupling section of the register section $170_L$.
Figure 41:
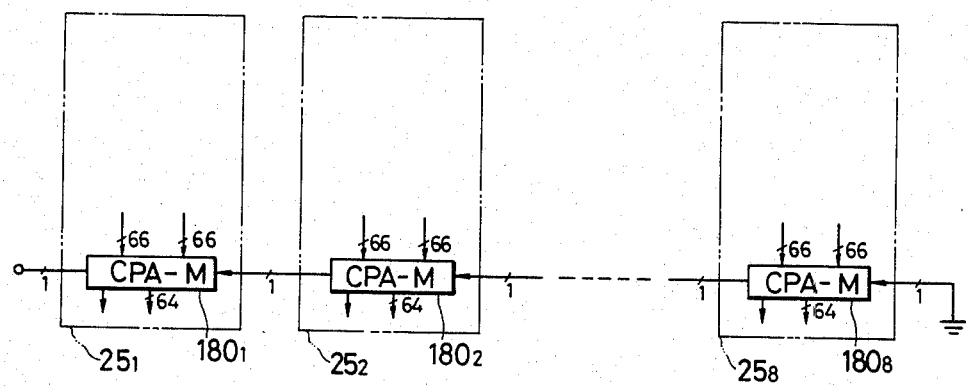
FIG. 41 is a diagram showing the coupling state of the adder 180.
Figure 42:
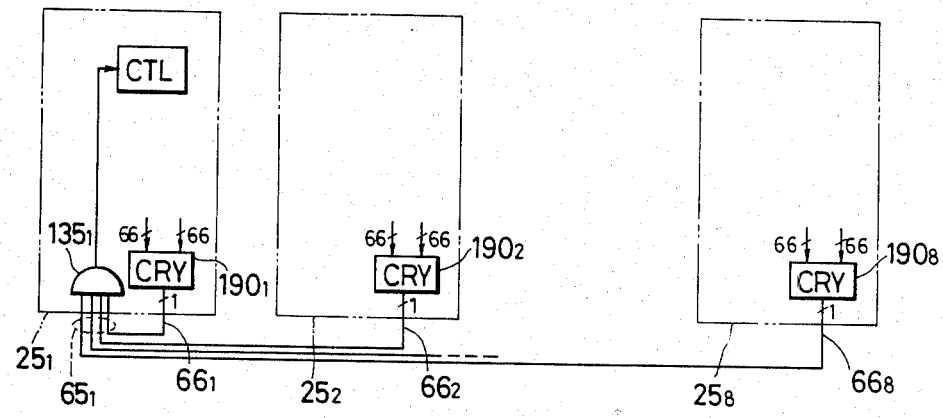
FIG. 42 is a diagram showing the coupling state of the carry detector 190.

FIG. 36 illustrates the state in which the main adders $110_1$ to $110_8$ of the sliced sections $25_1$ to $25_8$ are coupled together to form the main adder 10 of 514-bit width. FIG. 37 shows the state in which the $M_1 \cdot M_{2j}$ calculators $140_1$ to $140_8$ of each main adder 110 of the sliced sections $25_1$ to $25_8$ are coupled together and the input signal line $114_a$ (a=1, 2, ... 8) are divided into input signal lines $114_{La}$ and $114_{Ra}$. Because of such coupling, ANDing of $M_1 \cdot M_{2j}$ (where $M_1$ is 512-bit and $M_{2j}$ is four-bit) in Eq. (20) can be performed. FIG. 38 shows the coupling state of the $-Q_j \cdot n$ calculators $150_1$ to $150_8$ of each main adder 110 of the sliced sections $25_1$ to $25_8$, by which ANDing of $-Q_j'' \cdot n$ in Eq. (20) can be carried out. FIG. 39 shows the coupling state of adders $160_1$ to $160_8$ of each main adder 110 of the sliced sections $25_1$ to $25_8$. FIG. 40 shows the coupling state of the registers $170_{L1}$ to $170_{L8}$ of each main adder 110 of the sliced sections $25_1$ to $25_8$. Also the registers $170_{R1}$ to $170_{R8}$ are similarly coupled. FIG. 41 shows the coupling state of the circuits $180_1$ to $180_8$ of each main 110 of the sliced sections $25_1$ to $25_8$. FIG. 42 shows the coupling state of the carry detectors $190_1$ to $190_8$ of each main adder 110 of the sliced sections $25_1$ to $25_8$ with the circuit $135_1$ of the sliced section $25_1$.

Figure 43:
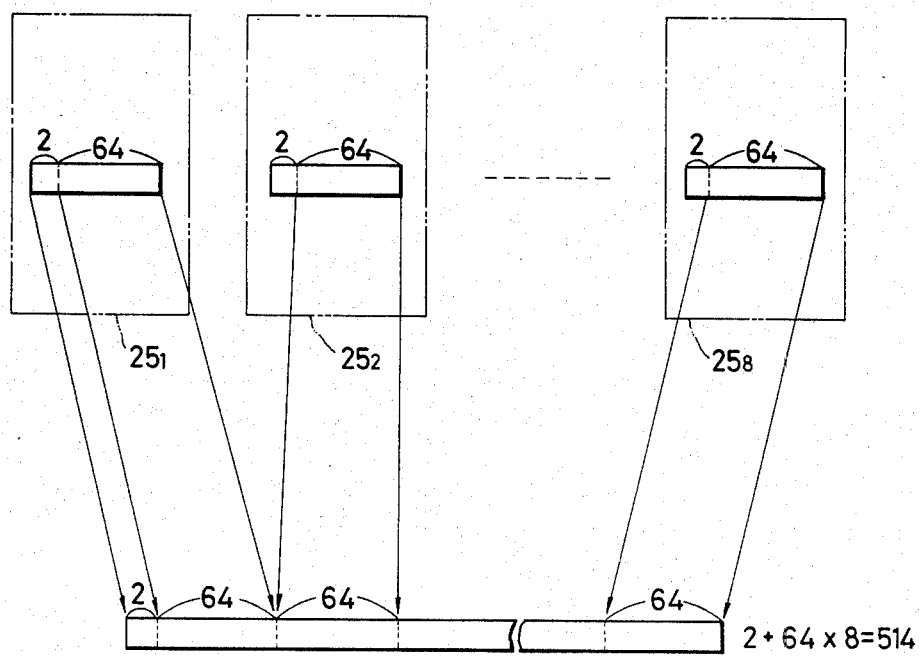
FIG. 43 is explanatory of an operation in the coupling states depicted in FIGS. 39 to 41.
Figure 44:
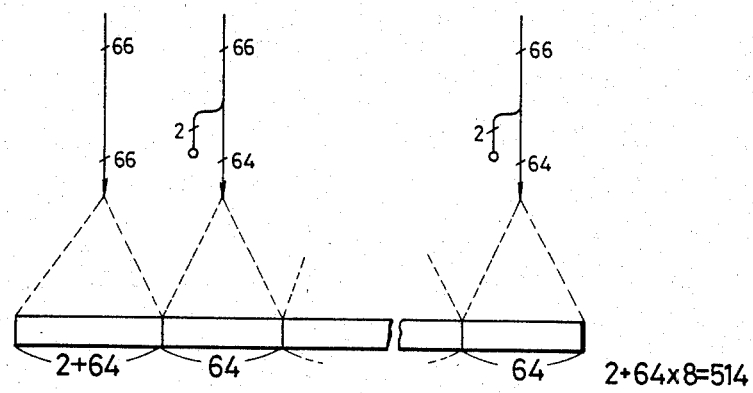
FIG. 44 is a diagram showing an arrangement of bits in the coupling state depicted in FIG. 37.
Figure 45:
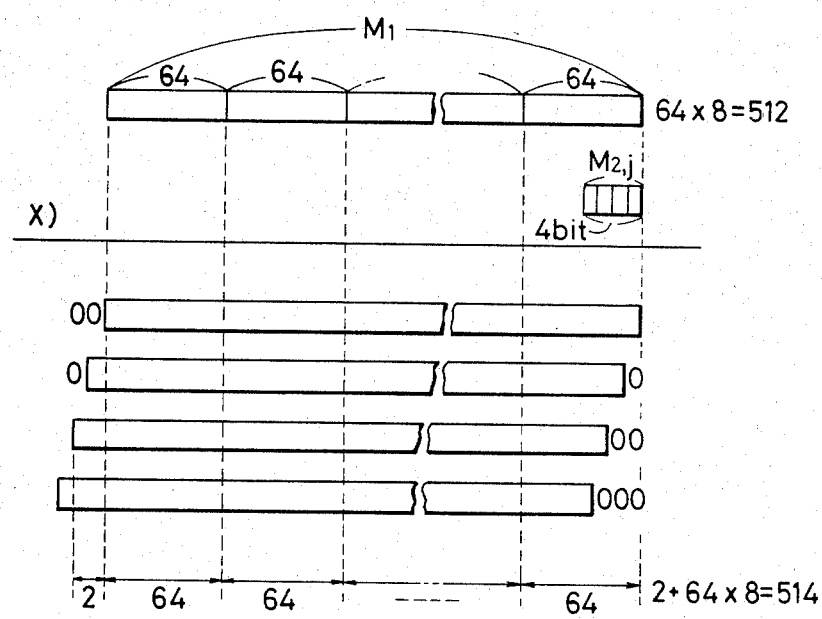
FIG. 45 is explanatory of the operation in the coupling state depicted in FIG. 37.

FIG. 43 is explanatory of operations in FIGS. 39 to 40. The circuits 160, $170_L$, and $170_R$ and 180 each perform a 66-bit calculation in the sliced sections $25_1$ to $25_8$ but, in the coupled state, the sliced sections $25_2$ to $25_8$ each perform a 64-bit calculation. Thus a calculation of a total of $512+2=514$ bits is conducted. FIGS. 44 and 45 illustrate the coupling operation of the $M_1 \cdot M_{2j}$ calculator 140 in FIG. 37.

From input signal lines $114_{L1}$ to $114_{L8}$ in FIG. 37 are applied to the sliced sections $25_1$ to $25_8$ the variable $M_1$ by steps of 64 bits, from each of signal lines $114_{R1}$ to $114_{R7}$ are applied high-order three bits of the input on each of the signal lines $114_{L2}$ to $114_{L8}$, and from a signal line $114_{R8}$ is applied a signal "0" of three bits. As a result of this, the ANDing of $M_1 \cdot M_{2j}$ ($M_1$ being 512-bit and $M_{2j}$ 4-bit) can be achieved. The number of significant digits used for the operation $M_1 \cdot M_{2j}$ is 514 from the low-order end, and 515th and higher-order bits are neglected but this does not matter for the reasons already described.

Figure 46:
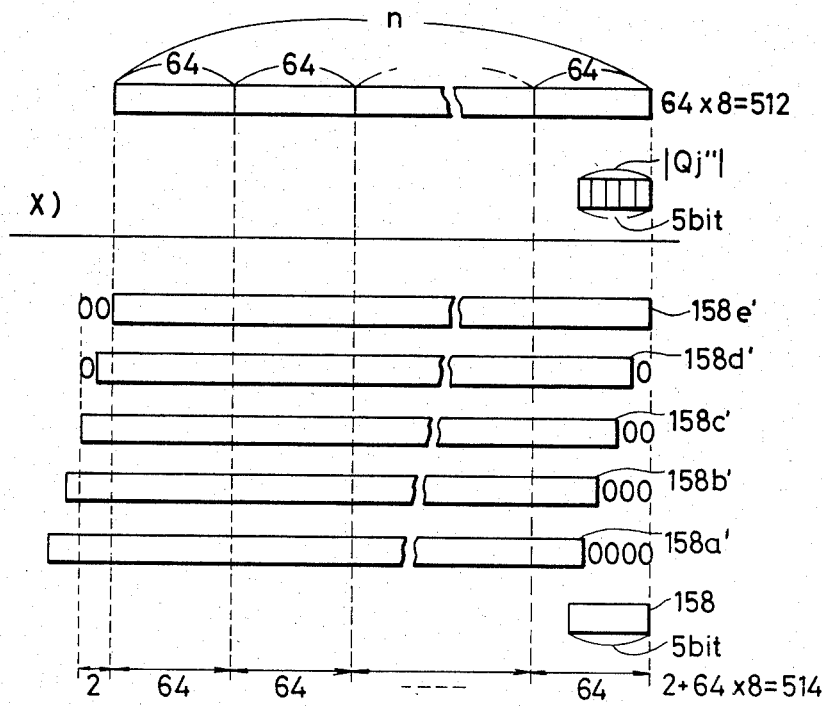
FIG. 46 is explanatory of an operation in the coupling state depicted in FIG. 38.

FIG. 46 shows the coupling operation of a $-Q_j \cdot n$ calculator shown in FIG. 38 (also see FIG. 24). Signal lines $152_1$ to $152_8$ equally divides n (512 bits) into eight by steps of 64 bits, and apply them to the $-Q_j \cdot n$ calculator from the side of the high-order position. Signal lines $153_1$ to $153_8$ equally divide inverted signals of the respective bits of n into eight by steps of 64 bits and apply then from the side of the high-order position. Signal lines $154_1$ to $154_7$ apply high-order four bits of the signals on the signal lines $152_2$ to $152_8$, respectively. A signal line $154_8$ applies a signal "0000". Signal lines $155_1$ to $155_7$ apply high-order four bits of the signals on the signal lines $153_2$ to $153_8$. A signal line $155_8$ applies a signal "0000" when the signal TAIL from a signal line 156 (see FIG. 24) is "1". As a result of this, the ANDing of $-Q_j''$ and n can be performed. The number of significant digits for the operation $-Q_j'' \times n$ is 514 from the low-order end, and 515th and higher-order bits are neglected but this does not matter for the reasons already given.

Figure 47:
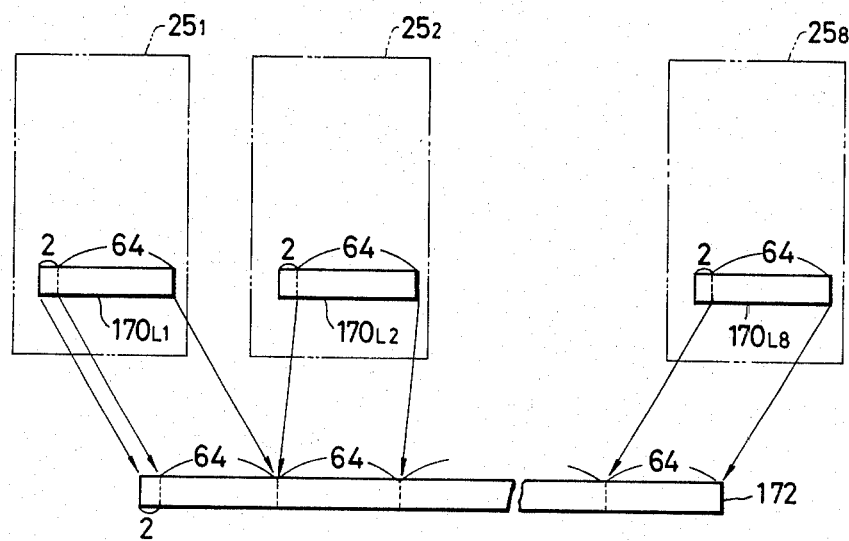
FIG. 47 is explanatory of an operation in the coupling state depicted in FIG. 40.

FIG. 47 is explanatory of the coupling operation of the register 170 shown in FIG. 40. The registers $170_{L1}$ to $170_{L8}$ serve as a 514-bit register as a whole in the same manner as described previously in respect of FIG. 44. When the signal CT10 is "1", signals of the registers $170_{L1}$ to $170_{L8}$ are provided, as they are, on signal lines $171_{L1}$ to $171_{L8}$. When the signal CT10 is "0", signals resulting from shifting of the registers $170_{L1}$ to $170_{L8}$ to the high-order side by four bits are provided on the output signal lines $171_{L1}$ to $171_{L8}$. As a result of this, since values of $R_{j+1,1}$ and $R_{j+1,0}$ are stored in the registers $170_L$ and $170_R$, respectively, $2^4 \cdot R_{j+1,1}$ and $2^4 \cdot R_{j+1,0}$ are provided on the signal lines $171_L$ and $171_R$, respectively, when the signal CT10 is "0" and, when the signal CT10 is "1", $R_{j+1,1}$ and $R_{j+1,0}$ are provided on the signal lines $171_L$ and $171_R$. The condition CT10=0 permits the addition in Eq. (20) and the condition CT=1 permits the addition in Eq. (23).

Figure 48:
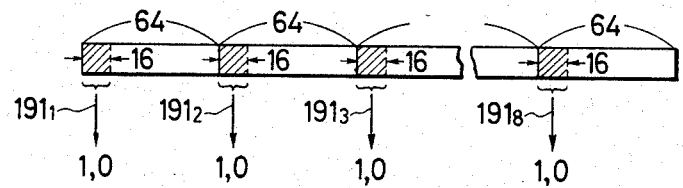
FIG. 48 is explanatory of an operation in the coupling state depicted in FIG. 42.

FIG. 48 is explanatory of the coupling operation of a carry detector 190 shown in FIG. 42. Arrows $191_1$ to $191_8$ indicate signal values on output signal lines $66_1$ to $66_8$ of the carry detectors $190_1$ to $190_8$, respectively.

CONTROLLER

Figure 49:
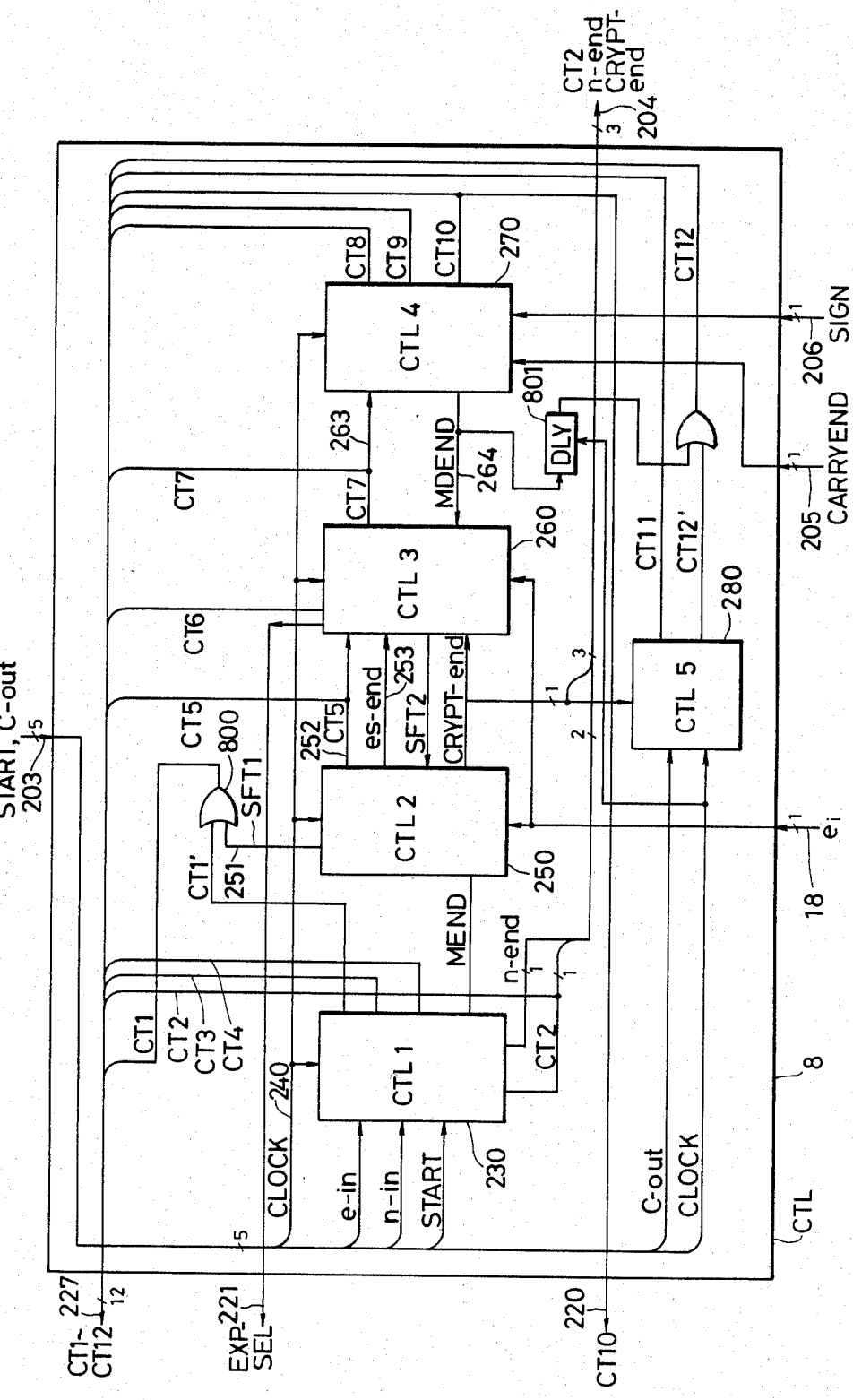
FIG. 49 is a block diagram showing the outline of a controller 8.

FIG. 49 shows the general arrangement of the controller 8, which comprises first to fifth controllers (CTL1), 230, (CTL2) 250, (CTL3) 260, (CTL4) 270, (CTL5) 280 and other related circuits. From an input signal line 203 are applied a signal CLOCK to all the controllers 230 to 280, the signals e-in, n-in and START to the first controller 230 and the signal C-out to the fifth controller 280. From an input signal line 205 is applied a signal CARRYEND to the fourth controller 270, and from an input signal line 206 is applied a signal SIGN to the fourth controller 270. On an output signal line 204 are provided signals CT2 and n-end from the first controller 230 and the signal CRYPT-end from the second controller 250. On an output signal line 220 of the fourth controller 270 is provided therefrom the signal CT10. On an output signal line 221 of the third controller 260 is provided therefrom the signal EXP-SEL. On an output signal line 227 connected to all the controllers are provided thereon the signals CT1 to CT12. An output signal line 251 of the second controller 250 transmits a signal SFT1 to an OR circuit 800, an output signal line 252 transmits the signal CT5 to the third controller 260 and the signal line 227, and an output signal line 253 transmits a signal es-end to the third controller 260. The third controller 260 applies the signal CT7 via an output signal line 263 to the fourth controller 270 and the signal line 227. The fourth controller 270 applies a signal MDEND via an output signal line 264 to the third controller 260 and a delay circuit 801. From the signal line 18 is supplied $e_i$ in the variable e to the second controller 250.

FIGS. $50A_1$ to $50U_1$ and correspondingly continued FIGS. $50A_2$ to $50U_2$ show waveforms of the signals CLOCK, e-in, CT1, CT2, n-in, CT3, n-end, START, CT4, MDEND, CT5, SFT1, es-end, CT6, CT7, MDEND, e-out, CT11, CT12 and CRYPT-end which occur at respective parts of the controller of FIG. 49 while in operation.

Next, a description will be given, with reference to FIG. 50, of the operation of the controller 8 shown in FIG. 49. The controller 8 inputs thereinto and outputs therefrom signals for controlling the operation $C \equiv M^e$ mod n in the following manner: The signal CLOCK of the cryptosystem is always applied to the controller 8. Upon application of the signal e-in at a moment $t_1$, the first controller 230 outputs therefrom the variable e input command signal CT1, by which the variable e is input bit by bit by 512 clocks. Upon completion of this, the first controller 230 outputs, at that moment $t_2$, the signal CT2 representing the completion of the input of the variable e.

Next, upon application of the signal n-in at a moment $t_3$, the first controller 230 yields the variable n input command signal CT3, inputting the variable n by steps of four bits by 128 clocks. Upon completion of this, the first controller 230 yields the signal n-end representing the completion of the input of the variable n at that moment $t_4$.

Next, when the signal START is applied at a moment $t_5$, the first controller 230 outputs a variable M input command signal CT4 commanding to input the variable M by steps of four bits by 128 clocks. Upon completion of the input of the variable M, the controller 230 yields the signal MDEND representing the end of the input of the variable M at that moment $t_6$. At the same time, the controller 230 yields the signal CT5 for initializing the registers (FIG. 15) within the cryptosystem prior to starting the operation $C \equiv M^e$ mod n.

Next, the second controller 250 generates the signal SFT1 by which the content of the e-register 102 having stored therein the variable e is circularly shifted to left bit by bit, and outputs this signal as the signal CT1 via the OR circuit 800 starting at a moment $t_7$. At this time, the signal CT1 is provided as clock pulses of the same number as the number of 0s on the higher-order side of the variable e represented by 512 bits. When the most significant bit (MSB) of the 512-bit-wide e-register having stored therein the variable e becomes "1" after repeating such circular left shifting bit by bit, the second controller 250 yields the signal es-end representing completion of the signal SFT1 at a moment $t_8$. Then, the following various signals are produced for executing the steps 2a and 2b of the exponentiation procedure.

Upon outputting the signal es-end, the third controller 260 generates the signal CT6 for preparing the start of the operation for the multiplication-division $R \equiv M_1 \times M_2$ mod n first and then yields the signal CT7 indicating the operation. By this, all the main adders $110_1$ to $110_8$ of the sliced sections $25_1$ to $25_8$ respectively execute the multiplication-division $R \equiv M_1 \times M_2$ mod n. Upon reception of the signal MDEND indicating the completion of this multiplication-division at a moment $t_9$, the signal CT7 from the third controller 260 is made a 0. The signal CARRYEND on the signal line 205 and the signal SIGN on the signal line 206 are utilized during execution of the multiplication-division. This will be described later in detail. Upon each completion of the multiplication-division, the signals CT6 and SFT1 are output to repeatedly perform the operation $C \equiv M_1 \times M_2$ mod n. But when $e_i$ of the variable e shifted into the most significant bit (MSB) of the e-register is "1" immediately after the execution of the step 2a of the exponentiation procedure, the signal SFT1 is "0". The signal CT7 is output as a signal indicating the periods of execution of the steps 2a and 2b of the exponentiation procedure. During execution of the multiplication-division, the signal EXP-SEL commanding switching of the selectors $106_1$ to $106_8$ is provided on the signal line 221. Here, when the value of the signal EXP-SEL is 0, the step 2a of the exponentiation procedure is executed and, when the signal EX-SEL is 1, the step 2b is executed. Upon completion of the exponentiation, the signal CRYPT-end is derived from the second controller 250.

Upon inputting the signal C-out commanding to bring out the variable C from the cryptosystem at a moment $t_{10}$, the fifth controller 280 outputs the signal CT12 instructing that the variable C be output by steps of four bits by 128 clocks, and the signal CT11 representing the period for which the signal CT12 is valid remains at 1 during the above operation.

In this way, the controller 8 inputs therein and outputs therefrom signals for controlling a series of calculations for inputting the variables e, n and M, executing the operation $C \equiv M^e$ mod n and outputting the variable C.

The following will describe details of operations of the signals CARRYEND and SIGN and specific arrangements of the controllers 230, 250, 260, 270 and 280.

FIG. 51 illustrates a specific example of the first controller (CTL1) 230 and FIGS. 52A to 52J show the waveforms of signals which occur at respective parts of the first controller 230 while in operation, the waveforms being labeled with corresponding signal names on the left-hand side.

When the signal e-in from a signal line 231 is input via a delay circuit 805 to a flip-flop 806, the output from the flip-flop 806 goes to a 1 to open a gate 807. Then the signal CLOCK on the signal line 240 is applied via the gate 807 to a counter 808 for counting and, at the same time, it is applied to a gate 809 to output therefrom a signal CT1' on an output signal line 234. The signal CT1' is provided to the OR circuit 800 in FIG. 49, producing the signal CT1. When the count content of the counter 808 reaches 512, the gate 809 is closed. That is, 512 signals of CT1' are generated. Further, the output from the counter 808 is sent as the signal CT2 on a signal line 238. When the signal n-in is provided on a signal line 232, the signal CT3 is output from a signal line 235 by 128 clocks, after which the signal n-end is sent on a signal line 239. When the signals CT2 and n-end are both being generated, a gate 814 is opened. Next, when the signal START is applied to the gate 814 from a signal line 233, the signal CT4 is similarly output 128 times on a signal line 236 in synchronism with clocks by means of a flip-flop 815, gates 816 and 818 and a counter 817, after which the signal MEND is sent on a signal line 237. In this way, the first controller 230 controls inputting of the variables e, n and M.

FIG. 53 illustrates a specific example of the second controller (CTL2) 250 and FIGS. 54A to 54G show signal waveforms which occur at respective parts of the second controller 250 while in operation. When the signal MEND is applied via the signal line 237 from the first controller 230, the signal CT5 is provided on a signal line 252 from a gate 820 for the delay time of a delay circuit 819. Further, while the signal MEND is applied and the signal $e_i$ from a signal line 256 remains at a 0, gates 821 and 822 are opened to permit the passage therethrough of the signal CLOCK, which is provided as the signal SFT1 on a signal line 251 via an OR circuit 823. By the signal SFT1 the e-register 102 in FIG. 15 is shifted to left. When the most significant bit of the e-register 102 of the sliced section $25_1$ goes to a 1, the signal $e_i$ from the signal line 256 also goes to a 1 to cause a Q output of a flip-flop 824 to go to a 1, opening a gate 825 and outputting the signal es-end via a gate 826 on a signal line 253. Thereafter, upon each application of the signal SFT2 from a signal line 254, it is output as the signal SFT1 via the gate 825 and the OR circuit 823. The outputs from the OR circuit 823, that is, the signals SFT1 are counted by a counter 827, which provides the signal CRYPT-end on a signal line 255 when having counted 512 after inputting of the signal CT5.

In this way, when supplied with the signal MEND representing completion of inputting the variable M, the second controller 250 performs control of circularly shifting the content of the e-register to left until its most significant bit goes to a 1, yielding the signal SFT1 for a circular shift of the e-register left one bit position upon each application of the signal SFT2 and outputting the signal CRYPT-end after the circular shift of the e-register left a total of 512 bit positions, i.e. after one circular shift cycle of the e-register.

FIG. 55 illustrates a specific example of the third controller (CT3) 260 in FIG. 49, and FIGS. 56A to 56H show, by way of example, signal waveforms which occur at respective parts of the third controller 260 while in operation.

Upon application of the signal CT5 via the signal line 252 from the second controller 250, flip-flops 828, 829, 830 and 831 are cleared. Upon application of the signal es-end via the signal line 253 from the second controller 250, the signal CT6 is provided via an OR circuit 832 on a signal line 261 and the flip-flop 831 is triggered via an OR circuit 833, providing a Q output of the flip-flop 831 as the signal CT7 on a signal line 263. The operation $R = M_1 \times M_2$ mod n is started and, upon completion of this calculation, the signal MDEND is input via a signal line 264 from the fourth controller 270, for example, at a moment $t_1$. The signal MDEND is applied via the OR circuit 833 to the flip-flop 831 to trigger it, causing the signal CT7 to go from a 1 to a 0. The signal $e_i$ on the signal line 256 and the Q output of the flip-flop 828 are provided to a NOT EXCLUSIVE OR 834, and its output and the signal MDEND are provided to an AND gate 835, so that if the signal $e_i$ is a 1 when the signal MDEND is applied at the moment $t_1$, the output from the NOT EXCLUSIVE OR 834 is a 0 and the output from the AND gate 835 remains at a 0, resulting in the signal SFT2 being not output on the signal line 254 as shown at a moment $t_2$. Moreover, since the signal MDEND, the signal $e_i$ on the signal line 256 and an $\overline{Q}$ output of the flip-flop 828 are provided to an AND gate 836, the Q output from the flip-flop 828 goes to a 1 in the case where the signal $e_i$ is at a 1 at the time of application of the signal MDEND. Furthermore, the signal MDEND at the moment $t_1$ passes through the flip-flops 829 and 830, thereafter being sent as the signal CT6 via a gate 837 and the OR circuit 832 on the signal line 261 at a moment $t_3$. The output from the flip-flop 830 is provided via a gate 838 and the OR circuit 833 to the flip-flop 831 to trigger it, generating the signal CT7 at a moment $t_4$. Consequently, the operation $R \equiv M_1 \times M_2$ mod n is resumed; namely, the step 2b is executed. When the signal MDEND is applied again at a moment $t_5$, the same operations as described above are carried out but, in the case where the signal $e_i$ is at a 1, the output from the circuit 834 goes to a 1, yielding the signal SFT2 as shown at the moment $t_6$. In the case where the signal $e_i$ is at a 0 when the signal MDEND occurs at the moment $t_1$, however, the output from the circuit 834 goes to a 1 to generate the signal SFT2 and, by the next signal CT7, the step 2a is executed. At this time, the Q output of the flip-flop 828 is made a 0.

Thus, in the exponentiation procedure, if the condition $e_i = 0$ holds immediately after the step 2a, then the content of the e-register 102 is shifted one bit position and an operation $i \leftarrow i - 1$ is performed; if $e_i = 1$ immediately after the completion of the step 2a, then the step 2b is executed and the content of e register 102 is shifted one bit position, thereafter the operation $i \leftarrow i - 1$ is executed. These procedures are repeated until i reaches 0. Since the gate 837 is closed when the signal CRYPT-end is applied via the signal line 255 from the second controller 250, even if the signal MDEND is applied, the signal CT6 is not generated as indicated at a moment $t_6$.

Thus, in the exponentiation procedure, after the calculation of the step 2 has been controlled, that is, after the variable e has been made $e_k, e_{k-1}, \ldots e_1, e_0$ in the binary representation, the steps 2a and 2b are executed in the order $i = k, k-1, \ldots 1, 0$.

FIG. 57 illustrates a specific example of the fourth controller (CTL4) 270 shown in FIG. 49, and FIGS. 58A to 58H show, by way of example, signal waveforms which occur at respective parts of the fourth controller 270 while operation. Upon application of the signal CT7 via the signal line 263 from the third controller 260, the signal CT8 is provided on a signal line 271 from a gate 840. By the signal CT8, a counter 841 and a flip-flop 842 are cleared, and counters 276 and 277 are cleared via an OR circuit 843. By the signal CT7, a gate 844 is opened, through which the signal CLOCK from the signal line 240 is applied to the counter 841 for counting and, at the same time, the signal CT9 is provided via a gate 845 on a signal line 272. When the counter 841 has counted the signal CLOCK up to 128, the gate 845 is closed by the output from the counter 841 to stop sending out of the signal CT9 but, on the other hand, a gate 846 is opened, permitting the counters 276 and 277 to start counting the signal CLOCK at a moment $t_1$. At the moment $t_1$ successive calculations of $R_1 = M_1 \times M_2$ mod n is completed and $R_1 \geq 0$ is checked in Eq. (22). In the case where the signal CARRYEND is at a 0 on a signal line 275 when the counter 226 has counted the signal CLOCK up to two after the moment $t_1$, a gate 847 remains closed and, at a moment $t_2$ when the counter 277 has counted the signal CLOCK up to six, the output from the counter 277 is applied via an OR circuit 848 to a gate 849, by the output of which gates 850 and 851 are opened for a fixed period of time. At this moment $t_3$, the signal SIGN on a signal line 274, that is, the sign of $$R_1 = \sum_{i=0}^{1} R_{1,i}$$

in Eq. (22), is checked. When the signal SIGN is 1, that is, when $R_1 < 0$, the signal CT10 is sent on a signal line 275 via the gate 851. By this, the compensating calculation of Eq. (23) is performed. At this time, the counters 276 and 277 are cleared by the output of the gate 849 via the OR circuit 843 but, at a moment $t_4$ of completion of this clearing, the counters 276 and 277 start counting again. At a moment $t_5$ when the counter 276 has counted the signal CLOCK up to two, the gate 847 is opened and if the signal CARRYEND on the signal line 275 is 1, the output of the gate 847 is provided via the OR circuit 848 to the gate 849 and, by the output of the gate 849, the gates 850 and 851 are opened at $t_6$, checking the signal SIGN, that is, the sign of $R_1$. At this time, when the signal SIGN is at a 1, the signal CT10 is output at the moment $t_6$. Similarly, the compensating calculation of Eq. (23) is performed and then, at a moment $t_7$ when the gates 850 and 851 are opened, if the signal SIGN is at a 0, the signal MDEND is provided from the gate 850 on a signal line 264. By this signal MDEND, the signal CT7 is made a 0 as described previously in respect of FIG. 55. The signal CT7 is a signal that holds a 1 during the operation $R=M_1\cdot M_2$ mod n. Further, a Q output of the flip-flop 842 is caused by the signal MDEND to go to a 1, and a gate 852 is opened, through which the supply of the signal CLOCK to the counters 276 and 277 is continued, preventing occurrence of the signal CT10 while the signal CT7 is at a 0.

In this way, the compensating calculation for the multiplications and divisions in Eqs. (22) to (24) can be controlled. FIG. 59 illustrates a specific example of the fifth controller 280 shown in FIG. 49 and FIGS. 60A to 60D show signal waveforms which occur at respective parts of the controller 280 while in operation. Upon application of the signal CRYPT-end via a signal line 282 from the second controller 250, a gate 853 is opened by the signal CRYPT-end. If the signal C-out is input from a signal line 281 in this state, a flip-flop 854 is driven via the gate 853 and its Q output goes to a 1, which is output as the signal CT11 on a signal line 283 via a gate 855. And, by the output of the flip-flop 854, a gate 856 is opened and the signal CLOCK on the signal line 240 is counted by a counter 857. At the same time, the signal CT12' is provided via a gate 858 on a signal line 284, and output as the signal CT12 via the OR circuit in FIG. 49, and the calculation result in the C-register 104 is output from the cryptosystem. When the counter 857 has counted up to 128, the gates 855 and 858 are both closed, stopping the both signals CT11 and CT12'.

After the operation $C \equiv M^e$ mod n has thus been completed, the variable C of 512 bits can be output from the cryptosystem by steps of four bits by 128 clocks.

In the quotient calculation pre-processing section 60 shown in FIG. 7, n ($2^{511} < n < 2^{512}$) is input and v is obtained by Eq. (15), i.e. $v \leftarrow [2^{13} \div [n \cdot 2^{-504}]]$. A supplementary description will be given of the size of ROM 68 of the pre-processing section 60. The address of ROM 68 can be represented by a positive integer of eight-bit width based on the condition $2^7 < [n \cdot 2^{-504}] < 2^8$. Since $2^7$ or less addresses are not used, however, the size of ROM 68 may be one-half of that of ROM having $2^7$ or less addresses. The value of v can be represented by a positive integer of six-bit width based on the condition $2^5 < v < 2^6$. But the most significant bit (MSB) of v is always 1 and this value is fixed, so that the value of v except for the "1" of the most significant bit is stored in ROM 68 using five bits and, when to refer to the value of v, one bit having a value "1" is added as the most significant bit of v by an inverter 859. It is also possible, of course, to arrange the pre-processing section 60 so that the ROM itself inputs therein n of eight bits and outputs therefrom v of six bits.

COMPENSATING CALCULATION

The calculations of Eqs. (20) and (21) are repeated and it is checked whether a compensating calculation is required in Eq. (22), and if necessary, the compensating calculation is performed. A description will be given, with reference to FIG. 22, of the compensating calculation. In the period during which the value of the signal CT10 on a signal line 300 holds zero, that is, in the period in which mainly the operations of Eqs. (17) to (22) are performed, input signal lines 303 and 304 of the selectors 301 and 302 are selected and the value of the variable $R_{j+1,i}$ is shifted left four bit positions in each of circuits 861 and 862, selecting value $2^4 \cdot R_{j+1,i}$ necessary for calculating Eq. (20).

When the signal CT10 on the signal line 300 has a value 1, that is, when the compensating calculation of Eq. (22) is executed, input signal line 305 and 306 of the selectors 301 and 302 are selected, that is, the value of the variable $R_{j+1,i}$ is selected. In the quotient calculation post-processing section 61 shown in FIG. 8, the selector 83 selects the output of a circuit 75$_3$ by the signal CT10 and $Q_j'' = -1$ is provided via the signal line 22 to the $-Q_j \cdot n$ calculator 150 in FIG. 22. Furthermore, as shown in FIG. 15, an AND gate 136 is supplied with an inverted signal of the signal CT10, and hence is closed, and the output of the $M_2$-register 105 is not provided on the signal line 105$_L$. And, the value of the signal on the signal line 105$_L$, that is, the value $\delta_{4(j-)+i} \cdot 2^i$ (i=0, 1, 2, 3) of the signal M-SIG on a signal line 21 in FIG. 6, namely, $M_{2,j}$, becomes 0 and, as a result of this, Eq. (23) is calculated in the adder 160.

This compensating calculation can be changed as follows:

$$\text{Step 6}': R_1 \leftarrow \sum_{i=0}^{1} R_{1,i} \qquad (22')$$

$$\begin{array}{l}\text{Step 7}': \text{If } R_1 \geq 0, \text{ then go to step 8}'. \\ \qquad R_1 \leftarrow R_1 + n \\ \qquad \text{Go back to step 7}', \end{array} \qquad (23')$$

$$\text{Step 8}': R \leftarrow R_1. \text{ Halt.} \qquad (24')$$

The compensating calculation by Eqs. (22') to (24') can be implemented, for instance, as shown in FIG. 61. The outputs $R_{j+1,1}$ and $R_{j+1,0}$ of the registers 170$_L$ and 170$_R$ are respectively applied via signal lines 313 and 314 to the selectors 311 and 312 at one input thereof and, at the same time, the register outputs are respectively shifted by the circuits 861 and 862 to the left by four bit positions and supplied to the adder 160. High-order 66 lines of the signal line 308 are connected as a signal line 315 to the other input of the selector 311. The signal line 309 is added with high-order two bits and connected as a signal line 316 to the other input of the selector 312. The number of lines of the output signal line 116 is not 64 but increased to 66 and this output is input to the register 104 shown in FIG. 15, from which it is input via the signal line 114 to the main adder 110, so that the input signal line 114 is composed of 66 and three lines.

While the signal CT10 assumes a value 0, that is, while the repetitive calculations Eqs. (7) to (12) and (21') are executed, the selectors 311 and 312 select the signal lines 313 and 314, whereby Eq. (22') is correctly calculated.

When the signal CT10 assumes a value 1, the signal lines 315 and 316 are selected and, in the adder 180, the signals $R_1$ and n from the selectors 311 and 312 are added. As a result of this, Eq. (23') is correctly computed. The value of the eight-divided signal $R_1$ on the output signal line 116 of the main adder 110' is provided to the signal line 308 shown in FIG. 61 via the register 104 and the signal line 114 shown in FIG. 15. In other words, the values eight-divided from signals $R_1$ and n are obtained on the signal lines 315 and 316, respectively, in consequence of which the calculation $R_1 \leftarrow R_1 + n$, i.e. Eq. (23') is correctly performed. Here, the value eight-divided from the signal n represents 64 bits obtained by dividing the variable n of 512-bit width equally into eight. The values of the eight-divided signal $R_1$ represent eight groups of bits obtained by dividing the 514-bit-width variable $R_1$ into a group of 66 bits and seven 64-bit groups (i.e. $514=66+64\times 7$). In this case, since the adder 160 is not used for the compensating calculation, the circuit 75$_3$, the selector 83 and the signal line 20 in FIG. 8 are unnecessary, and the signal line 82 is connected directly to the signal line 22. Furthermore, the gate 136 in FIG. 15 is also unnecessary and the four output signal lines of the M$_2$-register 105 are connected directly to the signal line 105$_L$. Besides, the C-register 104 in FIG. 15 is made 66-bit-wide, not 64-bit-wide and, in the coupling of the registers 104$_1$ to 104$_8$ shown in FIG. 33, the register 104 is constituted as a 514-bit-wide register based on the calculation $512+2=514$ as is the case with FIG. 44.

MODIFICATION OF $-Q_j\cdot n$ CALCULATOR

A description will be given of the main point of another example of the $-Q_j\cdot n$ calculator 150 shown in FIG. 22. $|Q_j''|$ is represented as a binary number $$\sum_{\mu=0}^{2h} H_\mu \cdot 2^\mu, \text{ where } h \geq 3, \text{ and it is given by}$$

$$|Q_j''| = Q_{ja} + Q_{jb} + Q_{jc} \tag{E-1}$$

where $$Q_{ja} = H_{2h} \cdot 2^{2h} + 2H_{2h-1} \cdot 2^{2h-1} \tag{E-2}$$

$$Q_{jb} = \sum_{\mu=1}^{h-1} \{-H_{2\mu+1} \cdot 2^{2\mu+1} + H_{2\mu} \cdot 2^{2\mu} + 2H_{2\mu-1} \cdot 2^{2\mu-1}\} \tag{E-3}$$

$$Q_{jc} = -H_1 \cdot 2^1 + H_0 \tag{E-4}$$

For instance, in the case where $|Q_j''| = 11011$, $$Q_{ja} = 2^5, Q_{jb} = -2^2, Q_{jc} = -1$$

With such a representation, $|Q_j''|\cdot n$ requires $5\times 66$ bits if $Q_j''$ is represented as a mere binary number but, if $Q_{ja}$, $Q_{jb}$ and $Q_{jc}$ are used, $3\times 66$ bits are sufficient for $2^5$, $-2^2$ and $-1$, so that $2\times 66$ bits become unnecessary, permitting the reduction of the number of inputs to the carry save adder 160 shown in FIG. 22. FIG. 62 illustrates, by way of example, the circuit arrangement therefor corresponding to that depicted in FIG. 24. In FIG. 62, $Q_{ja}$, $Q_{jb}$ and $Q_{jc}$ generators 502, 503 and 504 respectively input therein $Q_j''$ from the signal line 134 and compute $Q_{ja}$, $Q_{jb}$ and $Q_{jc}$ of the logic shown in FIGS. 63, 64 and 65, thereafter outputting the calculation results. For example, in FIG. 63, a column $2^4$ of D-SIG input indicates the digit position of $2^4$ of $|Q_j''|$ represented as a binary number. The same is true of $2^3$, $2^4$, $2^5$, $-2^4$ and $-2^5$ in the column of output indicate output terminals of the $Q_{ja}$ generator 502 and are caused to have a 1. 0 in the column of output indicates that the signal value at the output terminal is at a 0. For instance, in the case where $q_s$, $2^4$ and $2^3$ in a column of input are 0, 1 and 1, it indicates that a signal at the output terminal $2^5$ is caused to have a 1. As a result of this, the quantity of data representing $-Q_j''\cdot n$ is decreased, permitting reduction of the circuit scale of the carry storage type adder 160.

NUMERICAL EXPRESSION OF THE PRINCIPLE OF THE MULTIPLIER-DIVIDER, THE PRINCIPLE PART OF THE CRYPTOSYSTEM OF THE PRESENT INVENTION

The principle of obtaining the quotient Q and the remainder R of a multiplication-division of integers $(M_1\times M_2)\div n$ is shown as a theorem and a system of theorem by numerical expressions.

Theorem

The quotient Q and the remainder R of the multiplication-Division of integers $(M_1\times M_2)\div n$ can be obtained as described hereinafter by Eqs. (F20) to (F22) based on $I_j$ and $R_1$ obtained by repeating recurrence formulae of Eqs. (F14) to (F19) in an order $j=1, 1-1, \ldots, 2, 1$ on the premise of Eqs. (F1) to (F13). Here, Eq. (F17) represents the range over which $I_j$ is obtainable with Eq. (F16), and Eq. (F18) indicates the method of calculation of $R_j$. In the equations, n, $M_1$, $M_2$, $R_{j+1}$ and $R_j$ are variables, m, K, A, $\lambda$, $\omega$, S, $t_1$, and $t_2$ constants and $\alpha_j$ a random number the value of which irregularly varies as the value of j is changed, $t_1$ and $t_2$ being real numbers and the others being integers. Incidentally, since $\alpha_j$ naturally occurs, there is no need of taking it into account when forming adders. This means that $\alpha_j$ may be neglected, for example, in Eq. (F16).

If a multiplication-division $(M_1\times M_2')\div n'$ is performed with $M_2'=M_2\times 2$ and $n'=n\times 2$ so as to obtain the quotient Q and the remainder R of the multiplication-division $(M_1\times M_2)\div n$, the least significant bit $\delta_0'$ of $M_2'$ is always 0, so that it is not a difficult condition to cause Eq. (F13) to hold when $\omega=1$. However, since $R=[R_2\div 2]$ and $Q=Q_2$ hold for the quotient $Q_2$ and the remainder $R_2$ of $(M_1\times M_2')\div n'$, the least significant bit of $R_2$ is unnecessary for R.

The addition of Eq. (F18) is applied to the case of using a carry save type adder, but this addition can also be performed using a carry propagation adder, with $\alpha_j=0$ and $A=1$. In the following, a constant may sometimes be called a parameter.

$$1 \leq \frac{n}{2^{m+k}} < 2 \tag{F1}$$

$$0 \leq \alpha_j \leq A \tag{F2}$$

$$\lambda + \log_2 A \leq K \tag{F3}$$

$$m = 0, 1, 2, \ldots \tag{F4}$$

$$\lambda = 1, 2, \ldots \tag{F5}$$

$$\omega = 0 \text{ or } 1 \tag{F6}$$

$$\left.\begin{array}{l} -2^k + 1 + \omega + I_1 \leq S \leq 2^{k+1} - \\ A - 1 - 2\omega - (I_2 + 1) \\ \text{where } I_1 = [2^\lambda \cdot t_1 + 2] \geq 1 \\ \text{and } I_2 = [2^{\lambda+1} + 2^\lambda \cdot t_2] \geq 0 \end{array}\right\} \tag{F7}$$

$$2^{m+1} - nt_2 + I_1 \cdot 2^m \leq S \cdot 2^m \leq nt_1 - \omega 2^m - (I_2 + 1)2^m \tag{F8}$$

$$0 \leq M_1 < n \tag{F9}$$

$$M_{2,j}' = M_{2,j} - \omega\delta_{j\lambda} \cdot 2^\lambda + \omega\delta_{(j-1)\lambda} \tag{F10}$$

$$\text{where } M_2 = \sum_{j=1}^{l} M_{2,j} \cdot 2^{(j-1)\lambda} \tag{F11}$$

-continued $$M_{2,j} = \sum_{\mu=0}^{\lambda-1} \delta_{(j-1)\lambda+\mu} \cdot 2^\mu, \quad M_2 = \sum_{\mu=0}^{l\lambda-1} \delta_\mu \cdot 2^\mu \quad \text{(F12)}$$
$$\delta_{(j-1)\lambda+\mu} = 0 \text{ or } 1$$

$$\delta_0 = 0 \text{ but when } \omega = 1 \quad \text{(F13)}$$
$$R_{l+1} = 0 \quad \text{(F14)}$$

$$-A \cdot n \cdot 2^{-k} - t_1 \cdot n + \omega \delta_{j\lambda} \cdot M_1 \leq \quad \text{(F15)}$$
$$R_{j+1} \leq n + t_2 \cdot n + \omega \delta_{j\lambda} \cdot M_1$$

$$I_j = [\{[(2^\lambda R_{j+1})2^{-m}] + [(M_1 \cdot M'_{2,j})2^{-m}] + S + \alpha_j - \quad \text{(F16)}$$
$$\omega \delta_{(j-1)\lambda} \cdot [M_1 \cdot 2^{-m}]\} \div [n \cdot 2^{-m}]]$$

$$-I_1 \leq I_j \leq I_2 \quad \text{(F17)}$$

$$R_j = 2^\lambda \cdot R_{j+1} + M_1 \cdot M'_{2,j} - I_j \cdot n - \quad \text{(F18)}$$
$$(S + A + (I_2 + 1)) \cdot 2^m + \omega \cdot \delta_{(j-1)\lambda} \cdot$$
$$[M_1 \cdot 2^{-m}] \cdot 2^m \leq R_j$$

$$< n + (2 - S + I_1)2^m + \omega \cdot \delta_{(j-1)\lambda} \cdot [M_1 \cdot 2^{-m}] \cdot 2^m \quad \text{(F19)}$$

$$R = R_1 + \delta \cdot n \quad \text{(F20)}$$

$$Q = \sum_{j=1}^{l} I_j \cdot 2^{(j-1)\lambda} - \delta \quad \text{(F21)}$$

$$\delta = \begin{bmatrix} 2 \text{ for } R_1 < -n \\ 1 \text{ for } -n \leq R_1 < 0 \\ 0 \text{ for } 0 \leq R_1 < n \\ -1 \text{ for } n \leq R_1 \leq 2n \\ -2 \text{ for } 2n \leq R_1 < 3n \end{bmatrix} \quad \text{(F22)}$$

Corollary of Theorem

Corollaries of the theorem will be given below on the assumption that the range of application of the theorem is extended. Here, a combination of corollaries 2 and 3 is impossible but a desired combination of other corollaries is possible; for example, corollaries 1, 2, 4 and 5 can be applied at the same time. Next, abridged notations X and X' and a random number $\beta_j$, which irregularly changes its value with variations in j, are defined by the following equations:

$$X = [(2^\lambda \cdot R_{j+1})2^{-m}] + [(M_1 \cdot M'_{2,j})2^{-m}] + S + \quad \text{(F23)}$$
$$\alpha_j - \omega \cdot \delta_{(j-1)\lambda} \cdot [M_1 \cdot 2^{-m}]$$

$$X' = [(2^\lambda \cdot R_{j+1,1})2^{-m}] + [(2^\lambda \cdot R_{j+1,0})2^{-m}] + \quad \text{(F24)}$$
$$\sum_{\mu=0}^{\phi-1} [(Z_{j,\mu})2^{-m}] + S' + \alpha_j$$

where $$R_{j+1} = R_{j+1,1} + R_{j+1,0} \quad \text{(F25)}$$

$$M_1 \cdot M'_{2,j} = \sum_{\mu=0}^{\phi-1} Z_{j,\mu} \quad \text{(F26)}$$

$$S' = S + \beta_j \quad \text{(F27)}$$
$$0 \leq \beta_j \leq \phi \quad \text{(F28)}$$

where $\psi$ and $\beta_j$ are integers.

Corollary 1

$I_j$ can be obtained with Eq. (F29) instead of Eq. (F16). But when Eq. (F29) is used, S in the theorem is replaced with S'. Incidentally, the use of a carry propagation adder for the addition of Eq. (F18) means that the application of the corollary 1 is meaningless.

$$I_j = [X \div [n \cdot 2^{-m}]] \quad \text{(F16)}$$

$$I_j = [X' \div [n \cdot 2^{-m}]] \quad \text{(F29)}$$

Corollary 2

Eqs. (F30) and (F31), but Eq. (F16) can be obtained from Eqs. (F32) to (F34) on the premise that w is an integer. In this case, however, Eqs. (F8), (F18), (F19) and (F21) become (F8)", (F18)", (F19)" and (F21)", respectively.

$$I_1 \leq 2^w \quad \text{(F30)}$$
$$(I_2 + 1) \leq 2^w \quad \text{(F31)}$$

$$I'_j = I_j + \delta^*_j = \begin{bmatrix} [X \cdot v \cdot 2^{-(k+w+1)}] + 1 \text{ for } X \geq 0 \\ [X \cdot v \cdot 2^{-(k+w+1)}] \quad \text{for } X < 0 \end{bmatrix} \quad \text{(F32)}$$

$$v = [2^{(k+w+1)} \div [n \cdot 2^{-m}]] \quad \text{(F33)}$$
$$\delta^*_j = 0 \text{ or } 1 \quad \text{(F34)}$$

$$-\{S + A + (I_2 + 1)\}2^m + \omega \cdot \delta_{(j-1)\lambda}[M_1 \cdot 2^{-m}] \cdot \quad \text{(F19)"}$$
$$2^m - n \leq R_j < n + (2 - S + I_1) \cdot 2^m + \omega \cdot$$
$$\delta_{(j-1)\lambda}[M_1 \cdot 2^{-m}] \cdot 2^m$$

$$2^{m+1} - n \cdot t_2 + I_1 \cdot 2^m \leq S \cdot 2^m \leq t_1 \cdot n - \omega \cdot 2^m - \quad \text{(F8)"}$$
$$(I_2 + 1) \cdot 2^m - n$$

$$R_j = 2^\lambda \cdot R_{j+1} + M_1 \cdot M'_{2,j} - (I_j + \delta^*_j) \cdot n \quad \text{(F18)"}$$

$$Q = \sum_{j=1}^{l} (I_j + \delta^*_j) \cdot 2^{(j-1)\lambda} - \delta \quad \text{(F21)"}$$

$$\delta = \begin{bmatrix} 3 \text{ for } R_1 < -2n \\ 2 \text{ for } -2n \leq R_1 < -n \\ 1 \text{ for } -n \leq R_1 < 0 \\ 0 \text{ for } 0 \leq R_1 < n \\ -1 \text{ for } n \leq R_1 < 2n \\ -2 \text{ for } 2n \leq R_1 < 3n \end{bmatrix} \quad \text{(F22)"}$$

That is, a unit of $I'_j$ is used instead of $I_j$.

Corollary 3

Instead of Eq. (F16) for calculating $I_j$, $I_j$ can be obtained from Eqs. (F35) and (F36). In this case, however, let Eqs. (F7), (F8) and (F19) be Eq. (F7)', (F8)' and (F19)', respectively.

$$X + [(-I_j)n \cdot 2^{-m}] \geq 0 \quad \text{(F35)}$$

$$X + [(-I_j - 1)n \cdot 2^{-m}] < 0 \quad \text{(F36)}$$

$$-2^k + 1 + \omega \leq S \leq 2^{k+1} - A - 1 - 2\omega \quad \text{(F7)'}$$

$$2^{m+1} - n \cdot t_2 \leq S \cdot 2^m \leq t_1 \cdot n - \omega \cdot 2^m \quad \text{(F8)'}$$

$$-(S+A) \cdot 2^m + \omega \cdot \delta_{(j-1)\lambda}[M_1 \cdot 2^{-m}]2^m \leq R_j \quad \text{(F19)'}$$
$$< n + (2-S)2^m + \omega \cdot \delta_{(j-1)\lambda}[M_1 \cdot 2^{-m}]2^m$$

Corollary 4

The quotient Q and the remainder R can be obtained, letting the lower and upper limit values of $I_j$ expressed by Eq. (F17) be $-I_1 + 1$ if $A \cdot 2^{-k} + t_1 \geq 0$ and $I_2 - 2$ if $t_2 \geq 0$, respectively. In this case, $I_1$ in the theorem becomes $I_1 - 1$ and $I_2$ becomes $I_2 - 2$.

Corollary 5

By obtaining $R_j$ from Eq. (F18) using $I_j' = I_j + I_{j0}'$ (where $I_{j0}' = \pm 1, \pm 2, \ldots$) for $I_j$ obtained by Eq. (F16), the range of $R_j$ is given by Eq. (37). If this range of $R_j$ is included in the range of $R_{j+1}$, then the theorem holds. When the corollary 5 is combined with the corollary 3, the range of $R_j$ is given by Eq. (F38) and when combined with corollary 4, the range is given by Eq. (F39). When this corollary is combined with both of the corollaries 3 and 4, the range of $R_j$ is given by Eq. (F38). In the case where only one of the lower and upper limit values of $I_j$ is used for the corollary 4, $I_1 - 1$ and $(I_2 + 2) - 2$ in Eq. (F39) respectively become $I_1$ and $(I_2 + 1)$ corresponding to the lower and upper limit values.

$$-(S + A + (I_2 + 1)) \cdot 2^m + \tag{F37}$$
$$\omega \cdot \delta_{(j-1)\lambda}[M_1 \cdot 2^{-m}] \cdot 2^m - I_{j0} \cdot n \leq R_j <$$
$$n + (2 - S + I_1) \cdot 2^m + \omega \cdot \delta_{(j-1)\lambda}[M_1 \cdot 2^{-m}] \cdot 2^m - I_{j0} \cdot n$$

$$-(S + A) \cdot 2^m + \omega \cdot \delta_{(j-1)\lambda}[M_1 \cdot 2^{-m}] \cdot \tag{F38}$$
$$2^m - I_{j0} \cdot n \leq R_j < n + (2 - S) \cdot 2^m +$$
$$\omega \cdot \delta_{(j-1)\lambda}[M_1 \cdot 2^{-m}] \cdot 2^m - I_{j0} \cdot n$$

$$-(S + A + (I_2 + 1) - 2) \cdot 2^m + \tag{F39}$$
$$\omega \cdot \delta_{(j-1)\lambda}[M_1 \cdot 2^{-m}] \cdot 2^m - I_{j0} \cdot n \leq R_j < n +$$
$$(2 - S + (I_1 - 1))2^m + \omega \cdot \delta_{(j-1)\lambda}[M_1 \cdot 2^{-m}] \cdot 2^m - I_{j0} \cdot n$$

SPECIFIC EXAMPLES OF EXPRESSIONS OF THEOREM AND COROLLARIES

The following will show by way of example that the principle of the multiplier-divider could be expressed in various forms by suitable definition of constants shown in the theorem and its corollaries. In the following, those expressions are omitted which would inevitably result from definition of the constants. As regards those equations which would become easy to understand by changing their numerical expressions, they are represented with their expression changed.

EXAMPLE 1

This is an example in which the constants $K$, $A$, $\lambda$, $\omega$, $S$, $t_1$ and $t_2$, excepting $m$, are $K = 7$, $A = 1$, $\lambda = 4$, $\omega = 0$, $S = 26$, $t_1 = 185/128$ and $t_2 = 0$. The corollaries used are the corollary 1, the corollary 2, where $w = 5$, and the corollary 4.

$$1 \leq \frac{n}{2^{m+7}} < 2$$

$$0 \leq \alpha_j \leq 1$$
$$m = 0, 1, 2, \ldots$$
$$0 \leq M_1 < n$$

$$M_2 = \sum_{j=1}^{1} M_{2,j} \cdot 2^{4(j-1)}$$

where $$M_{2,j} = \sum_{\mu=0}^{3} \delta_{4(j-1)+\mu} \cdot 2^\mu, \ \delta_{4(j-1)+\mu} = 0 \text{ or } 1$$

$$R_{l+1} = 0 - \frac{58}{128} n - n \leq R_{j+1} < n$$

-continued $$I_j' = I_j + \delta_j^* = \begin{bmatrix} [X_2' \cdot v \cdot 2^{-13}] + 1, & \text{for } X_1' \geq 0 \\ [X_1' \cdot v \cdot 2^{-13}], & \text{for } X_1' < 0 \end{bmatrix}$$

$$\delta_j^* = 0 \text{ or } 1$$

where $$X_1' = [(2^4 \cdot R_{j+1,1})2^{-m}] + [(2^4 \cdot R_{j+1,0})2^{-m}] +$$
$$\sum_{\mu=0}^{3} [(M_1 \cdot \delta_{4(j-1)+\mu} \cdot 2^\mu)2^{-m}] + 26 + \alpha_j + \beta_j$$

$$0 \leq \beta_j \leq 4$$

$$v = \left[ \frac{2^{13}}{[n \cdot 2^{-m}]} \right] \quad -24 \leq I_j \leq 30$$

$$R_j = 2^4 \cdot R_{j+1} + M_1 \cdot M_{2,j} - I_j' \cdot n - n - \frac{58n}{128} \leq R_j < n$$

$$R = R_1 + \delta \cdot n$$

$$Q = \sum_{j=1}^{l} I_j' \cdot 2^{4(j-1)} - \delta$$

$$\delta = \begin{bmatrix} 2 \text{ for } R_1 < -n \\ 1 \text{ for } -n \leq R_1 < 0 \\ 0 \text{ for } R_1 \geq 0 \end{bmatrix}$$

EXAMPLE 2

This is an example in which $I_1$ and $I_2$ are determined using the corollary 4 and then the corollary 3 is applied.

(A) Precondition

The constants $K$, $\lambda$, $\omega$, $t_1$, $t_2$ and $S$, excepting $m$ and $A$, are determined by the following equations. $\xi$ is a newly defined variable.

$$K \geq 2$$

$$\lambda = 1$$

$$\omega = 0$$

$$t_1 = 2^{-k+1}$$

$$t_2 = 0$$

$$2^\xi \geq A + S$$

$$S = 2$$

(B) Calculations of the Constants

By obtaining $I_1$ and $I_2$ using the corollary 4, $I_1 = 1$ and $I_2 = 2$ are obtained, and $-1 \leq I_j \leq 2$ holds.

Next, defining a variable $Q_j$ which equals $I_j + 1$, it follows that $0 \leq Q_j \leq 3$. Here, since the corollary 4 is applied, for example, when $Q_j \leq 4$ is obtained, it is set that $Q_j = 3$.

Setting $$M_2 = \sum_{\mu=0}^{q} \delta_\mu \cdot 2^\mu,$$

the relation $M_{2,j}' = \delta_j$ holds on the conditions $\omega = 0$, $\lambda = 1$. Therefore, the following equations holds by the corollary 3:

$$[(2 \cdot R_{j+1})2^{-m}] + [(\delta_j \cdot M_1)2^{-m}] + 2 + \alpha_j$$

$$+[(1-Q_1)n \cdot 2^{-m}] \geq 0$$

$$[(2 \cdot R_{j+1})2^{-m}] + [(\delta_j \cdot M_1)2^{-m}] + 2 + \alpha_j + [(-Q_j) \cdot n \cdot 2^{-m}] < 0$$

Obtaining the range of $R_j$ from Eq. (F19), the following equation is obtained using $S + A \leq 2\xi$:

$$-n \leq -\frac{n}{2^{k-\xi}} \leq R_j < n$$

Eq. (F18) becomes as follows:

$$R_j = 2R_{j+1} + \delta_j \cdot M_1 + (1 - I_j) \cdot n$$

Taking into account that $j = l, l-1, \ldots 1, 0$, Eq. (F20) becomes as follows:

$$R = R_0 + \delta_{3j} \cdot n$$

where $$\delta_{3j} = \begin{cases} 1 \text{ for } R_0 < 0 \\ 0 \text{ for } R_0 \geq 0 \end{cases}$$

It will easily be understood that in the case of $\delta_{3j} = 1$ the expected value of $\delta_{3j} = 1$ becomes $2^{-k+\xi-1}$ on the assumption that $R_0$ is uniformly distributed in the section of $$-\frac{n}{2^{k-\xi}} \leq R_0 < n.$$

(C) Summary of the Constants and Equations

The following equation (H6) holds for $R_j$ (where $j = q, q-1, \ldots 1, 0$) defined by the following equations (H1) to (H5) shown as equations summarizing the above, and the quotient $Q$ and the remainder $R$ of $(M_1 \times M_2) \div n$ are given by the following equation (H7), where when $\delta_j = 1$ and $Q_j = 3$ holds at the same time, it is regarded that Eq. (H2) and (H3) hold.

$$\left. \begin{array}{l} R_{l+1} = 0 \\ 0 \leq M_1 < n \\ 1 \leq \dfrac{n}{2^{m+k}} < 2 \\ M_2 = \sum_{j=0}^{q} \delta_j \cdot 2^j, \text{ where } \delta_j = 0 \text{ or } 1 \\ K \geq 2 \\ m \geq 0 \\ 2 \geq 2 + \alpha_j \end{array} \right\} \quad \text{(H1)}$$

$$[(2R_{j+1}) \cdot 2^{-m}] + [(\delta_j \cdot M_1) \cdot 2^{-m}] + \quad \text{(H2)}$$
$$[(1 - Q_j) \cdot n \cdot 2^{-m}] + 2 + \alpha_j \geq 0$$

$$[(2R_{j+1}) \cdot 2^{-m}] + [(\delta_j \cdot M_1) \cdot 2^{-m}] + \quad \text{(H3)}$$
$$[(-Q_j) \cdot n \cdot 2^{-m}] + 2 + \alpha_j < 0$$

$$0 \leq Q_j \leq 3 \quad \text{(H4)}$$

$$R_j = 2R_{j+1} + \delta_j \cdot M_1 + (1 - Q_j) \cdot n \quad \text{(H5)}$$

$$-\frac{n}{2^{k-\xi}} \leq R_j < n \quad \text{(H6)}$$

$$R = R_0 + \delta_{3j} \cdot n$$

$$Q = \sum_{j=0}^{q} (Q_j - 1) 2^j - \delta_{3j}$$

where $$\delta_{3j} = \begin{cases} 1 \text{ for } R_0 < 0 \\ 0 \text{ for } R_0 \geq 0 \end{cases} \quad \text{(H7)}$$

Mean value is $2^{-k+\xi-1}$ when $\delta = 1$.

EXAMPLE 3

This is an example in which the corollaries 1, 2 and 4 are employed and, when $j = 1$, the corollary 5 is further used, and in which the constants K, A, $\lambda$, $\omega$, S, $t_1$, and $t_2$, excepting m, are set as follows: $K = 11$, $A = 1$, $\lambda = 8$, $\omega = 1$, $S = 405$, $t_1 = 1 + 1173/2048$ and $t_2 = 1$. Moreover, the value of w in the corollary 2 is set as $w = 10$.

$$1 \leq n \cdot 2^{-m-11} < 2$$
$$\alpha_j = 0, 1$$
$$m = 0, 1, 2, \ldots$$
$$0 \leq M_1 < n$$
$$M_{2,j}' = M_{2,j} - 2^8 \cdot \delta_{8j} + \delta_{8(j-1)}$$
where $$M_2 = \sum_{j=1}^{l} M_{2,j} \cdot 2^{8(j-1)}$$

$$M_{2,j} = \sum_{\mu=0}^{7} \delta_{8(j-1)+\mu} \cdot 2^\mu, \ \delta_{8(j-1)+\mu} = 0 \text{ or } 1$$

$$\delta_0 = 0$$
$$R_{l+1} = 0$$

$$-\frac{1174}{2048} \cdot n - n + \delta_{8j} \cdot M_1 \leq R_{j+1} < 2n + \delta_{8j} \cdot M_1$$

$$X_{2}' = [(2^8 \cdot R_{j+1,1})2^{-m}] + [(2^8 \cdot R_{j+1,0})2^{-m}] +$$

$$\sum_{\mu=0}^{7} [(Z_{j,\mu})2^{-m}] + S' + \alpha_j$$

where
$$R_{j+1,1} + R_{j+1,0} = R_{j+1}$$

$$\sum_{\mu=0}^{7} Z_{j,\mu} = M_1 \cdot \{-\delta_{8j} 2^8 + \delta_{7j+7} \cdot 2^7 + \ldots +$$
$$\ldots + \delta_{7j+1} \cdot 2^L + \delta_{7j} \cdot 2^0\}$$

$$S' = 405 + \beta_j$$
$$0 \leq \beta_j \leq 9$$

$$I_j' = I_j + \delta_j^* = \begin{cases} [X_2' \cdot v \cdot 2^{-22}] + 1 \text{ for } X_2' \geq 0 \\ [X_2' \cdot v \cdot 2^{-22}] \text{ for } X_2' < 0 \end{cases}$$

$$\delta_j^* = 0, 1$$
$$v = [2^{22} \div [n \cdot 2^{-m}]]$$
$$-403 \leq I_j \leq 766$$
$$R_j = 2^8 \cdot R_{j+1} + M_1 \cdot M_{2,j}' - I_j' \cdot n$$

$$-\frac{1173}{2048} \cdot n + \delta_{8(j-1)}[M_1 \cdot 2^{-m}] \cdot 2^m \leq R_j < n + \delta_{8(j-1)} \times$$
$$[M_1 \cdot 2^{-m}]2^m$$

$$R = R_1 + \delta \cdot n$$

$$Q = \sum_{j=0}^{l} I_j' \cdot 2^{8(j-1)} - \delta$$

$$\delta = 0, 1, 2, 3, 0 \leq R_1 + \delta \cdot n < n$$

EXAMPLE 4

This is an example in which the values of $I_1$ and $I_2$ are defined using the corollary 4 and then the corollaries 1 and 4 are applied.

(A) Precondition

At first, the constants are defined by the following equations, in which $X_j''$, $Q_j''$ and $Z_{j,\mu}$ are constants to be newly defined.

$$K = \lambda + 2$$

L = the number of significant digits, i.e.

$$2^{L-1} \leq n < 2^L$$

$$t_1 = 2 - 2^{-K}$$

$$t_2 = 0$$

A two-output carry save adder is used.
That is, $A = 1$, $\alpha_j = 0, 1$ $$S \geq I_1 + 2$$
$$X_j'' = X$$

$$Q_j'' I_j' = I_j + \delta_j^*$$

$$\phi = \begin{cases} \lambda \text{ for } \omega = 0 \\ \lambda/2 \text{ for } \omega = 1 \end{cases}$$

$$Z_{j,\mu} = M_1 \cdot \delta_{(j-1)\lambda+\mu} \cdot 2^\mu \text{ for } \omega = 0$$

$$Z_{j,\mu} = -M_1 \cdot \delta_{(j-1)\lambda+2\mu+2} \cdot 2^{2\mu+2} + M_1 \cdot \delta_{(j-1)\lambda+2\mu+1} \cdot 2^{2\mu+1} + 2M_1 \cdot \delta_{(j-1)\lambda+2\mu} \cdot 2^{2\mu} \text{ for } \omega = 1$$

$$u = K + W + 1$$

(B) Calculation of the Constants $I_1$ and $I_2$ obtained using the corollary 4 are as follows:

$$I_1 = 2^{\lambda+1}, \quad I_2 = 2^{\lambda+1} - 2$$

From Eq. (F1), $L = m + K + 1$ ∴ $m = L - \lambda - 3$

The range of S is obtained from Eqs. (F7) and (F8). But the range of S is made smaller than that obtained by calculation and $\omega$ is eliminated.

$$2^{\lambda+1} + 2 \leq S \leq 2^{\lambda+2}$$

From Eqs. (F15) and (F19) the ranges of $R_{j+1}$ and $R_j$ are obtained. The following is simplified representation of the ranges of $R_{j+1}$ and $R_j$ using the condition $$M_1 = [M_1 \cdot 2^{-m}] \cdot 2^m + 2^m \cdot \epsilon,$$

where $$0 \leq \epsilon < 1, \quad [M_1 \cdot 2^{-m}] \cdot 2^m \leq M_1.$$

$$-2n + \omega \cdot \delta_{j\lambda} \cdot M_1 \leq R_{j+1} < n + \omega \cdot \delta_{j\lambda} \cdot M_1$$

$$-n + \omega \cdot \delta_{(j-1)\lambda} \cdot M_1 < R_j < n + \omega \cdot \delta_{(j-1)\lambda} \cdot M_1$$

From the corollary 2, $$\begin{rcases} I_1 \leq 2^w \\ I_2 + 1 \leq 2^w \end{rcases} \therefore w \geq \lambda + 1$$
$$\therefore u \geq 2\lambda + 4$$

$$Q_j'' = \begin{cases} [X_j'' \cdot v \cdot 2^{-u}] + 1 \text{ for } X_j'' \geq 0 \\ [X_j'' \cdot v \cdot 2^{-u}] \text{ for } X_j'' < 0 \end{cases}$$

where $v = \left[ \dfrac{2^u}{[n \cdot 2^{-u}]} \right]$

From Eq. (F17), $-2^{\lambda+1} \leq I_j \leq 2^{\lambda+1} - 2$.

Since $Q_j'' = I_j' = I_j + \delta_j^*$, where $\delta_j^* = 0$ or 1, the range of $Q_j''$ is defined by $-2^{\lambda+1} \leq Q_j'' \leq 2^{\lambda+1}$. However, when $Q_j''$ obtained from Eq. (F32) is $Q_j'' = -2^{\lambda+1}$, then $Q_j''$ may be set as $Q_j'' = -2^{\lambda+1} + 1$ and when $Q_j'' = 2^{\lambda+1}$, then $Q_j''$ may be set as $Q_j'' = 2^{\lambda+1} - 1$. As a result, the range of $Q_j''$ may be defined as follows:

$$-2^{\lambda+1} + 1 \leq Q_j'' \leq 2^{\lambda+1} - 1$$

But when $Q_j''$ obtained from Eq. (F32) is $Q_j'' = -2^{\lambda+1}$, set $Q_j'' = -2^{\lambda+1} + 1$, and when $Q_j'' = 2^{\lambda+1}$, set $Q_j'' = 2^{\lambda+1} - 1$.

(C) Summary of Calculation Method of Parameters

At first L, $\lambda$, l, and $\omega$ are determined and then a set of integers n, S and u is obtained.

L = the number of significant digits (the number of bits)

$\lambda$ = the length of division of $M_2$ l = ceil $\{L \div \lambda\}$ $\omega = 0$ or 1

$m = L - \lambda - 3$ $$2^{\lambda+1} + 2 \leq S \leq 2^{\lambda+2}$$

$$u \geq 2\lambda + 4$$

where when $\omega = 1$, $\lambda$ is an even number. ceil $\{x\}$ indicates a minimum integer greater than x; for example, ceil $\{1.5\} = 2$.

(D) Execution of Calculation (a) Preparation

At first, n is input to obtain v. $v = [2^u \div [n \cdot 2^{-m}]]$
Next, $M_1$ and $M_2$ are input.

(b) Repeated Calculation

The calculation method is shown below in the form of a program flowchart.

Step 0:

$$j \leftarrow 1, R_{l+1,1} \leftarrow 0, R_{l+1,} \leftarrow 0$$

Step 1:

$$X_j'' \leftarrow \sum_{i=0}^{l} [(2^\lambda \cdot R_{j+1,i}) \cdot 2^{-m}] + \sum_{\mu=0}^{\phi-1} [(z_{j,\mu}) \cdot 2^{-m}] + S + \alpha_j + \beta_j$$

where $-2^u < X_j'' < 2^u$

Step 2:

$$Q_j'' \leftarrow \begin{cases} [X_j'' \cdot v \cdot 2^{-u}] + 1 \text{ for } X_j'' \geq 0 \\ [X_j'' \cdot v \cdot 2^{-u}] \text{ for } X_j'' < 0 \end{cases}$$

where when $Q_j'' = -2^{\lambda+1}$, set $Q_j'' = -2^{\lambda+1} + 1$, when $Q_j'' = 2^{\lambda+1}$, set $Q_j'' = 2^{\lambda+1} - 1$.

Step 3:

$$\sum_{i=0}^{1} R_{j,1} \leftarrow \sum_{i=0}^{1} 2^\lambda \cdot R_{j+1,i} + \sum_{\mu=0}^{\phi=0} Z_{j,\mu} - Q''_j \cdot n$$

Step 4:
When j=1, go to step 5.
Then j←j=1, go back to step 1.
Step 5: Repeated Calculation ends.
(c) Repeated Calculation
Step 6:

$$R_1 \leftarrow \sum_{i=0}^{1} R_{1,i}$$

If $R_1 \geq 0$, then go to step 8.
Step 7:

$$\sum_{i=0}^{1} R_{1,i} \leftarrow \sum_{i=0}^{1} R_{1,i} + n$$

Go back to step 6.
Step 8: When $R_1 \geq \omega \cdot n$, $R_1 \leftarrow R_1 - n$ $R \leftarrow R_1$. Halt.

EXAMPLE 5

This is an example in which $K=\lambda+3$ is set in place of $K=\lambda+2$ in Example 4. The other conditions are the same as those in Example 4. Only differences between the two example are given below.

$$K = \lambda + 3$$

$$m = L - \lambda - 4$$

$$\mu \geq 2\lambda + 5$$

The aforementioned embodiment of the present invention is described in connection with the case where $L=512$, $\lambda=4$, $l=128$ and $\omega=0$ and $m=504$, $S=38$ and $u=13$ are adopted.

Furthermore, it will easily be seen that, by setting $K=\lambda+i'$, $i'=4, 5, \ldots$, such various expressions as described above in respect of Examples 4 and 5 can be obtained.

VERIFICATION OF NUMERICAL EXPRESSIONS OF THE PRINCIPLE OF THE MULTIPLIER DIVIDER

Verificaton of Theorem Preparation of Verification

The following are definitions of abridged numerical expressions:

$$R_{-m} = [(2^\lambda \cdot R_{j+1})2^{-m}] \tag{F67}$$

$$M_{-m} = [(M_1 \cdot M_{2,j})2^{-m}] \tag{F68}$$

$$\omega_{-m} = [(-\omega \cdot \delta_{j\lambda} 2^\lambda \cdot M_1)2^{-m}] \tag{F69}$$

$$\omega_{-m-1} = [(\omega \cdot \delta_{(j-1)\lambda} \cdot M_1)2^{-m}] = \omega \cdot \delta_{(j-1)\lambda} [M_1 \cdot 2^{-m}] \tag{F70}$$

From Eq. (F15), $$-A \cdot n \cdot 2^{-k+\lambda} - 2^\lambda \cdot t_1 \cdot n + \omega \cdot \delta_{j\lambda} 2^\lambda M_1 \leq 2^\lambda R_{j+1} < 2^\lambda \cdot n + 2^\lambda t_2 \cdot n + \omega \cdot \delta_{j\lambda} 2^\lambda M_1 \tag{F71}$$

Setting $h = K - \lambda - \log_2 A$, from Eq. (F3), $$h \geq 0 \tag{F72}$$

Omitting low-order m bits on either side of Eq. (F71), $$[(-n \cdot 2^{-h} - 2^\lambda \cdot t_1 \cdot n + \omega \cdot \delta_{j\lambda} 2^\lambda M_1)2^{-m}] \leq R_{-m} \tag{F73}$$

$$R_{-m} < [(2^\lambda \cdot n + 2^\lambda \cdot t_2 \cdot n + \omega \cdot \delta_{j\lambda} 2^\lambda M_1)2^{-m}] \tag{F74}$$

On the other hand, the following equation holds for the real number $x_i$ and an integer $\phi$ where $\delta_\phi$ is an integer.

$$\sum_{j=1}^{\phi}[x_i] = \left[\sum_{i=1}^{\phi} x_i\right] - \gamma_\phi \tag{F75}$$

$$0 \leq \gamma_\phi \leq \phi - 1 \tag{F76}$$

When $\omega \neq 0$, applying Eq. (F75) to $M_1 \times$ Eq. (F10), $$M_{-m} = [(M_1 \cdot M_{2,j})2^{-m}] + \omega_{-m} + \omega_{-m-1} + \gamma_3 \cdot \omega \tag{F77}$$

$$\gamma_3 = 0, 1 \text{ or } 2 \tag{F78}$$

From Eq. (F9) $\times M_{2,j}$ $$0 \leq [(M_1 \cdot M_{2,j})2^{-m}] < [(n \cdot M_{2,j})2^{-m}] \tag{F79}$$

From Eqs. (F77) and (F79), $$\omega_{-m} + \omega_{-m-1} + \gamma_3 \cdot \omega \leq M_{-m} \tag{F80}$$

$$M_{-m} < \omega_{-m} + \omega_{-m-1} + \gamma_3 \cdot \omega + [(n \cdot M_{2,j})2^{-m}] \tag{F81}$$

Next, substituting Eqs. (F67), (F68) and (F70) into Eq. (F16)

$$I_j = \left[\frac{(R_{-m} + M_{-m} + S + \alpha_j - \omega_{-m-1})}{[n \cdot 2^{-m}]}\right] \therefore$$

$$\frac{(R_{-m} + M_{-m} + S + \alpha_j - \omega_{-m-1})}{[n \cdot 2^{-m}]} - 1 < I_j \leq \frac{(R_{-m} + M_{-m} + S + \alpha_j - \omega_{-m-1})}{[n \cdot 2^{-m}]} \therefore \tag{F82}$$

$$R_{-m} + M_{-m} + S + \alpha_j - \omega_{-m-1} + (-I_j)[n \cdot 2^{-m}] \geq 0$$

$$R_{-m} + M_{-m} + S + \alpha_j - \omega_{-m-1} + (-I_j - 1) \cdot [n \cdot 2^{-m}] < 0 \tag{F83}$$

On the other hand, the following equation holds for the integer I and the real number x:

$$[I + x] = I + [x] \tag{F84}$$

Accordingly, removing the Gaussian symbols from the both sides of Eqs. (F82) and (F83) and omitting the decimal point, Eqs. (F82) and (F83) become the following equations because $R_{-m}$, S, $\alpha_j$ and $\omega_{-m-1}$ are respectively integers.

$$R_{-m} + M_{-m} + S + \alpha_j - \omega_{-m-1} + [(-I_j) \cdot [n \cdot 2^{-m}]] \geq 0 \tag{F82'}$$

$$R_{-m} + M_{-m} + S + \alpha_j - \omega_{-m-1} + [(-I_j - 1) \cdot [n \cdot 2^{-m}]] < 0 \tag{F83'}$$

However, the following equation holds for the integer I and the real number $x > 0$, with P an integer.

$$[(-I) \cdot [x]] = [(-I) \cdot x] + P \tag{F85}$$

where $$0 \leq P \leq 1 \text{ for } I \geq 0$$
$$1 \leq P \leq 0 \text{ for } I \leq 0 \quad \text{(F86)}$$

The following is assumed letting $I_1'$ and $I_2'$ be integers as condition of $I_j$.

$$-I_1' \leq I_j \leq I_2' \quad \text{(F87)}$$

$$-I_1' \leq -1$$
$$I_2' \geq 0 \quad \text{(F88)}$$

(A) When $I_j < 0$:

Eqs. (F85) to (F88) are applied to Eqs. (F82)′ and (F83)′.

$$R_{-m} + M_{-m} + S + \alpha_j - \omega_{-m-1} + [(-I_j)n \cdot 2^{-m}] + P_1 \geq 0 \quad \text{(F89)}$$

$$R_{-m} + M_{-m} + S + \alpha_j - \omega_{-m-1} + [(-I_j-1)n \cdot 2^{-m}] - P_1 < 0 \quad \text{(F90)}$$

$$-I_1' \leq P_1 \leq 0 \quad \text{(F91)}$$

(B) When $I_j \geq 0$:

The following equations are obtained in the same manner as described above.

$$R_{-m} + M_{-m} + S + \alpha_j - \omega_{-m-1} + [(-I_j)n \cdot 2^{-m}] + P_2 \geq 0 \quad \text{(F92)}$$

$$R_{-m} + M_{-m} + S + \alpha_j - \omega_{-m-1} + [(-I_j-1)n \cdot 2^{-m}] + P_2 < 0 \quad \text{(F93)}$$

$$0 \leq P_2 \leq I_2' + 1 \quad \text{(F94)}$$

Lower Limit Value of $I_j$ (left side of Eq. (F17))

Using U for the left side of Eq. (F89) and substituting with $I_j = -2^\lambda t_1 - 2$, $$R_{-m} + M_{-m} + S + \alpha_j - \omega_{-m-1} + [(2^\lambda t_1 + 2)n \cdot 2^{-m}] + P_1 = U \quad \text{(F95)}$$

From Eq. (F73) + Eq. (F88) + Eq. (F95), $$[(-n \cdot 2^{-h} - 2^\lambda t_1 \cdot n + \omega \cdot \delta_\lambda \cdot 2^\lambda M_1) 2^{-m}] + \omega_{-m} + \omega_{-m-1} + \gamma_3 \cdot \omega + S + \alpha_j - \omega_{-m-1} + P_1 + [(2^\lambda t_1 + 2)n \cdot 2^{-m}] \leq U$$

Applying Eq. (F75) to the above equations in the cases of $\omega = 0$ and $\omega \neq 0$ separately, $$[(1 - 2^{-h})n \cdot 2^{-m} + n \cdot 2^{-m}] - \gamma_2 + \gamma_3 \cdot \omega + S + \alpha_j + P_1 \leq U \quad \text{(F96)}$$

$$\gamma_2 = 0, \ldots 1 + \omega \quad \text{(F97)}$$

$$\therefore [(1 - 2^{-h})n \cdot 2^{-m}] + [n \cdot 2^{-m}] + \epsilon_1 - \gamma_2 + \gamma_3 \omega + S + \alpha_j + P_1 \geq U \quad \text{(F98)}$$

where, $$\epsilon_1 = 0 \text{ or } 1 \quad \text{(F99)}$$

From Eq. (F72), $[(1 - 2^{-h})n \cdot 2^{-m}] \geq 0$, and from Eq. (F1) $2^K \leq [n \cdot 2^{-m}]$. Therefore, when the left side of Eq.

(F98) becomes minimum when $\epsilon_1 = 0$, $\gamma_2 = 1 + \omega$, $\gamma_3 = 0$, $\alpha_j = 0$, $P_1 = -I_1'$.

$$\therefore 2^K - (1 + \omega) + S - I_1' \leq U \quad \text{(F100)}$$

Accordingly, if $I_1'$ is selected such that $I_1' = [2^\lambda t_1 + 2] \geq 1$, the condition of Eq. (F88) is satisfied by Eq. (F7) and $I_1' = I_1$, resulting in the following equation holding:

$$0 \leq U \quad \text{(F101)}$$

Further, when $I_j < -2^\lambda t_1 - 2$, the Eq. (F89) holds but Eq. (F90) does not hold.

$$\therefore -I_1 \leq I_j \quad \text{(F102)}$$

Upper Limit Value of $I_j$ (right side of Eq. (F17))

Using V for the left side $I_j = 2^{\lambda+1} + 2^\lambda \cdot t_2$ in Eq. (F93), it follows from $2^{\lambda+1} = 2^\lambda + 2^\lambda$ that $$V = R_{-m} + M_{-m} + S + \alpha_j - \omega_{-m-1} + [(-2^\lambda n - 2^\lambda n - 2^\lambda t_2 - n)2^{-m}] + P_2 \quad \text{(F103)}$$

Eq. (F74) + Eq. (F81) + Eq. (F103)

$$V < [2^\lambda n + 2^\lambda t_2 \cdot n + \omega \cdot \delta_\lambda 2^\lambda M_1] 2^{-m}] + \quad \text{(F104)}$$

$$\omega_{-m} + \omega_{-m-1} + \gamma_3 \cdot \omega[(n \cdot M_{2,j})2^{-m}] +$$

$$S + \alpha_j - \omega_{-m-1} + P_2 + [(-2^\lambda n - 2^\lambda n - 2^\lambda \cdot t_2 - n)2^{-m}]$$

where $\gamma_3 = 0$, 1 or 2 $\quad \text{(F105)}$

Eq. (F75) of the formula is applied to Eq. (F105)

$$V < [M_{2,j} - (2^\lambda - 1))n \cdot 2^{-m} + (-2n)2^{-m}] - \quad \text{(F106)}$$

$$\gamma_4 + \gamma_3 \quad \omega + S + \alpha_j + P_2$$

$$\therefore V < [M_{2,j} - \times (2^\lambda - 1))n \cdot 2^{-m}] +$$

$$[(-2n)2^{-m}] + \epsilon_1 - \gamma_4 + \gamma_3 \cdot \omega + S + \alpha_j + P_2$$

where $$\epsilon_1 = 0 \text{ or } 1 \quad \text{(F107)}$$

$$\gamma_4 = 0, 1, 2 \text{ or } 3 \quad \text{(F108)}$$

$$\gamma_3 = 0, 1 \text{ or } 2 \quad \text{(F78)}'$$

However, $[(-2n)2^{-m}] \leq -2^{k+1}$ holds from Eq. (F1) and $M_{2,j} \leq (2^{\lambda-1})$, that is, $[(M_{2,j} - (2^\lambda - 1))n \cdot 2^{-m}] \leq 0$ holds from Eq. (F12). Since the right side of Eq. (F106) becomes maximum when $\epsilon_1 = 1$, $\gamma_4 = 0$, $\gamma_3 = 2$, $\alpha_j = A$, $P_2 = I_2' + 1$, $$V < -2^{k+1} + 1 + 2\omega + S + A + I_2' + 1 \quad \text{(F109)}$$

Accordingly, if $I_2'$ is selected such that $I_2' = [2^{\lambda+1} + 2^\lambda \cdot t_2] \geq 0$, then the condition of Eq. (F88) is satisfied by Eq. (F7) and, from Eq. (F7), the following equation holds with $I_2' = I_2$.

$$V < 0 \quad \text{(F110)}$$

On the other hand, when $I_j \leq 2^{\lambda+1} + 2^\lambda \cdot t_2$, Eq. (F93) holds but Eq. (F92) does not.

$$\therefore I_j \leq I_2 \quad \text{(F111)}$$

Range of $R_j$ (Verification of Eq. (F19))

Eq. (F75) is applied to Eqs. (F89) and (F92) to substitute therein Eq. (F18).

$$[(R_j)2^{-m}] - \gamma_3 + S + \alpha_j - \omega_{-m-1} + P \geq 0 \quad \text{(F112)}$$

where $$\gamma_3 = 0, 1 \text{ or } 2 \quad \text{(F113)}$$

$$P = \begin{pmatrix} P_1 \text{ for } I_j < 0 \\ P_2 \text{ for } I_j \geq 0 \end{pmatrix} \quad \text{(F114)}$$

$$\therefore \gamma_3 - S - \alpha_j - P + \omega_{-m-1} \leq [(R_j)2^{-m}]$$

The left side of the above equation becomes minimum when $\gamma_3=0$, $\alpha_j=A$, $P=P_2=I_2+1$.

$$\therefore -(S + A + (I_2 + 1)) + \omega_{-m-1} \leq [(R_j)2^{-m}] \quad \text{(F115)}$$

$$\therefore -(S + A + (I_2 + 1)) \cdot 2^m + \omega \cdot \delta_{(j-1)\lambda}[M_1 \cdot 2^{-m}] \cdot 2^m \leq R_j$$

Next, Eq. (F75) to Eqs. (F90) and (F93) to substitute thereinto Eq. (F18).

$$[(R_j - n)2^{-m}] - \gamma_3 + S + \alpha_j - \omega_{-m-1} + P < 0 \quad \text{(F116)}$$

where $$\gamma_3 = 0, 1 \text{ or } 2 \quad \text{(F117)}$$

$$P = \begin{pmatrix} P_1 \text{ for } I_j < 0 \\ P_2 \text{ for } I_j \geq 0 \end{pmatrix} \quad \text{(F118)}$$

$$\therefore [(R_j - n)2^{-m}] < \gamma_3 - S - \alpha_j - P + \omega_{-m-1}$$

The right side of the above equation becomes maximum when $\gamma_3=2$, $\alpha_j=0$, $P=P_1=-I_1$.

$$\therefore [(R_j - n)2^{-m}] < 2 - S + I_1 + \omega_{-m-1} \quad \text{(F119)}$$

$$\therefore R_j - n < (2 - S + I_1) \cdot 2^m + \omega_{-m-1} \cdot 2^m$$

$$\therefore R_j < n + (2 - S + I_1) \cdot 2^m + \omega \cdot \delta_{(j-1)\lambda}[M_1 \cdot 2^{-m}] \cdot 2^m$$

By Eqs. (F115) and (F119) it has been verified that Eq. (F19) holds.

RELATIONSHIP BETWEEN RANGES OF $R_{j+1}$ AND $R_j$ ((F15) AND (F19))

Next, the fact that the range of $R_j$ given by Eq. (F19) is smaller than the range of $R_{j+1}$ given by Eq. (F15) is shown using $j+1$ for $j$ and $\delta_{j\lambda}$ for $\delta_{(j-1)\lambda}$ in Eq. (F19).

Set $R_U$=(upper limit value of $R_{j+1}$−upper limit value of $R_j$).

$$R_U = n + t_2 \cdot n + \omega \cdot \delta_{j\lambda}M_1 - n - (2 - S +)I_1) \cdot 2^m - \quad \text{(F120)}$$

$$\omega \cdot \delta_{j\lambda[M1} \cdot 2^{-m}]2^m$$

$$\therefore R_U = (S \cdot 2^m - 2^{m+1} + n \cdot t_2 - I_1 \cdot 2^m) +$$

$$2^m(\omega \cdot \delta_{j\lambda}M_1 \cdot 2^{-m} - [\omega \cdot \delta_{j\lambda}M_1 \cdot 2^{-m}])$$

Therefore, from Eq. (F8)

$$R_U \geq 0 \quad \text{(F121)}$$

Set $R_L$=(lower limit value of $R_j$−lower limit value of $R_{j+1}$).

$$R_L = -(S + A + (I_2 + 1)) \cdot 2^m + \omega \delta_{j\lambda}[M_1 \cdot 2^{-m}] \cdot 2^m +$$

$$A \cdot n \cdot 2^{-k} + t_1 \cdot n - \omega \cdot \delta_{j\lambda}M_1$$

$$\therefore R_L = (-S \cdot 2^m + t_1 \cdot n - \omega \cdot 2^m - (I_2 + 1) \cdot 2^m) +$$

$$A \cdot 2^m(n \times 2^{-m-l} - 1) + 2^m\{[\omega \cdot \delta_{j\lambda} \cdot M_1 \cdot 2^{-m}] -$$

$$(\omega \cdot \delta_{j\lambda} \cdot M_1 \cdot 2^{-m}) + \omega\}$$

Therefore, from Eq. (F8)

$$R_L \geq 0 \quad \text{(F122)}$$

By Eqs. (F121) and (F122) it has been verified that the range of $R_j$ is included in the range of $R_{j+1}$.

Accordingly, the recurrence formula shown by Eqs. (F14) to (F19) repeat in order $j=l, l-1, \ldots 2, 1$, and $R_l$, $R_{l-1}, \ldots, R_2, R_1$ and $I_l, I_{l-1}, \ldots I_2, I_1$ can be obtained.

CALCULATION OF R AND Q (EQS. (F120) TO (F122))

The following equation is obtained by performing an operation $$\sum_{j=1}^{l} \cdot 2^{(j-1)\lambda}$$

on both sides of Eq. (F20).

$$R_1 = R_{l+1} \cdot 2^{l\lambda} + M_1 \times \sum_{j=1}^{l} M_{2,j} \cdot 2^{(j-1)\lambda} - \omega \cdot \delta_{l\lambda}M_1 \cdot 2^{l\lambda} +$$

$$\omega \cdot \delta_0 \cdot M_1 - n \cdot \sum_{j=1}^{l} I_j \cdot 2^{(j-1)\lambda}$$

Accordingly, substituting $R_{l+1}=0$, $\delta_{l\lambda}=0$, $\delta_0=0$ and $M_2$ from Eqs. (F11) to (F14) to the above equation, $$R_1 = M_1 \times M_2 - n \times Q_1 \quad \text{(F123)}$$

where $$Q_1 = \sum_{j=1}^{l} I_j \cdot 2^{(j-1)\lambda} \quad \text{(F124)}$$

On the other hand, the following equation holds for the quotient Q and the remainder R of $(M_1 \times M_2) \div n$.

$$R = M_1 \times M_2 - n \times Q \quad \text{(F125)}$$

From Eqs. (F123) and (F125) it follows that $$R - R_1 = -n \times (Q - Q_1) \quad \text{(F126)}$$

Since Q and $Q_1$ are integers, it is seen that the difference between R and $R_1$ is an integral multiple of n. And $R_1$ satisfies Eq. (F19), but $I_1$ and $I_2$ are substituted thereinto.

$$\therefore -(S+A+[2^{\lambda+1}+2^\lambda \cdot t_2+1])2^m + \omega \cdot \delta_0[M_1 \cdot 2^{-m}] \cdot 2^m$$

$$\leq R_1 < n + (2-S+[2^\lambda \cdot t_1+2]) \cdot 2^m + \omega \cdot \delta_0[M_1 \cdot 2^{-m}] \cdot 2^m$$

However, since $0 < \omega \cdot \delta_0[M_1 \cdot 2^{-m}] \cdot 2^m < n\omega$ holds from Eq. (F9), the following equation can be obtained.

$$-(S+A+[2^{\lambda+1}+2^{\lambda} \cdot t_2+1])2^m \leq R_1 < 2n+(2-S+[2^{\lambda} \cdot t_1+2]) \cdot 2^m + n\omega \tag{F127}$$

Then, the following equation is obtained from $2^m \times$ Eq. (F7)

$$(-2^{k+1}+1+2\omega) \cdot 2^m \leq -(S+A+[2^{\lambda+1}+2^{\lambda} \cdot t_2+1]) \cdot 2^m \tag{F128}$$

$$(2-S+[2^{\lambda} \cdot t_1+2])2^m \leq (2^k+1-\omega)2^m \tag{F129}$$

From Eqs. (F127) to (F129) it follows that $$(-2^{k+1}+1+2\omega) \cdot 2^m \leq R_1 < n+(2^k+1-\omega) \cdot 2^m + n\omega \tag{F130}$$

Further, $-2n \leq -2^{m+k+1}$, $2^{m+k} \leq n$ hold from Eq. (F1) and, substituting them into the above equation, $$-2n+(1+2\omega) \cdot 2^m \leq R_1 < 2n+(1-\omega) \cdot 2^m + n\omega$$

From Eq. (F6), $\omega = 0$ or 1 and, substituting it into the left side of the above equation, $$-2n < R_1 < 2n+(1-\omega) \cdot 2^m + n\omega \tag{F131}$$

Since the difference between R and $R_1$ is an integral multiple of n, it is easily seen from Eqs. (F125) and (F126) that Eqs. (F20) to (F22) hold. Thus, it has been entirely verified that the theorem holds.

VERIFICATION OF COROLLARIES OF THEOREM

Verification of Corollary 1

From Eq. (F25)

$$[(2^{\lambda} \cdot R_{j+1})2^{-m}] = [(2^{\lambda} \cdot R_{j+1,1})2^{-m}] + [(2^{\lambda} R_{j+1,0})2^{-m}] + \beta_{j,R} \tag{F132}$$

where, $0 \leq \beta_{j,R} \leq 1$
From Eq. (F26)

$$\left[\left(\sum_{\mu=0}^{\phi-1} Z_{j,\mu}\right) 2^{-m}\right] = [(M_1 \cdot M'_{2,j})2^{-m}] \tag{F133}$$

$$\left[\left(\sum_{\mu=0}^{\phi-1} Z_{j,\mu}\right) 2^{-m}\right] = \sum_{\mu=0}^{\phi-1} [(Z_{j,\mu})2^{-m}] + \beta'_{j,z} \tag{F134}$$

where $0 \leq \beta'_{j,z} \leq \phi-1$
From Eqs. (F132), (F133) and (F134)

$$[(2^{\lambda} \cdot R_{j+1})2^{-m}] + [(M_1 \cdot M'_{2,j}) \cdot 2^{-m}] = [(2^{\lambda} \cdot R_{j+1,1})2^{-m}] + [(2^{\lambda} \cdot R_{j+1,0})2^{-m}] + \sum_{\mu=0}^{\phi-1} [(Z_{j,\mu})2^{-m}] + \beta_j \tag{F136}$$

where $\beta_j = \beta_{j,R} + \beta'_{j,z}$ $0 \leq \beta_j \leq \phi \tag{F137}$ Substituting Eqs. (F136) and (F137) into Eq. (F23), the following equation is obtained taking Eq. (F27) into account.

$$X = X' \tag{F138}$$

Accordingly, it is understood from Eqs. (F16) and (F138) that Eq. (F29) holds. Incidentally, when Eq. (F29) is used, $S'$ is used, so that it is apparent that $S'$ is used instead of S in the theorem.

Verification of Corollary 2

Substituting X in Eq. (F23) into Eqs. (F82) and (F83), $$X+(-I_j) \cdot [n \cdot 2^{-m}] \geq 0 \tag{F82}'$$

$$X+(-I_j-1) \cdot [n \cdot 2^{-m}] < 0 \tag{F83}'$$

$$\therefore (I_j) \cdot [n \cdot 2^{-m}] \leq X < (I_j+1) \cdot [n \cdot 2^{-m}] \tag{F139}$$

By substituting the minimum and the maximum value of $I_j$ in Eq. (F17) into the left and the right side, respectively, the following equation is obtained.

$$-I_1 \cdot [n \cdot 2^{-m}] \leq X < (I_2+1) \cdot [n \cdot 2^{-m}]$$

Substituting Eqs. (F30) and (F31) into the above equation, $$-2^w [n \cdot 2^{-m}] \leq X < 2^w \cdot [n \cdot 2^{-m}] \tag{F140}$$

From Eq. (F1), $[n \cdot 2^{-m}] < 2^{k+1}$ holds: substituting it into the above equation, $$-1 < X \cdot 2^{-(k+w+1)} < 1 \tag{F141}$$

Next, Y is defined in the following manner.

$$Y = \left[\frac{X}{[n \cdot 2^{-m}]}\right] - [X \cdot v \cdot 2^{-(k+w+1)}] \tag{F142}$$

$$Y = \left[\frac{X}{[n \cdot 2^{-m}]} - X \cdot v \cdot 2^{-(k+w+1)}\right] + \delta_1 \tag{F143}$$

$\delta_1 = 0$ or 1

Substituting v from Eq. (F33), $$Y = \left[X \cdot 2^{-(k+w+1)} \left(\frac{2^{(k+w+1)}}{[n \cdot 2^{-m}]} - \left[\frac{2^{(k+w+1)}}{[n \cdot 2^{-m}]}\right]\right)\right] + \delta_1 \tag{F144}$$

Setting $\epsilon_1 = \frac{2^{(k+w+1)}}{[n \cdot 2^{-m}]} - \left[\frac{2^{(k+w+1)}}{[n \cdot 2^{-m}]}\right]$, $0 \leq \epsilon_1 < 1$, so that the following equation is obtained taking Eq. (F141) into account.

$$Y = \begin{cases} \delta_1 & \text{for } X \geq 0 \\ \delta_1 - 1 & \text{for } X < 0 \end{cases} \tag{F144}$$

Setting $\delta_1 = 1 - \delta_j^*$ and substituting Y, $$\left[\frac{X}{[n \cdot 2^{-m}]}\right] - [X \cdot v \cdot 2^{-(k+w+1)}] = \begin{cases} 1 - \delta_j^* & \text{for } X \geq 0 \\ -\delta_j^* & \text{for } X < 0 \end{cases} \quad (F145)$$

$$\therefore \left[\frac{X}{[n \cdot 2^{-m}]}\right] + \delta_j^* = \begin{cases} [X \cdot v \cdot 2^{-(k+w+1)}] + 1 & \text{for } X \geq 0 \\ [X \cdot v \cdot 2^{-(k+w+1)}] & \text{for } X < 0 \end{cases}$$

$\delta_j^* = 0$, 1 and $I_j$ in Eq. (F16) to obtain Eq. (F32). Next, Eq. (F19)″ is verified. Eq. (F75) is applied to Eqs. (F89) and (F92) to substitute thereinto Eq. (F18)″.

$$[(R_j + \delta_j^* \cdot n)2^{-m}] - \gamma_3 + S + \alpha_j - \omega_{-m-1} + P \geq 0 \quad (F112)″$$

where $\gamma_3 = 0, 1, 2$ $$P = \begin{cases} P_1 & \text{for } I_j < 0 \\ P_2 & \text{for } I_j \geq 0 \end{cases}$$

Thereafter, the following equation is obtained in the same manner as in the case of Eq. (F115)

$$-(S + A + (I_2 + 1)) + \omega_{-m-1} \leq [(R_j + \delta_j^* \cdot n)2^{-m}]$$

$$\therefore -(S + A + (I_2 + 1)) \cdot 2^m + \omega \cdot \delta_{(j-1)\lambda}[M_1 \cdot 2^{-m}] \cdot 2^{+m} -$$

$$\delta_j^* \cdot \leq R_j$$

The left side of the above equation becomes minimum when $\delta_j^* = 1$, by which the left of Eq. (F19)″ is verified. Next, Eq. (F75) is applied to Eqs. (F90) and (F93) to substitute thereinto Eq. (F18)″.

$$[(R_j - n + \delta_j^* \cdot n)2^{-m}] - \gamma_3 + S + \alpha_j - \omega_{-m-1} + P < 0 \quad (F116)″$$

wherein $\gamma_3 = 0, 1, 2$ $$P = \begin{cases} P_1 & \text{for } I_j < 0 \\ P_2 & \text{for } I_j \geq 0 \end{cases}$$

Thereafter, the following equation is obtained in the same manner as in the case of obtaining Eq. (F119).

$$R_j < n - \delta_j^* \cdot n + (2 - S + I_1) \cdot 2^m + \omega \cdot \delta_{(j-1)\lambda}[M_1 \cdot 2^{-m}]2^m$$

The right side of the above equation becomes maximum when $\delta_j^* = 0$, by which the right side of (F19)″.

Next, it is verified that Eq. (F8) is necessary. Set $R_L' = $ (the lower limit value of $R_j$) − (the lower limit value of $R_{j+1}$), then $$R'_L = (-S \cdot 2^m + t_1 \cdot n - \omega \cdot 2^m - (I_2 + 1) \cdot 2^m - n) + A \cdot 2^m \times$$

$$(n \cdot 2^{-m-k} - 1) + 2^m \{[\omega \cdot \delta_{j\lambda} M_1 \cdot 2^{-m}] -$$

$$(\omega \cdot \delta_{j\lambda} M_1 \cdot 2^{-m}) + \omega\}$$

Thus, evidence has been given that Eq. (F8)″ is necessary. The upper limit value remains unchanged.

Next, an operation $$\sum_{j=1}^{l} 2^{(j-1)\lambda}$$

is performed on both sides of Eq. (F18)″ to obtain the following equation.

$$R_1 = M_1 \times M_2 - n \times Q_1' \quad (F123)'$$

where $$Q_1' = \sum_{j=1}^{l} (I_j + \delta_j^*) 2^{(j-1)\lambda} \quad (F124)'$$

It is evident that Eqs. (F21)″ and (F22)″ holds in the same manner as Eqs. (F125) to (F131).

Verification of Corollary 3

The conditions for which Eqs. (F35) to (F36) hold means that Eqs. (F90), (F92) and (F93) hold regardless of whether $I_j$ is positive or negative and when $P_1 = 0$, $P_2 = 0$.

Accordingly, Eq. (F100) becomes as follows:

$$2^k - (1 + \omega) + S \leq U \quad (F100)'$$

However, $0 \leq U$ unconditionally holds from Eq. (F7)'. Further, it is apparent that when $I_j < -2^\lambda t_1 - 2$, Eqs. (F90) and (F93) do not hold.

$$\therefore -I_1 \leq I_j \quad (F102)'$$

Similarly, Eq. (F109) becomes as follows:

$$V < -2^{k+1} + 1 + 2\omega + S + A \quad (F109)'$$

However, $V < 0$ unconditionally holds from Eq. (F7)'. It is apparent that when $I_j > 2^{\lambda+1} + 2^\lambda \cdot t_2$, Eqs. (F89) and (F92) do not hold.

$$\therefore I_j \leq I_2 \quad (F111)'$$

Next, since $P = 0$ holds in Eq. (F114), Eq. (F19)' holds by checking the proof of the theorem following Eq. (F112) and it is evident that Eq. (F8)' is a precondition of theorem.

Verification of Corollary 4

(A) Lower Limit Value of $I_j$
$I_j = -2^\lambda \cdot t_1 - 1$ is substituted into Eq. (F18).

$$R_j = 2^\lambda \cdot R_{j+1} + M_1 \cdot M_{2,j} - \omega \cdot \delta_{j\lambda} 2^\lambda M_1 + \omega \cdot \delta_{(j-1)\lambda} M_1 + (2^\lambda \cdot t_1 + 1)n$$

From Eq. (F12), $M_{2,j} \leq 0$, substituting it into the above equation, $$R_j \geq 2^\lambda \{R_{j+1} - (-A \cdot n \cdot 2^{-k} - t_1 \cdot n + \omega \cdot \delta_{j\lambda} \cdot M_1)\} + n(1 - 2^{-(k-\lambda-\log 2A)}) + \omega \cdot M_1 \cdot \delta_{(j-1)\lambda} \quad (F146)$$

Therefore, from Eqs. (F15) and (F3), $$\omega \cdot \delta_{(j-1)\lambda} \cdot M_1 \leq R_j \quad (F147)$$

Next, consider the case where $I_j = -2^\lambda \cdot t_1 - 2$. In this case, Eq. (F19) holds naturally. At this time, when obtaining $R_j$ from Eq. (F18) with $I_j = -2^\lambda \cdot t_1 - 1$, $R_j$ is smaller by $-n$ than in the case where $I_j = -2^\lambda \cdot t_1 - 2$, but the lower limit value of $R_j$ is defined by Eq. (F147). Accordingly, it is seen that the lower limit value of $R_j$ is larger than the lower limit value of $R_{j+1}$ shown by Eq. (F15) because $-A\cdot n2^{-k}-t_1\cdot n \leq 0$ holds as the precondition for corollary 4.

(B) Upper Limit Value of $I_j$ $I_j=2^{\lambda+1}+2^{\lambda}\cdot t_2-2$ is subtituted to Eq. (F18). Setting $2^{\lambda+1}=2^{\lambda}+2^{\lambda}$, $$R_j=2^{\lambda}\cdot R_{j+1}+M_1\cdot M_{2,j}-\omega\cdot\delta_{j\lambda}M_1\cdot 2^{\lambda}+\omega\cdot M_1\cdot\delta_{(j-1)\lambda}\\-(2^{\lambda}+2^{\lambda}+2^{\lambda}t_2-2)n$$

From Eq. (F12), $M_{2,j} \leq 2^{\lambda}-1$; substituting it into the above equation, $$R_j \leq 2^{\lambda}\{R_{j+1}-(n+t_2\cdot n+\omega\cdot\delta_{j\lambda}M_1)\}\\+(M_1-n)(2^{\lambda}-1)+n+\omega\cdot M_1\cdot\delta_{(j-1)\lambda} \quad (F148)$$

Accordingly, from Eq. (F15)

$$R_j < n+\omega\cdot M_1\cdot\delta_{(j-1)\lambda} \quad (F149)$$

Next, consider the case where $2^{\lambda+1}+2^{\lambda}\cdot t_1 \geq I_j \geq 2^{\lambda+1}+2^{\lambda}t_1-1$ holds. In this case, Eq. (F19) naturally holds. At this time, obtained from Eq. (F18) setting $I_j=2^{\lambda+1}+2^{\lambda}\cdot t_1-2$, $R_j$ is found to be larger than the value $(2^{\lambda+1}+2^{\lambda}t_1 \geq I_j \geq 2^{\lambda}\cdot t_1-1)$ of the first $I_j$ by $+n$ or $+2n$, but the upper limit value of $R_j$ at that time is defined by Eq. (F149).

Accordingly, it is seen that the upper limit value of $R_j$ is smaller than the upper limit value of $R_{j+1}$ because $t_2\cdot n \geq 0$ holds as the precondition for the corollary 4.

Thus, evidence has been given that the corollary 4 holds.

Verification of Corollary 5.

It is evident that Eq. (F18) that Eq. (F19) holds, permitting the corollary 5 to hold.

As described above, according to the present invention, since $(M_1 \times M_2) \div n$ can be executed by performing the multiplication and the division in parallel using the same clock, the quotient Q or/and the remainder R can be obtained at high speed.

$M_1 \cdot M_{2,j}$ CALCULATOR

Concerning the multiplication described in the theorem, supplemental explanation will be made below with respect to the condition $\omega = 1$.

In Eq. (F10), setting $\omega = 1$, the following equation is obtained.

$$M_{2,j}' = M_{2,j} - \delta_{j\lambda}\cdot 2^{\lambda} + \delta_{(j-1)\lambda}$$

A description will be given of the case where $\lambda = 6$. $M_{2ja}$, $M_{2jb}$ and $M_{2jc}$ are defined as follows:

$$M_{2ja}=-\delta_{6(j-1)+6}\cdot 2^6+\delta_{6(j-1)+5}\cdot 2^5\\+2\cdot\delta_{6(j-1)+4}\cdot 2^4$$

$$M_{2jb}=-\delta_{6(j-1)+4}\cdot 2^4+\delta_{6(j-1)+3}\cdot 2^3\\+2\cdot\delta_{6(j-1)+2}\cdot 2^2$$

$$M_{2jc}=-\delta_{6(j-1)+2}\cdot 2^2+\delta_{6(j-1)+1}\cdot 2^1\\+2\cdot\delta_{6(j-1)+0}\cdot 2^0$$

Then, $M_{2,j}$ is as follows:

$$M_{2,j}=M_{2ja}+M_{2jb}+M_{2jc}$$

$M_{2ja}$, $M_{2jb}$ and $M_{2jc}$ can be implemented by a circuit similar to that for $Q_{ja}$, $Q_{jb}$ and $Q_{jc}$ described previously in connection with the $-Q_j\cdot n$ calculator with reference to FIG. 62. With such an arrangement, the quantity of data representing $M_1 \cdot M_{2,j}'$ is decreased, permitting reduction of the circuit scale of the carry save adder 16.

Supplemental Description of Theorem 3

A description will be given of the general arrangement of a circuit for calculating the value of $I_j$ by Eqs. (F35) and (F36). Since this circuit arrangement is identical with that of the circuit for calculating the value of $Q_j$ by Eqs. (H2) and (H3) described previously in Example 2, the latter will hereinafter be described with reference to FIG. 66.

FIG. 66 illustrates a quotient calculator 9″ for calculating the value of $Q_j$ based on Eqs. (H2) and (H3). Input signal lines 601, 602, 603 and 604 input therefrom variables $R_{j+1}$, $\delta_j$, $M_1$, and n, respectively. In an AND circuit 871 is obtained $[\delta_j\cdot M_1\cdot 2^{-m}]$. An adder 620 performs an operation $[2R_{j+1}\cdot 2^{-m}]+[\delta_j\cdot M_1\cdot 2^{-m}]+2$. The last term $+2$ of this equation is generated within the adder 620. Circuits 621, 622 and 623 input therein n and output therefrom $[n\cdot 2^{-m}]$, $[-n\cdot 2^{-m}]$ and $[-2n\cdot 2^{-m}]$, respectively. The output of the adder 620 and the outputs of the circuits 621, 622 and 623 are added by adders 625, 627 and 628, respectively, and the output of the adder 620 is added with 0 in an adder 626. The adders 625 to 628 each output therefrom a 0 or 1, based on the following calculation, depending on whether the sign of a value $Q_j=0, 1, 2, 3$ is positive or 0, or negative.

$$[2R_{j+1}\cdot 2^{-m}]+[\delta_j\cdot M_1\cdot 2^{-m}]+[(1-Q_j)\cdot n\cdot 2^{-m}]+2$$

The output signs are indicated by signals QA1, QA2, QA3 and QA4, respectively. These signals QA1, QA2, QA3 and QA4 are applied to a circuit 629, from which a signal QB is provided based on logic shown in FIG. 67. The signal QB is equal to the value $Q_j$ which satisfies Eqs. (H2) and (H3). In this way, the value $Q_j$ can be output, as the signal QB, which satisfies Eqs. (H2) and (H3).

ANOTHER METHOD OF MULTIPLICATION-DIVISION

The following will describe that the calculation for the RSA cryptography can be performed even if the multiplier-divider which is a main constituent of the cryptosystem of the present invention is replaced with another kind of multiplier-divider. A description will be given first of another method of multiplication-division, then a multiplier-divider based on the calculation method and finally the arrangement of the cryptosystem.

ANOTHER METHOD OF MULTIPLICATION-DIVISION

This multiplication-division is performed by a method which can easily be deduced from an ordinary calculation method. At first, the multiplication $M_1 \times M_2$ is executed and then the division $(M_1 \times M_2) \div n$ is performed to obtain the remainder.

(A) Multiplication

The multiplication $M_1 \times M_2$ is performed in the following manner. Let it be assumed that Z is a variable.

Step 1: $Z = 0$

Step 2: The following operations are performed in an order $j = 1, 2, \ldots l$.

$$Z = Z + M_1 \times M_{2,j}$$

Step 3: Halt.

(B) Division

A division $Z \div n$ is performed in the following manner. Here, $R_j$ is a variable, and Z is represented as a binary number and divided equally into 2 l every λ bits and set as $Z_j$.

$$Z = \sum_{j=1}^{2l} Z_j \cdot 2^{(j-1)\lambda}$$

Step 4:

$$R_{l+1} = \sum_{j=l+1}^{2l} Z_j \cdot 2^{(j-l-1)\lambda}$$

Step 5: The following operations are executed in an order $j = l, l-1, \ldots 1$.

$$Q_j = \left[ \frac{2^\lambda \cdot R_{j+1} + Z_j}{n} \right]$$

$$\cdot R_j = 2^\lambda \cdot R_{j+1} + Z_j - Q_j \cdot n$$

Step 6: $R = R_1$, halt. By steps 1 to 6, the remainder R of $(M_1 \times M_2) \div n$ can be obtained.

Here, the range of $R_{l+1}$ in step 4 satisfies the following condition.

$$0 \leq R_{l+1} < n$$

This reason is verified by the following based on conditions $0 \leq M_1 < n$ and $0 \leq M_2 < n$.

$$Z = R_{l+1} \cdot 2^{l\lambda} + \sum_{j=1}^{l} Z_j \cdot 2^{(j-1)\lambda}$$

$$Z = M_1 \times M_2 < n^2$$

Therefore, $0 \leq R_{l+1} \cdot 2^{l\lambda} < n^2$ and $$2^{l\lambda} < n < 2^{l\lambda}$$

$$\therefore 0 \leq R_{l+1} < n$$

For the verification, both sides of the equation of $R_j$ are multiplied by $2^{(j-1)\lambda}$ and an addition of $$\sum_{j=1}^{l}$$

is performed in respect of the multiplication result.

APPROXIMATION OF CALCULATION METHOD OF QUOTIENT $Q_j^a$ IN DIVISION

The quotient $Q_j$ can easily be obtained by a close approximation which involves omitting m bits from the variable $R_{j+1}$ as is the case with the calculation of the quotient $I_j$ in the aforementioned simultaneous multiplication-division and by a close approximation which involves multiplication using a reciprocal of the divisor in the division. That is, the division is performed using $Q_j'$ defined by the following equation, instead of $Q_j$.

$$Q_j' = \begin{cases} [X_j \times v \times 2^{-u}] + 1 & \text{for } X_j \geq 0 \\ [X_j \times v \times 2^{-u}] & \text{for } X_j < 0 \end{cases}$$

where $$X_j = \sum_{i=0}^{1} [(2^\lambda \cdot R_{j+1,i}) \cdot 2^{-m}] + S$$

$$v = \left[ \frac{2^u}{[n \cdot 2^{-m}]} \right]$$

L = the effective length of n ($2^{L-1} < n < 2^L$)
Here, m, S and u are defined as follows:

$$m \leq L - \lambda - 6$$

$$2^{\lambda+2} + 2 \leq S \leq 2^{\lambda+3}$$

$$u \geq L - m + \lambda + 2$$

In this case, it is the same as in the afore-described method of obtaining $I_j$ by approximation that the following holds:

$$Q_j' = Q_j + \gamma_j, \quad \gamma_j = 0, 1, \text{ or } 2$$

Here, $R_j$ is divided into $R_{j,1}$ and $R_{j,0}$, and $$R_j = \sum_{i=0}^{1} R_{j,i}$$

is set.

(C) Division Using $Q_j'$

In the case of using $Q_j'$ in place of $Q_j$, the afore-described division changes as follows:

Step 4':

$$\sum_{i=0}^{1} R_{l+1,i} = \sum_{j=l+1}^{2l} Z_j \cdot 2^{(j-l-1)\lambda}$$

Step 5': The following is executed in the order $j = l, l-1, \ldots 1$.

$$Q_j' = \begin{cases} [X_j \times v \times 2^{-u}] + 1 & \text{for } X_j \geq 0 \\ [X_j \times v \times 2^{-u}] & \text{for } X_j < 0 \end{cases}$$

$$\sum_{i=0}^{1} R_{j,i} = \sum_{i=0}^{1} 2^\lambda \cdot R_{j+1,i} + Z_j - Q_j' \cdot n$$

Step 6':

$$R_1 = \sum_{i=0}^{1} R_{1,i}$$

Step 7': If $R_1 \leq 0$, go to step 9'
Step 8': $R_1 = R_1 + n$, go back to step 7'
Step 9': $R = R_1$ Halt The above-described method of multiplication-division is called a "multiplication-division successive approximating calculation method".

(D) Multiplier-Divider

FIG. 68 illustrates the general arrangement of the multiplier-divider based on the simultaneous multiplication-division operating method described previously with regard to FIGS. 2 and 22 and Eqs. (3) to (24). A main adder $110_X$ is an assembly of the main adders $110_1$ to $110_8$ shown in FIG. 36, and a register $105_X$ is an assembly of the registers $105_1$ to $105_8$ shown in FIG. 34 and it has the function of shifting its content to left by steps of four bits. An $M_1 \cdot M_{2j}$ calculator $140_X$ is an assembly of the calculators $140_1$ to $140_8$ shown in FIG. 37, and a $-Q \cdot n$ calculator $150_X$ is an assembly of the calculators $150_1$ to $150_8$ shown in FIG. 38. An adder $160_X$ is an assembly of the adders $160_1$ to $160_8$ depicted in FIG. 39, and an adding register $170_{LX}$ is an assembly of the registers $170_{L1}$ to $170_{L8}$ shown in FIG. 40. An adding register $170_{LY}$ is also a similar assembly of individual adding registers. Selectors $311_X$ and $312_X$ are assemblies of eight selectors 311 and 312 shown in FIG. 61, respectively. An adder $180_X$ is an assembly of the adders $180_1$ to $180_8$ shown in FIG. 4.

FIG. 69 illustrates a multiplier-divider based on the multiplication-division by successive approximation. In FIG. 69 the parts corresponding to those in FIG. 68 are identified by the same reference numerals. A selector 410 selects one of output signal lines of the calculators $140_X$ and $150_X$ and provides an output to a carry save adder $160_Y$. Switching control of the selector 410 is effected by a signal on a control line 415. The carry save adder $160_Y$ is identical in construction with the adder $160_X$. A register $105_Y$ is similar to the register $105_X$ but largely differs therefrom in that its content is shifted to the right by steps of four bits. Register sections $170_{LY}$ and $170_{RY}$ are registers of 1024-bit length. As depicted in FIG. 70, the register sections $170_{LY}$ and $170_{RY}$ are each formed by a series connection of a 514-bit register 419 and a 510-bit register 420 to constitute a 1024-bit register as a whole. This register has the function of shifting its content to the right and left by steps of four bit ($\lambda=4$). The register $170_Y$ has connected thereto a signal line 421 for determining the direction of shift, a shift command pulse input signal line 422, a signal line 423 for setting 0 in the content of the register, a register input signal line 425 and a register output signal line 426.

In the arrangement of FIG. 69, the calculation for obtaining the remainder of $(M_1 \times M_2) \div n$ is performed as follows: At first, the input signal line 411 of the selector 410 is selected, and the register sections $170_{LY}$ and $170_{RY}$ store 0 first and perform the multiplication by the aforesaid method utilizing the function of right shift by steps of four bits, thereby obtaining the value of $M_1 \times M_2$ on the register sections $170_{LY}$ and $170_{RY}$ of 1024-bit length. ($M_1 \times M_2$ is represented as the sum of numbers stored in the register sections $170_{LY}$ and $170_{RY}$.)

Next, the input signal line 412 of the selector 410 is selected and the division is carried out by the quotient calculators 60 and 61 in the aforementioned manner utilizing the left shift function of the registers $170_{LY}$ and $170_{RY}$. In this way, the remainder of the multiplication-division $(M_1 \times M_2) \div n$ can be obtained.

FIG. 70 illustrates the construction of a register $170_Y$ comprising the register sections $170_{LY}$ and $170_{RY}$.

FIG. 71 illustrates the general arrangement of an embodiment of the cryptosystem of the present invention which employs the simultaneous multiplication-division method, and FIG. 72 shows the general arrangement of another embodiment of the present invention which employs the successive approximating multiplication-division method. In FIGS. 71 and 72, respective input and output signal lines correspond to those in the afore-described drawings and shown at the same positions. The register 420 in FIG. 22 corresponds to 510-bit-long register 420 in FIG. 70 which has the function of shifting its content to the right and left by steps of four bits, and the signal line 21' is a multiplication control signal line. As described previously in connection with FIG. 69, the register $105_Y$ is one that has the function of shifting its content to the right by steps of four bits. The multiplication control signal line 21' is led out from the slice section $25_8$ and the direction of the signal on this line is opposite to that on the signal line in FIG. 71. The register 419 in each of the register sections $170_{LY}$ and $170_{RY}$ serves as a register equivalent to an assembly of the register $104_1$ to $104_8$ shown in FIG. 33. Because of such an arrangement, the calculation $C \equiv M^e$ mod n can be performed using the variables e, n and M.

In the simultaneous multiplication-division method, it is also possible to calculate first $M_1 \times M_{2j}$ for each j and then perform the operation $-Q_j \times n$. In this case, as shown in FIG. 69, a selector is provided between the calculators $140_X$ and $150_X$ and the adder $160_X$ in the arrangement of FIG. 68, and $M_1 \times M_{2j}$ and $-Q_j \times n$ are alternately supplied from the selector to the adder $160_X$ for each j.

Furthermore, in the quotient calculating unit 9, the operation $$Q_j = \left[ \frac{M_1 \times M_{2j} + 2^\lambda R_{j+1}}{n} \right]$$

may be directly performed without using close approximation.

Although in the foregoing embodiments the quotient calculating unit 9 is provided independently of the sliceable section 25', it is also possible to provide quotient calculators $9_1$ to $9_8$ in the sliced sections $25_1$ to $25_8$, respectively, as shown in FIG. 73, for example, and to actuate only the quotient calculator $9_1$ for the calculation for cryptography, holding the others inoperative. With such an arrangement, the cryptosystem of the present invention can be formed by eight LSI chips of the same configuration and any separate LSI chips need not be provided for the quotient calculating unit. Also it is possible to constitute LSIs including one part of the quotient calculating unit 9, for instance, the post-processing section 61 or pre-processing section 60, in the respective sliced sections $25_1$ to $25_8$, though not shown.

Conversely, since only one controller $8_1$ in the sliced section $25_1$ shown in FIG. 6 is made operative, it is possible to remove all the controllers $8_1$ to $8_8$ from the respective sliced sections $25_1$ to $25_8$, and provide a single controller of an LSI chip for controlling the sliced sections $8_1$ to $8_8$ and the quotient calculator 9.

As has been described in the foregoing, according to the present invention, the cryptosystem for implementing the RSA cryptograph $C \equiv M^3$ mod n can easily be constituted through utilization of the present-day LSI technology even if the value of n is extremely large. For instance, the RSA cryptography employs the value $n = 10^{100}$ to $10^{200}$ and, in this case, the circuit scale of the cryptosystem is as large as 100K to 200K gates. According to the present invention, the cryptosystem can be formed by a small-scale ROM and 10-to-30K-gate LSI chips of the same configuration.

Furthermore, as will be appreciated from the foregoing, the value L-m is independent of the value L. Accordingly, the calculation by the quotient calculation post-processing section is independent of the value L, that is, the number of digits of the value n; therefore, the multiplication-division $R \equiv M_1 \times M_2$ mod n and the operation $C \equiv M^e$ and mod n can be performed increasing or decreasing the number of sliced sections. In other words, the lengths of the encryption keys (n and e) can easily be changed by increasing or decreasing the number of sliced sections.

Besides, according to the present invention, the operation speed can be increased by the simultaneous multiplication-division as described previously. In this case, the main adding unit need not always be divided, that is, the arrangement shown in FIG. 68 may be employed.

It will be apparent that many modifications and variations may be effected without departing from the scope of the novel concepts of the present invention.

I claim:

1. An encryptosystem in which integers M, e and n ($0 \leq M < n$) are applied to M-, e- and n-registers; variables C and $M_2$ are stored in C- and $M_2$-registers; the integer e being represented by $$e \sum_{i=0}^{k} e_i \cdot 2^i$$

($e_i = 1$ or 0);

the variable C is initially set to 1; repetitive calculations are performed in accordance with the following Steps (1) and (2) for each value i in the order $i = k, k-1, k-2, \ldots 1, 0$; in Step (1) an operation $C \equiv M_1 \times M_2 \bmod n$ is performed with $M_1 = C$ and $M_2 = C$; in Step (2) the value of $e_i$ is checked and if $e_i = 1$, the operation $C = M_1 \times M_2 \bmod n$ is further performed with $M_1 = C$ and $M_2 = M$; and said repetitive calculations are completed with $i = 0$, producing the last C in the form of $C \equiv M^e \bmod n$;

wherein a quotient calculating unit, a main adding unit and a controller are provided for performing the operation $C \equiv M_1 \times M_2 \bmod n$, said main adding unit having an adding register for storing a variable $R_j$;

wherein, in order to perform the following operation in the order $j = 1, 1-1, 1-2, \ldots 1$, thereby to obtain the last $R_1$ in the form of $C \equiv M_1 \times M_2 \bmod n$:

$$R_j = M_1 \times M'_{2,j} + 2^\lambda R_{j+1} - \left[\frac{M_1 \times M'_{2,j} + 2^\lambda R_{j+1}}{n}\right] \times n,$$

where $$M'_{2,j} = M_{2,j} - \omega \delta_{j\lambda} \cdot 2^\lambda + \omega \delta_{(j-1)\lambda},$$

$$M_{2,j} = \sum_{i=0}^{\lambda-1} \delta_{(j-1)\lambda+i} \cdot 2^i,$$

$$M_2 = \sum_{i=0}^{l\lambda-1} \delta_i \cdot 2^i, \delta_i = 0 \text{ or } 1,$$

$$R_{l+1} = 0 \text{ and } \omega = 0 \text{ or } 1,$$

where [ ] is a Gaussian symbol, [x] the largest possible integer smaller than or equal to x, and $\lambda$ and l constants, said quotient calculating unit is connected to said C-, $M_2$- and n-registers and said main adding unit and performs an operation $$\left[\frac{M_1 \times M'_{2,j} + 2^\lambda R_{j+1}}{n}\right] = Q_j,$$

said main adding unit is connected to said quotient calculating unit and said C-, $M_2$- and n-registers and forms an operation $M_1 \times M_{2,j}' + 2^\lambda R_{j+1} - Q_j \cdot n$, and said controller performs control for obtaining said C by the respective calculations of said quotient calculating unit and said main adding unit.

2. A cryptosystem according to claim 1 wherein first and second adding registers are provided as said adding register; said variable $R_j$ is divided into $R_{j,0}$ and $$R_{j,1} \left(R_j = \sum_{i=0}^{1} R_{j,i}\right);$$

$R_{j,0}$ and $R_{j,1}$ are stored in said first and second adding registers; and said main adding unit performs the following operation:

$$M_1 \times M'_{2,j} + \sum_{i=0}^{1} 2^\lambda \cdot R_{j+1,i} - Q_j \cdot n$$

3. A cryptosystem according to claim 2 wherein said quotient calculating unit comprises a pre-processing section and a post-processing section connected thereto, said pre-processing section being supplied with said n to calculate $[2^u \div [n \cdot 2^{-m}]] = v$ (m and u being constants) and said post-processing section being supplied with said $R_{j+1}$, $M_1$, $M_{2,j}'$ and v to calculate $Q_j''$ by approximation setting $$\sum_{i=0}^{1} [2^\lambda \cdot R_{j+1,i} \cdot 2^{-m}] + \sum_{i=0}^{\lambda-1} [M_1 \cdot \delta_{(j-1)\lambda+i} \cdot 2^i \cdot 2^{-m}] + S = X_j''$$

in the case of $\omega = 0$ and, in the case of $\omega = 1$, setting $$\sum_{i=0}^{1} [2^\lambda \cdot R_{j+1,i} \cdot 2^{-m}] + \sum_{i=0}^{\frac{\lambda}{2}-1} [M_1 \cdot \{-\delta_{(j-1)\lambda+2i+2} \cdot 2^{2i+2} + \delta_{(j-1)\lambda+2i+1} \cdot 2^{2i+1} + 2\delta_{(j-1)\lambda+2i} \cdot 2^{2i}\} \cdot 2^{-m}] + S = X_j''$$

and setting as said $Q_j$ $$Q''_j = [X''_j \times v \times 2^{-u}] + 1 \text{ for } X''_j \geq 0$$

$$Q''_j = [X''_j \times v \times 2^{-u}] \text{ for } X''_j < 0$$

or $$Q''_j = [X''_j \times v \times 2^{-u}] + 1 \text{ for } X''_j > 0$$

$$Q''_j = [X''_j \times v \times 2^{-u}] \text{ for } X''_j \leq 0$$

(S being a constant and $Q_j'' = Q_j - \delta$ holding and $\delta$ being an integer), and wherein compensating calculation means is included for obtaining, from said $R_1, R_1 + \delta \cdot n$ which satisfies $0 \leq R_1 + \delta \cdot n < n$.

4. A cryptosystem according to claim 3 wherein said pre-processing section is a memory which is read out using $[n \cdot 2^{-m}]$ as its address.

5. A cryptosystem according to claim 2 wherein $\lambda = 1$ and $\omega = 0$; said quotient calculating unit is means supplied with said $M_1$, $\delta_j$, n and $R_{j+1}$, for obtaining an approximate value $Q_j''$ of $Q_j$ such that the calculation result obtained by calculating $[2R_{j+1} \cdot 2^{-m}] + [\delta_j \cdot M_1 \cdot 2^{-m}] - [Q_j \cdot n \cdot 2^{-m}]$ while changing $Q_j$ successively varies in sign with respect to a reference value; and compensating calculation means is included for obtaining, from said $R_1$, $R_1 + \delta \cdot n$ which satisfies $0 \leq R_1 + \delta \cdot n < n$ ($\delta$ being an integer).

6. A cryptosystem according to claim 3 or 5 wherein said main adding unit comprises an $M_1 \cdot M_{2,j}$ calculating section for calculating $M_1 \times M_{2,j}'$, a $-Q_j \cdot n$ calculating section for calculating $-Q_j'' \times n$, said first and second adding registers for storing variables $R_{j+1,0}$ and $R_{j+1,1}$, means for multiplying the contents $R_{j+1,0}$ and $R_{j+1,1}$ of said first and second adding registers by $2^\lambda$, a carry save adder for adding together the resulting $2^\lambda \cdot R_{j+1,0}$ and $2^\lambda \cdot R_{j+1,1}$, the calculated $M_1 \times M_{2,j}'$ and the calculated $-Q_j'' \times n$ and storing the addition result in said first and second adding registers, and a carry propagation adder for adding two outputs from said carry save adder and storing the addition result in said C-register; said compensating calculation means comprises a selector for selecting one of the contents of said first and second adding registers, $R_{j+1,0}$ and $R_{j+1,1}$, and said $2^\lambda$—multiplied values, $2^\lambda \cdot R_{j+1,0}$ and $2^\lambda \cdot R_{j+1,1}$, for input to said carry save adder, means for making zero one of $M_1$ and $M_{2,j}'$ applied to said $M_1 \cdot M_{2,j}'$ calculating section, means for setting $-Q_j$ applied to said $-Q_j'' \cdot n$ calculating section to $+1$, and means for selecting $R_{j+1,0}$ and $R_{j+1,1}$ by said selector at the time of compensating calculation, making one of $M_1$ and $M_{2,j}'$ to be zero and $-Q_j$ to be $+1$, and activating said carry save adder and said carry propagation adder to perform an operation $R_1 + \delta \cdot n$.

7. A cryptosystem according to claim 3 or 5 wherein said main adding unit comprises an $M_1 \cdot M_{2,j}$ calculating section for calculating $M_1 \times M_{2,j}'$, a $-Q_j \cdot n$ calculating section for calculating $-Q_j'' \times n$, said first and second adding registers for storing the variable $R_{j+1,i} (i-0, 1)$, a carry save adder for adding $2^\lambda \cdot R_{j+1,i} (i=0, 1)$ obtained by multiplying $R_{j+1,i} (i=0, 1)$ by $2^\lambda$, the calculated $M_1 \cdot M_{2,j}'$ and the calculated $-Q_j'' \cdot n$ and storing the addition result in said first and second adding registers, and a carry propagation adder for adding two outputs from said carry save adder and storing the addition result in said C-register; and said compensating calculation means comprises a first selector for selecting either the one output from said carry save adder or the content of said C-register, a second selector for selecting either the other output from said carry save adder or n applied to said $-Q_j \cdot n$ calculating section, and means for selecting the content of the C-register and the n by said first and second selector, respectively, during compensating calculation, and activating said carry propagation adder to perform an operation $R_1 + \delta \cdot n$.

8. A cryptosystem according to claim 2 wherein said main adding unit comprises an $M_1 \cdot M_{2,j}$ calculating section for calculating $M_1 \times M_{2,j}'$, a $-Q_j \cdot n$ calculating section for calculating $-Q_j'' \times n$, said first and second adding registers for storing the variable $R_{j+1,i} (i-1, 0)$ a carry save adder for adding $2^\lambda R_{j+1}$ obtained by multiplying $R_{j+1,i}$ by $2^\lambda$, the calculation result of said $M_1 \cdot M_{2,j}$ calculating section and the calculation result of said $-Q_j \cdot n$ calculating section and storing the addition result in said first and second adding registers, and a carry propagation adder for adding two outputs from said carry save adder and storing the addition result in said C-register.

9. A cryptosystem according to claim 8, further including a selector for selecting one of the calculation results of said $M_1 \cdot M_{2,j}$ calculating section and said $-Q_j \cdot n$ calculating section and supplying the selected calculation result to said carry save adder, and means for adding the selected calculation result and said $2^\lambda \cdot R_{j+1}$ and adding the addition result, for each j, with the other calculation result selected by said selector.

10. A cryptosystem according to claim 2, 3 or 5 wherein said main adding unit is divided into a plurality of sliced sections of the same function; said $M_1$ and n are divided into every fixed width of their binary integers and sequentially applied to said sliced sections; said $M_{2,j}'$ and $Q_j$ are applied to said sliced sections in common to them; said sliced sections each perform a calculation $R_j = M_1 \times M_{2,j}' + 2^\lambda R_{j+1} - Q_j'' \times n$ for the $M_1$, n, $Q_j$, $M_{2,j}'$ and $R_{j+1}$ applied to them; and said sliced sections are each connected to a higher-order one of them via a connection signal line for applying thereto one part of the result of said calculation.

11. A cryptosystem according to claim 10, wherein an adder for performing the addition in the calculation $R_j = M_1 \times M_{2,j}' + 2^\lambda R_{j+1} - Q_j'' \times n$ in each sliced section is composed of a plurality of carry save adders; the number of bits of each of an input and an output signal line of said carry save adder is selected larger than the number of binary bits of the fixed width of said integers; and means is included for supplying the most significant one of binary bits of the fixed width of said integers on the low-order side in the output signal line of each carry save adder to a corresponding one of the carry save adders of the higher-order sliced sections via a part of said connection signal line, and for applying said most significant bit applied from the lower-order sliced sections to the corresponding carry save adder, for applying $\lambda$ bits of the last stage output signal line of said carry save adder to the higher-order sliced section via the other part of said connection signal line to apply a signal of said $\lambda$ bits from the lower-order sliced section to the last-stage output of said carry save adder.

12. A cryptosystem according to claim 10 wherein said sliced section each include an $M_2$-register for input therein said divided $M_2$.

13. A cryptosystem according to claim 12 wherein said sliced sections each include a selector controlled by said $e_i$ to select one of said M and C for input to said $M_2$-register.

14. A cryptosystem according to claim 13 wherein said sliced section each includes an M-register for storing said divided M.

15. A cryptosystem according to claim 13 wherein said sliced sections each include an n-register for storing said divided n.

16. A cryptosystem according to claim 13 wherein said sliced section each include an e-register for storing said divided e.

17. A cryptosystem according to claim 13 wherein said sliced sections each include a C-register for storing said divided C.

18. A cryptosystem according to claim 13 wherein said sliced sections each include at least one part of said quotient calculating section, and only one of said quotient calculating sections of said sliced sections is made operable.

19. A cryptosystem according to claim 13 wherein said sliced sections each include said controller, and only one of said controllers of said sliced sections is made operable.

20. A cryptosystem in which integers M, e and n $(0 \geq M < n)$ are applied to M, e and n registers; variables C and $M_2$ are stored in C- and $M_2$-registers; the integer e being represented by $$e = \sum_{i=0}^{k} e_i \cdot 2^i$$

($e_i = 0$ or 1); the variable C is initially set to 1; repetitive calculations are performed in accordance with the following Steps (1) and (2) for each value i in the order i=k, k−1, k−2, . . . 1, 0; in Step (1) an operation $C \equiv M_1 \times M_2 \bmod n$ is performed with $M_1 = C$ and $M_2 = C$; in Step (2), the value of $e_i$ is checked and if $e_i = 1$, the operation $C \equiv M_1 \times M_2 \bmod n$ is further performed with $M_1 = C$ and $M_2 = M$; and said repetitive calculations are completed with i=0, producing the last C in the form of $C \equiv M^e \bmod n$;

said cryptosystem comprising a main adding unit including at least an $M_1 \cdot M_{2,j}$ calculating section for calculating $M_1 \times M_{2,j}'$, a $-Q_j \cdot n$ calculating section for calculating $-Q_j'' \times n$, a selector for selecting one of the calculation results $M_1 \cdot M_{2,j}'$ and $-Q_j'' \cdot n$, an adding register and an adder for adding the content of said adding register and the output of said selector and storing the addition result, in said adding register, a controller, and a quotient calculating unit;

wherein the main adding unit is controlled by said controller so that a 0 is applied as a variable Z to said adding register, said calculation result $M_1 \cdot M_{2,j}'$ is selected by said selector, an operation $Z = Z + M_1 \times M_{2,j}'$ is performed in the order j=1, 2, . . . l to obtain $M_1 \cdot M_2 \equiv Z$, $$R_{l+1} = \sum_{j=l+1}^{2l} \cdot Z \cdot 2^{(j-1)\lambda} \text{ of } Z = \sum_{j=1}^{2l} \cdot Z_j \cdot 2^{(j-1)\lambda}$$

($\lambda$ being constant) is applied to said adding register, said calculation result $-Q_j'' \cdot n$ is selected by said selector, and an operation $R_j = 2^\lambda R_{j+1} + Z_j - Q_j'' \cdot n$ is performed in the order j=l, l−1, . . . 1;

wherein said main adding unit is divided into a plurality of sliced sections of the same function, said $M_1$ and n are divided into every fixed width of their binary integers and sequentially applied to said sliced sections, said $M_{2,j}'$ and $Q''$ are applied to said sliced sections in common to them, said sliced sections each perform said operations $Z = Z + M_1 \times M_{2,j}'$ and $R = 2^\lambda R_{j+1} + Z_j - Q_j'' \cdot n$ for the $M_1$, n, $Q_j''$ and $M_{2,j}'$ applied to them, said sliced sections are each connected to a higher-order one of them via a first connection signal line for applying thereto one part of the calculation result Z, and said sliced sections are each connected to a lower-order one of them via a second connection signal line for applying thereto the calculation result $R_j$.

21. A cryptosystem in which integers M, e and n ($0 \leq M < n$) are applied to M, e and n registers; variables C and $M_2$ are stored in C- and $M_2$-registers; the integer e being represented by $$e = \sum_{i=0}^{k} \cdot e_i \cdot 2^i$$

($e_i = 0$ or 1); the variable C is initially set to 1; repetitive calculations are performed in accordance with the following Steps (1) and (2) for each value i in the order i=k, k−1, k−2, . . . 1, 0; in Step (1) an operation $C \equiv M_1 \times M_2 \bmod n$ is performed with $M_1 = C$ and $M_2 = C$; in Step (2), the value of $e_i$ is checked and if $e_i = 1$, the operation $C \equiv M_1 \times M_2 \bmod n$ is further performed with $M_1 = C$ and $M_2 = M$; and said repetitive calculations are completed with i=0, producing the last C in the form of $C \equiv M^e \bmod n$;

said cryptosystem comprising a main adding unit including at least an $M_1 \cdot M_{2,j}$ calculating section for calculating $M_1 \times M_{2,j}'$, a $-Q_j \cdot n$ calculating section for calculating $-Q_j'' \times n$, a selector for selecting one of the calculation results $M_1 \cdot M_{2,j}'$ and $-Q_j'' \cdot n$, an adding register and an adder for adding the content of said adding register and the output of said selector and storing the addition result in said adding register, a controller, and a quotient calculating unit;

wherein a 0 is applied as a variable Z to said adding register, said calculation result $M_1 \cdot M_{2,j}'$ is selected by said selector, an operation $Z = Z + M_1 \times M_{2,j}'$ is performed in the order j=1, 2, . . . l to obtain $M_1 \cdot M_2 \equiv Z$, then $R_{l+1}$ of $$Z = \sum_{j=1}^{2l} \cdot Z_j \cdot 2^{(j-1)\lambda} \text{ (}\lambda\text{ being a constant)}$$

$$R_{l+1} = \sum_{i=l+1}^{2l} \cdot Z_j \cdot 2^{(j-l-1)\lambda}$$

is applied to said adding register, said calculation result $-Q_j'' \cdot n$ is selected by said selector, said quotient calculating unit comprises a calculating section for calculating $X_j = [2^\lambda \cdot R_j \cdot 2^{-m}] + S$ (S being a constant) and a calculating section for calculating $$v = \left[ \frac{2^u}{[n \cdot 2^{-m}]} \right],$$

and said quotient calculating unit is controlled by said controller to calculate $$Q_j'' = [X_j \times v \times 2^{-u}] + 1$$

when $$X_j \geq 0$$

$$Q_j'' = [X_j \times v \times 2^{-u}]$$

when $$X_j < 0$$

or $$Q_j'' = [X_j \times v \times 2^{-u}] + 1$$

when $$X_j > 0$$

$$Q_j'' = [X_j \times v \times 2^{-u}]$$

when $$X_j \leq 0$$

and calculate $R_j = 2^\lambda \cdot R_j + R_j - Q_j'' \cdot n$ in the order j=l, l−1, . . . 1;

wherein compensation calculation means is included for calculating, when $R_1 \geq 0$, $R_1 = R_1 + n$ until $R_1 \geq 0$ is obtained;

wherein said main adding unit is divided into a plurality of sliced sections of the same function, said $M_1$ and n are applied to said sliced sections while being sequentially divided for each fixed width of their integers, said $M_{2,j}'$ and $Q''$ are applied to said sliced sections in common to them, said sliced sections each perform said operations $Z=Z+M_1 \times M_{2,j}'$ and $R_j = 2^\lambda R_{j+1} + Z_j - Q_j'' \cdot n$ for the $M_1$, n, $Q_j''$ and $M_{2,j}'$ applied to them, said sliced sections are each connected to a higher-order one of them via a first connection signal line for applying thereto one part of the calculation result Z, and said sliced sections are each connected to a lower-order one of them via a second connection signal line for applying thereto the calculation result $R_j$.

22. A cryptosystem according to claim 20 wherein first and second adding registers are provided as said adding register; said variable $R_j$ is divided into $R_{j,0}$ and $$R_{j,1} \text{ (i.e. } R_j = \sum_{i=0}^{1} R_{j,i}\text{)};$$

$R_{j,0}$ and $R_{j,1}$ are stored in said first and second adding registers; and said main adding unit performs the following operation:

$$\sum_{i=0}^{1} R_{j,i} = \sum_{i=0}^{1} 2^\lambda \cdot R_{j+1,i} + Z_j - Q_j'' \cdot n.$$

* * * * *